US011711614B2

United States Patent
Bernstein et al.

(10) Patent No.: US 11,711,614 B2
(45) Date of Patent: *Jul. 25, 2023

(54) DIGITAL VIEWFINDER USER INTERFACE FOR MULTIPLE CAMERAS

(71) Applicant: Apple Inc., Cupertino, CA (US)

(72) Inventors: Jeffrey Traer Bernstein, San Francisco, CA (US); Lukas Robert Tom Girling, San Francisco, CA (US); Linda L. Dong, San Francisco, CA (US); Henrique Penha, San Francisco, CA (US); Paulo Michaelo Lopez, Los Gatos, CA (US); Behkish J. Manzari, San Francisco, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/940,672

(22) Filed: Sep. 8, 2022

(65) Prior Publication Data

US 2022/0417440 A1 Dec. 29, 2022

Related U.S. Application Data

(63) Continuation of application No. 17/409,598, filed on Aug. 23, 2021, now Pat. No. 11,490,017, which is a
(Continued)

(51) Int. Cl.
*H04N 23/69* (2023.01)
*H04N 13/25* (2018.01)
(Continued)

(52) U.S. Cl.
CPC ......... *H04N 23/69* (2023.01); *G06F 3/04842* (2013.01); *G06F 3/04883* (2013.01);
(Continued)

(58) Field of Classification Search
CPC .... H04N 13/25; H04N 23/632; H04N 23/633; H04N 23/69; H04N 23/90; G06F 3/04842; G06F 3/04883; G06F 2203/04806
See application file for complete search history.

(56) References Cited

U.S. PATENT DOCUMENTS

| 4,823,283 A | 4/1989 | Diehm et al. |
| 4,933,702 A | 6/1990 | Komatsuzaki et al. |

(Continued)

FOREIGN PATENT DOCUMENTS

| CA | 2729392 A1 | 8/2011 |
| CA | 2965700 A1 | 5/2016 |

(Continued)

OTHER PUBLICATIONS

Intention to Grant received for European Patent Application No. 20206197.4, dated Dec. 15, 2022, 10 pages.
(Continued)

*Primary Examiner* — Lin Ye
*Assistant Examiner* — Chriss S Yoder, III
(74) *Attorney, Agent, or Firm* — DLA Piper LLP (US)

(57) ABSTRACT

An electronic device has multiple cameras and displays a digital viewfinder user interface for previewing visual information provided by the cameras. The multiple cameras may have different properties such as focal lengths. When a single digital viewfinder is provided, the user interface allows zooming over a zoom range that includes the respective zoom ranges of both cameras. The zoom setting to determine which camera provides visual information to the viewfinder and which camera is used to capture visual information. The user interface also allows the simultaneous display of content provided by different cameras at the same time. When two digital viewfinders are provided, the user
(Continued)

interface allows zooming, freezing, and panning of one digital viewfinder independently of the other. The device allows storing of a composite images and/or videos using both digital viewfinders and corresponding cameras.

21 Claims, 43 Drawing Sheets

Related U.S. Application Data continuation of application No. 16/840,719, filed on Apr. 6, 2020, now Pat. No. 11,102,414, which is a continuation of application No. 16/143,396, filed on Sep. 26, 2018, now Pat. No. 10,616,490, which is a continuation of application No. 15/863,369, filed on Jan. 5, 2018, now Pat. No. 10,122,931, which is a continuation of application No. 15/136,323, filed on Apr. 22, 2016, now Pat. No. 9,979,890.

(60) Provisional application No. 62/151,955, filed on Apr. 23, 2015.

(51) Int. Cl.
*G06F 3/04883* (2022.01)
*G06F 3/04842* (2022.01)
*H04N 23/90* (2023.01)
*H04N 23/63* (2023.01)

(52) U.S. Cl.
CPC ............ *H04N 13/25* (2018.05); *H04N 23/632* (2023.01); *H04N 23/633* (2023.01); *H04N 23/90* (2023.01); *G06F 2203/04806* (2013.01)

(56) References Cited

U.S. PATENT DOCUMENTS

| | | |
|---|---|---|
| 5,557,358 A | 9/1996 | Mukai et al. |
| 5,615,384 A | 3/1997 | Allard et al. |
| 5,825,353 A | 10/1998 | Will |
| 6,262,769 B1 | 7/2001 | Anderson et al. |
| 6,359,837 B1 | 3/2002 | Tsukamoto |
| 6,429,896 B1 | 8/2002 | Aruga et al. |
| 6,448,987 B1 | 9/2002 | Easty et al. |
| 6,522,347 B1 | 2/2003 | Sakai et al. |
| 6,809,724 B1 | 10/2004 | Shiraishi et al. |
| 6,809,759 B1 | 10/2004 | Chiang |
| 6,819,867 B2 | 11/2004 | Mayer et al. |
| 6,900,840 B1 | 5/2005 | Schinner et al. |
| 7,036,091 B1 | 4/2006 | Nguyen |
| 7,463,304 B2 | 12/2008 | Murray |
| 7,515,178 B1 | 4/2009 | Fleischman et al. |
| 7,516,419 B2 | 4/2009 | Petro et al. |
| 7,551,899 B1 | 6/2009 | Nicolas et al. |
| 8,189,087 B2 | 5/2012 | Misawa et al. |
| 8,203,640 B2 | 6/2012 | Kim et al. |
| 8,350,945 B2 | 1/2013 | Yumiki |
| 8,493,408 B2 | 7/2013 | Williamson et al. |
| 8,624,836 B1 | 1/2014 | Miller et al. |
| 8,638,371 B2 | 1/2014 | Laberge et al. |
| 8,675,084 B2 | 3/2014 | Bolton et al. |
| 8,723,988 B2 | 5/2014 | Thorn |
| 8,736,704 B2 | 5/2014 | Jasinski et al. |
| 8,736,716 B2 | 5/2014 | Prentice |
| 8,742,890 B2 | 6/2014 | Gocho et al. |
| 8,762,895 B2 | 6/2014 | Mehta et al. |
| 8,817,158 B2 | 8/2014 | Saito |
| 8,885,978 B2 | 11/2014 | Cote et al. |
| 9,158,974 B1 | 10/2015 | Laska et al. |
| 9,160,869 B2 | 10/2015 | Schult |
| 9,172,866 B2 | 10/2015 | Ito et al. |
| 9,185,291 B1 | 11/2015 | Shabtay et al. |
| 9,223,486 B2 | 12/2015 | Shin et al. |
| 9,250,797 B2 | 2/2016 | Roberts et al. |
| 9,313,397 B2 | 4/2016 | Harris et al. |
| 9,313,401 B2 | 4/2016 | Frey et al. |
| 9,325,970 B2 | 4/2016 | Sakayori |
| 9,342,230 B2 | 5/2016 | Bastien et al. |
| 9,360,671 B1 | 6/2016 | Zhou |
| 9,423,868 B2 | 8/2016 | Iwasaki |
| 9,451,144 B2 | 9/2016 | Dye |
| 9,467,812 B2 | 10/2016 | Jung et al. |
| 9,538,152 B2 | 1/2017 | Shabtay et al. |
| 9,544,563 B1 | 1/2017 | Cheng et al. |
| 9,609,221 B2 | 3/2017 | Kim et al. |
| 9,667,881 B2 | 5/2017 | Harris et al. |
| 9,716,825 B1 | 7/2017 | Manzari et al. |
| 9,749,543 B2 | 8/2017 | Kim et al. |
| 9,767,613 B1 | 9/2017 | Bedikian et al. |
| 9,942,463 B2 | 4/2018 | Kuo et al. |
| 9,973,674 B2 | 5/2018 | Dye et al. |
| 10,015,298 B2 | 7/2018 | Yang et al. |
| 10,025,462 B1 | 7/2018 | Ledet |
| 10,148,886 B2 | 12/2018 | Kim et al. |
| 10,152,222 B2 | 12/2018 | Ozawa et al. |
| 10,187,587 B2 | 1/2019 | Hasinoff et al. |
| 10,198,148 B2 | 2/2019 | Shaw |
| 10,230,901 B2 | 3/2019 | Harris et al. |
| 10,297,034 B2 | 5/2019 | Nash et al. |
| 10,304,231 B2 | 5/2019 | Saito |
| 10,325,417 B1 | 6/2019 | Scapel et al. |
| 10,326,942 B2 | 6/2019 | Shabtay et al. |
| 10,345,592 B2 | 7/2019 | Samec et al. |
| 10,397,500 B1 | 8/2019 | Xu et al. |
| 10,447,908 B2 | 10/2019 | Lee et al. |
| 10,467,729 B1 | 11/2019 | Perera et al. |
| 10,523,879 B2 | 12/2019 | Dye et al. |
| 10,614,139 B2 | 4/2020 | Fujioka et al. |
| 10,645,294 B1 | 5/2020 | Manzari et al. |
| 10,652,470 B1 | 5/2020 | Manzari et al. |
| 10,674,072 B1 | 6/2020 | Manzari et al. |
| 10,681,282 B1 | 6/2020 | Manzari et al. |
| 10,735,642 B1 | 8/2020 | Manzari et al. |
| 10,735,643 B1 | 8/2020 | Manzari et al. |
| 10,791,273 B1 | 9/2020 | Manzari et al. |
| 10,831,337 B2 | 11/2020 | Agnoli et al. |
| 11,212,449 B1 | 12/2021 | Manzari et al. |
| 11,321,857 B2 | 5/2022 | Stauber et al. |
| 11,468,625 B2 | 10/2022 | Manzari et al. |
| 2002/0122031 A1 | 9/2002 | Maglio et al. |
| 2002/0140803 A1 | 10/2002 | Gutta et al. |
| 2002/0167604 A1 | 11/2002 | Ban et al. |
| 2002/0171737 A1 | 11/2002 | Tullis et al. |
| 2003/0025802 A1 | 2/2003 | Mayer, Jr. et al. |
| 2003/0107664 A1 | 6/2003 | Suzuki |
| 2003/0122930 A1 | 7/2003 | Schofield et al. |
| 2003/0160756 A1 | 8/2003 | Numano |
| 2003/0174216 A1 | 9/2003 | Iguchi et al. |
| 2004/0041924 A1 | 3/2004 | White et al. |
| 2004/0061796 A1 | 4/2004 | Honda et al. |
| 2004/0095473 A1 | 5/2004 | Park |
| 2004/0250217 A1 | 12/2004 | Tojo et al. |
| 2005/0134695 A1 | 6/2005 | Deshpande et al. |
| 2005/0189419 A1 | 9/2005 | Igarashi et al. |
| 2005/0210403 A1 | 9/2005 | Satanek |
| 2005/0248660 A1 | 11/2005 | Stavely et al. |
| 2006/0026521 A1 | 2/2006 | Hotelling et al. |
| 2006/0158730 A1 | 7/2006 | Kira |
| 2006/0187322 A1 | 8/2006 | Janson et al. |
| 2006/0233192 A1 | 10/2006 | Mihara |
| 2006/0275025 A1 | 12/2006 | Labaziewicz et al. |
| 2007/0025711 A1 | 2/2007 | Marcus et al. |
| 2007/0025714 A1 | 2/2007 | Shiraki |
| 2007/0040810 A1 | 2/2007 | Dowe et al. |
| 2007/0097088 A1 | 5/2007 | Battles |
| 2007/0109417 A1 | 5/2007 | Hyttfors et al. |
| 2007/0140675 A1 | 6/2007 | Yanagi et al. |
| 2007/0146503 A1 | 6/2007 | Shiraki |
| 2007/0165103 A1 | 7/2007 | Arima et al. |
| 2007/0228259 A1 | 10/2007 | Hohenberger |
| 2007/0254640 A1 | 11/2007 | Bliss |
| 2007/0256029 A1 | 11/2007 | Maxwell |

(56) References Cited

U.S. PATENT DOCUMENTS

| | | |
|---|---|---|
| 2007/0271528 A1 | 11/2007 | Park et al. |
| 2007/0273769 A1 | 11/2007 | Takahashi |
| 2008/0030592 A1* | 2/2008 | Border ................. H04N 23/45 |
| | | 348/E5.042 |
| 2008/0084484 A1 | 4/2008 | Ochi et al. |
| 2008/0106601 A1 | 5/2008 | Matsuda |
| 2008/0129759 A1 | 6/2008 | Jeon et al. |
| 2008/0129825 A1 | 6/2008 | Deangelis et al. |
| 2008/0131019 A1 | 6/2008 | Ng |
| 2008/0143840 A1 | 6/2008 | Corkum et al. |
| 2008/0146275 A1 | 6/2008 | Tofflinger |
| 2008/0192020 A1 | 8/2008 | Kang et al. |
| 2008/0215978 A1 | 9/2008 | Bamba |
| 2008/0218611 A1 | 9/2008 | Parulski et al. |
| 2008/0222558 A1 | 9/2008 | Cho et al. |
| 2008/0284855 A1 | 11/2008 | Umeyama et al. |
| 2008/0297587 A1 | 12/2008 | Kurtz et al. |
| 2009/0007012 A1 | 1/2009 | Mandic et al. |
| 2009/0009612 A1 | 1/2009 | Tico et al. |
| 2009/0021600 A1 | 1/2009 | Watanabe |
| 2009/0027539 A1 | 1/2009 | Kunou |
| 2009/0040332 A1 | 2/2009 | Yoshino et al. |
| 2009/0051783 A1 | 2/2009 | Kim et al. |
| 2009/0102933 A1 | 4/2009 | Harris et al. |
| 2009/0132963 A1 | 5/2009 | Mahesh et al. |
| 2009/0244318 A1 | 10/2009 | Makii |
| 2009/0263044 A1 | 10/2009 | Imagawa et al. |
| 2009/0315671 A1 | 12/2009 | Gocho et al. |
| 2010/0020221 A1 | 1/2010 | Tupman et al. |
| 2010/0020222 A1 | 1/2010 | Jones et al. |
| 2010/0097322 A1 | 4/2010 | Hu et al. |
| 2010/0123737 A1 | 5/2010 | Williamson et al. |
| 2010/0141609 A1 | 6/2010 | Frisbee |
| 2010/0162160 A1 | 6/2010 | Stallings et al. |
| 2010/0164893 A1 | 7/2010 | Shin et al. |
| 2010/0185970 A1 | 7/2010 | Benenson |
| 2010/0194931 A1 | 8/2010 | Kawaguchi et al. |
| 2010/0208122 A1 | 8/2010 | Yumiki |
| 2010/0231777 A1 | 9/2010 | Shintani et al. |
| 2010/0232703 A1 | 9/2010 | Aiso |
| 2010/0232704 A1 | 9/2010 | Thorn |
| 2010/0238327 A1 | 9/2010 | Griffith et al. |
| 2010/0281374 A1 | 11/2010 | Schulz et al. |
| 2010/0283743 A1 | 11/2010 | Coddington |
| 2010/0289825 A1 | 11/2010 | Shin et al. |
| 2010/0289910 A1 | 11/2010 | Kamshilin et al. |
| 2010/0306702 A1 | 12/2010 | Warner et al. |
| 2011/0008033 A1 | 1/2011 | Ichimiya et al. |
| 2011/0013049 A1 | 1/2011 | Thörn |
| 2011/0018970 A1 | 1/2011 | Wakabayashi |
| 2011/0019058 A1 | 1/2011 | Sakai et al. |
| 2011/0019655 A1 | 1/2011 | Hakola |
| 2011/0058052 A1 | 3/2011 | Bolton et al. |
| 2011/0074710 A1 | 3/2011 | Weeldreyer et al. |
| 2011/0074830 A1 | 3/2011 | Rapp et al. |
| 2011/0085016 A1 | 4/2011 | Kristiansen et al. |
| 2011/0109581 A1 | 5/2011 | Ozawa et al. |
| 2011/0115932 A1 | 5/2011 | Shin et al. |
| 2011/0138332 A1 | 6/2011 | Miyagawa |
| 2011/0157379 A1 | 6/2011 | Kimura |
| 2011/0187879 A1 | 8/2011 | Ochiai |
| 2011/0199495 A1 | 8/2011 | Laberge et al. |
| 2011/0234853 A1 | 9/2011 | Hayashi et al. |
| 2011/0242369 A1 | 10/2011 | Misawa et al. |
| 2011/0296163 A1 | 12/2011 | Abernethy et al. |
| 2012/0002898 A1 | 1/2012 | Côté et al. |
| 2012/0056997 A1 | 3/2012 | Jang |
| 2012/0069206 A1 | 3/2012 | Hsieh |
| 2012/0105579 A1 | 5/2012 | Jeon et al. |
| 2012/0120277 A1 | 5/2012 | Tsai et al. |
| 2012/0133797 A1 | 5/2012 | Sato et al. |
| 2012/0162242 A1 | 6/2012 | Amano et al. |
| 2012/0169776 A1 | 7/2012 | Rissa et al. |
| 2012/0188394 A1 | 7/2012 | Park et al. |
| 2012/0194559 A1 | 8/2012 | Lim |
| 2012/0218305 A1 | 8/2012 | Patterson et al. |
| 2012/0243802 A1 | 9/2012 | Fintel et al. |
| 2012/0249853 A1 | 10/2012 | Krolczyk et al. |
| 2012/0320141 A1 | 12/2012 | Bowen et al. |
| 2013/0019174 A1 | 1/2013 | Gil et al. |
| 2013/0019182 A1 | 1/2013 | Gil et al. |
| 2013/0038546 A1 | 2/2013 | Mineo |
| 2013/0038771 A1 | 2/2013 | Brunner et al. |
| 2013/0055119 A1 | 2/2013 | Luong |
| 2013/0057472 A1 | 3/2013 | Dizac et al. |
| 2013/0076908 A1 | 3/2013 | Bratton et al. |
| 2013/0083222 A1 | 4/2013 | Matsuzawa et al. |
| 2013/0088413 A1 | 4/2013 | Raffle et al. |
| 2013/0093904 A1 | 4/2013 | Wagner et al. |
| 2013/0141362 A1 | 6/2013 | Asanuma et al. |
| 2013/0155308 A1 | 6/2013 | Wu et al. |
| 2013/0165186 A1 | 6/2013 | Choi |
| 2013/0208136 A1 | 8/2013 | Takatsuka et al. |
| 2013/0219340 A1 | 8/2013 | Linge |
| 2013/0246948 A1 | 9/2013 | Chen et al. |
| 2013/0265311 A1 | 10/2013 | Na et al. |
| 2013/0265467 A1 | 10/2013 | Matsuzawa et al. |
| 2013/0278710 A1 | 10/2013 | Mock |
| 2013/0286251 A1 | 10/2013 | Wood et al. |
| 2013/0329074 A1 | 12/2013 | Zhang et al. |
| 2013/0346916 A1 | 12/2013 | Williamson et al. |
| 2014/0007019 A1 | 1/2014 | Saukko et al. |
| 2014/0007021 A1 | 1/2014 | Akiyama et al. |
| 2014/0022399 A1 | 1/2014 | Rashid et al. |
| 2014/0026099 A1 | 1/2014 | Andersson Reimer et al. |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033100 A1 | 1/2014 | Noda et al. |
| 2014/0037178 A1 | 2/2014 | Park |
| 2014/0043368 A1 | 2/2014 | Yu |
| 2014/0047389 A1 | 2/2014 | Aarabi |
| 2014/0063175 A1 | 3/2014 | Jafry et al. |
| 2014/0063313 A1 | 3/2014 | Choi et al. |
| 2014/0071325 A1 | 3/2014 | Kawahara et al. |
| 2014/0078371 A1 | 3/2014 | Kinoshita |
| 2014/0092100 A1 | 4/2014 | Chen |
| 2014/0104449 A1 | 4/2014 | Masarik et al. |
| 2014/0118563 A1 | 5/2014 | Mehta et al. |
| 2014/0123063 A1 | 5/2014 | Hwang et al. |
| 2014/0132735 A1 | 5/2014 | Lee et al. |
| 2014/0143678 A1 | 5/2014 | Mistry et al. |
| 2014/0152886 A1 | 6/2014 | Morgan-mar et al. |
| 2014/0157200 A1 | 6/2014 | Jeon |
| 2014/0160231 A1 | 6/2014 | Middleton et al. |
| 2014/0160304 A1 | 6/2014 | Galor et al. |
| 2014/0184524 A1 | 7/2014 | Schiefer et al. |
| 2014/0192212 A1 | 7/2014 | He et al. |
| 2014/0192233 A1 | 7/2014 | Kakkori et al. |
| 2014/0201672 A1 | 7/2014 | Borzello et al. |
| 2014/0204229 A1 | 7/2014 | Leung et al. |
| 2014/0218599 A1 | 8/2014 | Nakamura et al. |
| 2014/0232838 A1 | 8/2014 | Jorgensen et al. |
| 2014/0240531 A1 | 8/2014 | Nakai et al. |
| 2014/0240577 A1 | 8/2014 | Masugi |
| 2014/0282223 A1 | 9/2014 | Bastien et al. |
| 2014/0300635 A1 | 10/2014 | Suzuki |
| 2014/0310598 A1 | 10/2014 | Sprague et al. |
| 2014/0327639 A1 | 11/2014 | Papakipos et al. |
| 2014/0337748 A1 | 11/2014 | Lee |
| 2014/0351753 A1 | 11/2014 | Shin et al. |
| 2014/0359438 A1 | 12/2014 | Matsuki |
| 2014/0368601 A1 | 12/2014 | Decharms |
| 2014/0368719 A1 | 12/2014 | Kaneko et al. |
| 2014/0372856 A1 | 12/2014 | Radakovitz et al. |
| 2014/0375862 A1 | 12/2014 | Kim et al. |
| 2015/0022649 A1 | 1/2015 | Koppal |
| 2015/0022674 A1 | 1/2015 | Koss et al. |
| 2015/0049233 A1 | 2/2015 | Choi |
| 2015/0085174 A1 | 3/2015 | Shabtay et al. |
| 2015/0092077 A1 | 4/2015 | Feder et al. |
| 2015/0116353 A1 | 4/2015 | Miura et al. |
| 2015/0116448 A1 | 4/2015 | Gottlieb |
| 2015/0135234 A1 | 5/2015 | Hall |

(56) References Cited

U.S. PATENT DOCUMENTS

| | | |
|---|---|---|
| 2015/0138079 A1 | 5/2015 | Lannsjö |
| 2015/0145950 A1 | 5/2015 | Murphy et al. |
| 2015/0146079 A1 | 5/2015 | Kim |
| 2015/0150141 A1 | 5/2015 | Szymanski et al. |
| 2015/0154448 A1 | 6/2015 | Murayama et al. |
| 2015/0181135 A1 | 6/2015 | Shimosato |
| 2015/0189162 A1 | 7/2015 | Kuo et al. |
| 2015/0212723 A1 | 7/2015 | Lim et al. |
| 2015/0220249 A1 | 8/2015 | Snibbe et al. |
| 2015/0248198 A1 | 9/2015 | Somlai-fisher et al. |
| 2015/0249775 A1 | 9/2015 | Jacumet |
| 2015/0249785 A1 | 9/2015 | Mehta et al. |
| 2015/0254855 A1 | 9/2015 | Patankar et al. |
| 2015/0256749 A1 | 9/2015 | Frey et al. |
| 2015/0264202 A1 | 9/2015 | Pawlowski |
| 2015/0289104 A1 | 10/2015 | Jung et al. |
| 2015/0297185 A1 | 10/2015 | Mccormack et al. |
| 2015/0312185 A1 | 10/2015 | Langholz et al. |
| 2015/0341536 A1 | 11/2015 | Huang et al. |
| 2015/0346994 A1 | 12/2015 | Chanyontpatanakul |
| 2015/0350533 A1 | 12/2015 | Harris et al. |
| 2015/0362998 A1 | 12/2015 | Park et al. |
| 2015/0370458 A1 | 12/2015 | Chen |
| 2015/0378600 A1 | 12/2015 | Sloan et al. |
| 2016/0012567 A1 | 1/2016 | Siddiqui et al. |
| 2016/0026371 A1 | 1/2016 | Lu et al. |
| 2016/0044236 A1 | 2/2016 | Matsuzawa et al. |
| 2016/0048598 A1 | 2/2016 | Fujioka et al. |
| 2016/0048599 A1 | 2/2016 | Fujioka et al. |
| 2016/0048725 A1 | 2/2016 | Holz et al. |
| 2016/0048903 A1 | 2/2016 | Fujioka et al. |
| 2016/0050351 A1 | 2/2016 | Lee et al. |
| 2016/0050446 A1 | 2/2016 | Fujioka et al. |
| 2016/0065832 A1 | 3/2016 | Kim et al. |
| 2016/0077725 A1 | 3/2016 | Maeda |
| 2016/0080639 A1 | 3/2016 | Choi et al. |
| 2016/0080657 A1 | 3/2016 | Chuang et al. |
| 2016/0088280 A1 | 3/2016 | Sadi et al. |
| 2016/0117829 A1 | 4/2016 | Yoon et al. |
| 2016/0127636 A1 | 5/2016 | Ito et al. |
| 2016/0132201 A1 | 5/2016 | Shaw et al. |
| 2016/0148384 A1 | 5/2016 | Bud et al. |
| 2016/0162039 A1 | 6/2016 | Eilat et al. |
| 2016/0173869 A1 | 6/2016 | Srikanth et al. |
| 2016/0188181 A1 | 6/2016 | Smith |
| 2016/0212319 A1 | 7/2016 | Harris et al. |
| 2016/0219217 A1 | 7/2016 | Williams et al. |
| 2016/0241793 A1 | 8/2016 | Shanmugavadivelu et al. |
| 2016/0247288 A1 | 8/2016 | Omori et al. |
| 2016/0316147 A1 | 10/2016 | Bernstein et al. |
| 2016/0320923 A1 | 11/2016 | Hossain et al. |
| 2016/0337570 A1 | 11/2016 | Tan et al. |
| 2016/0337582 A1 | 11/2016 | Shimauchi et al. |
| 2016/0357353 A1 | 12/2016 | Miura et al. |
| 2016/0360116 A1 | 12/2016 | Penha et al. |
| 2016/0364089 A1 | 12/2016 | Blackman et al. |
| 2016/0373650 A1 | 12/2016 | Kim et al. |
| 2017/0006210 A1 | 1/2017 | Dye et al. |
| 2017/0013179 A1 | 1/2017 | Kang et al. |
| 2017/0024872 A1 | 1/2017 | Olsson et al. |
| 2017/0034449 A1 | 2/2017 | Eum et al. |
| 2017/0039686 A1 | 2/2017 | Miura et al. |
| 2017/0041677 A1 | 2/2017 | Anderson et al. |
| 2017/0048450 A1 | 2/2017 | Lee et al. |
| 2017/0048461 A1 | 2/2017 | Lee et al. |
| 2017/0048494 A1 | 2/2017 | Boyle et al. |
| 2017/0094019 A1 | 3/2017 | Ahmed et al. |
| 2017/0109912 A1 | 4/2017 | Lee et al. |
| 2017/0111567 A1 | 4/2017 | Pila |
| 2017/0186162 A1 | 6/2017 | Mihic et al. |
| 2017/0192627 A1 | 7/2017 | Agnoli et al. |
| 2017/0230585 A1 | 8/2017 | Nash et al. |
| 2017/0237888 A1 | 8/2017 | Harris et al. |
| 2017/0244896 A1 | 8/2017 | Chien et al. |
| 2017/0257596 A1 | 9/2017 | Murata et al. |
| 2017/0264817 A1 | 9/2017 | Yan et al. |
| 2017/0302840 A1 | 10/2017 | Hasinoff et al. |
| 2017/0324784 A1 | 11/2017 | Taine et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2017/0366729 A1 | 12/2017 | Itoh |
| 2018/0077332 A1 | 3/2018 | Shimura et al. |
| 2018/0096487 A1 | 4/2018 | Nash et al. |
| 2018/0107367 A1 | 4/2018 | Rinneberg et al. |
| 2018/0109722 A1 | 4/2018 | Laroia et al. |
| 2018/0113577 A1 | 4/2018 | Burns et al. |
| 2018/0120661 A1 | 5/2018 | Kilgore et al. |
| 2018/0124299 A1 | 5/2018 | Brook |
| 2018/0129224 A1 | 5/2018 | Hur |
| 2018/0131876 A1 | 5/2018 | Bernstein et al. |
| 2018/0146132 A1 | 5/2018 | Manzari et al. |
| 2018/0152611 A1 | 5/2018 | Li et al. |
| 2018/0213144 A1 | 7/2018 | Kim et al. |
| 2018/0213161 A1 | 7/2018 | Kanda et al. |
| 2018/0227479 A1 | 8/2018 | Parameswaran et al. |
| 2018/0227482 A1 | 8/2018 | Holzer et al. |
| 2018/0227505 A1 | 8/2018 | Baltz et al. |
| 2018/0234608 A1 | 8/2018 | Sudo et al. |
| 2018/0262677 A1 | 9/2018 | Dye et al. |
| 2018/0267703 A1 | 9/2018 | Kamimaru et al. |
| 2018/0270420 A1 | 9/2018 | Lee et al. |
| 2018/0278823 A1 | 9/2018 | Horesh |
| 2018/0284979 A1 | 10/2018 | Choi et al. |
| 2018/0288310 A1 | 10/2018 | Goldenberg |
| 2018/0302551 A1 | 10/2018 | Yamajo et al. |
| 2018/0302568 A1 | 10/2018 | Kim et al. |
| 2018/0308282 A1 | 10/2018 | Yokoi |
| 2018/0352165 A1 | 12/2018 | Zhen et al. |
| 2018/0376122 A1 | 12/2018 | Park et al. |
| 2019/0028650 A1 | 1/2019 | Bernstein et al. |
| 2019/0029513 A1 | 1/2019 | Gunnerson et al. |
| 2019/0082097 A1 | 3/2019 | Manzari et al. |
| 2019/0121216 A1 | 4/2019 | Shabtay et al. |
| 2019/0149706 A1 | 5/2019 | Rivard et al. |
| 2019/0174054 A1 | 6/2019 | Srivastava et al. |
| 2019/0199926 A1 | 6/2019 | An et al. |
| 2019/0205861 A1 | 7/2019 | Bace |
| 2019/0206031 A1 | 7/2019 | Kim et al. |
| 2019/0289201 A1 | 9/2019 | Nishimura et al. |
| 2020/0068121 A1 | 2/2020 | Wang |
| 2020/0082599 A1 | 3/2020 | Manzari |
| 2020/0105003 A1 | 4/2020 | Stauber et al. |
| 2020/0106952 A1 | 4/2020 | Missig et al. |
| 2020/0128191 A1 | 4/2020 | Sun et al. |
| 2020/0221020 A1 | 7/2020 | Manzari et al. |
| 2020/0242788 A1 | 7/2020 | Jacobs et al. |
| 2020/0285806 A1 | 9/2020 | Radakovitz et al. |
| 2020/0336674 A1 | 10/2020 | Bernstein et al. |
| 2020/0358963 A1 | 11/2020 | Manzari et al. |
| 2021/0191582 A1 | 6/2021 | Agnoli et al. |
| 2021/0195093 A1 | 6/2021 | Manzari et al. |
| 2022/0006946 A1 | 1/2022 | Missig et al. |
| 2022/0053142 A1 | 2/2022 | Manzari et al. |
| 2022/0070380 A1 | 3/2022 | Bernstein et al. |
| 2022/0124241 A1 | 4/2022 | Manzari et al. |
| 2022/0262022 A1 | 8/2022 | Stauber et al. |
| 2022/0276041 A1 | 9/2022 | Dryer et al. |
| 2022/0294992 A1 | 9/2022 | Manzari et al. |
| 2022/0319100 A1 | 10/2022 | Manzari et al. |

FOREIGN PATENT DOCUMENTS

| | | |
|---|---|---|
| CA | 2729392 C | 5/2017 |
| CN | 1437365 A | 8/2003 |
| CN | 1705346 A | 12/2005 |
| CN | 101243383 A | 8/2008 |
| CN | 101282422 A | 10/2008 |
| CN | 101300830 A | 11/2008 |
| CN | 101310519 A | 11/2008 |
| CN | 101364031 A | 2/2009 |
| CN | 101427574 A | 5/2009 |
| CN | 101576996 A | 11/2009 |
| CN | 101778220 A | 7/2010 |

(56) References Cited

FOREIGN PATENT DOCUMENTS

| | | |
|---|---|---|
| CN | 101883213 A | 11/2010 |
| CN | 101931691 A | 12/2010 |
| CN | 102084327 A | 6/2011 |
| CN | 102088554 A | 6/2011 |
| CN | 102272700 A | 12/2011 |
| CN | 102428655 A | 4/2012 |
| CN | 102457661 A | 5/2012 |
| CN | 102474560 A | 5/2012 |
| CN | 202309894 U | 7/2012 |
| CN | 202330968 U | 7/2012 |
| CN | 103051837 A | 4/2013 |
| CN | 103051841 A | 4/2013 |
| CN | 103297719 A | 9/2013 |
| CN | 103309602 A | 9/2013 |
| CN | 103324329 A | 9/2013 |
| CN | 103491298 A | 1/2014 |
| CN | 103685925 A | 3/2014 |
| CN | 103702039 A | 4/2014 |
| CN | 103777742 A | 5/2014 |
| CN | 103916582 A | 7/2014 |
| CN | 103970472 A | 8/2014 |
| CN | 104346080 A | 2/2015 |
| CN | 104423946 A | 3/2015 |
| CN | 104461288 A | 3/2015 |
| CN | 104813322 A | 7/2015 |
| CN | 104836947 A | 8/2015 |
| CN | 105138259 A | 12/2015 |
| CN | 105190511 A | 12/2015 |
| CN | 105229571 A | 1/2016 |
| CN | 105338256 A | 2/2016 |
| CN | 105474163 A | 4/2016 |
| CN | 105589637 A | 5/2016 |
| CN | 105620393 A | 6/2016 |
| CN | 105630290 A | 6/2016 |
| CN | 105637855 A | 6/2016 |
| CN | 105765967 A | 7/2016 |
| CN | 105981372 A | 9/2016 |
| CN | 105991915 A | 10/2016 |
| CN | 106067947 A | 11/2016 |
| CN | 106161956 A | 11/2016 |
| CN | 106210184 A | 12/2016 |
| CN | 106210550 A | 12/2016 |
| CN | 106257909 A | 12/2016 |
| CN | 106303280 A | 1/2017 |
| CN | 106341611 A | 1/2017 |
| CN | 106375662 A | 2/2017 |
| CN | 106412214 A | 2/2017 |
| CN | 106412412 A | 2/2017 |
| CN | 106412445 A | 2/2017 |
| CN | 106445219 A | 2/2017 |
| CN | 106791357 A | 5/2017 |
| CN | 106791377 A | 5/2017 |
| CN | 106921829 A | 7/2017 |
| CN | 107077274 A | 8/2017 |
| CN | 107079141 A | 8/2017 |
| CN | 107566721 A | 1/2018 |
| CN | 107580693 A | 1/2018 |
| CN | 107770448 A | 3/2018 |
| CN | 107800945 A | 3/2018 |
| CN | 107820011 A | 3/2018 |
| CN | 107924113 A | 4/2018 |
| CN | 108353126 A | 7/2018 |
| CN | 108391053 A | 8/2018 |
| CN | 108513070 A | 9/2018 |
| CN | 108549522 A | 9/2018 |
| CN | 108668083 A | 10/2018 |
| CN | 108848308 A | 11/2018 |
| CN | 108886569 A | 11/2018 |
| CN | 109005366 A | 12/2018 |
| CN | 109061985 A | 12/2018 |
| CN | 109313530 A | 2/2019 |
| CN | 109496425 A | 3/2019 |
| CN | 109639970 A | 4/2019 |
| CN | 109644229 A | 4/2019 |
| DK | 201670753 A1 | 1/2018 |
| DK | 201670755 A1 | 1/2018 |
| DK | 201670627 A1 | 2/2018 |
| EP | 0651543 A2 | 5/1995 |
| EP | 0651543 A3 | 12/1997 |
| EP | 1278099 A1 | 1/2003 |
| EP | 1953663 A1 | 8/2008 |
| EP | 0651543 B1 | 9/2008 |
| EP | 1981262 A1 | 10/2008 |
| EP | 2194508 A1 | 6/2010 |
| EP | 2430766 A2 | 3/2012 |
| EP | 2454872 A1 | 5/2012 |
| EP | 2482179 A2 | 8/2012 |
| EP | 2487613 A1 | 8/2012 |
| EP | 2487913 A2 | 8/2012 |
| EP | 2430766 A4 | 12/2012 |
| EP | 2579572 A1 | 4/2013 |
| EP | 2627073 A1 | 8/2013 |
| EP | 2640060 A1 | 9/2013 |
| EP | 2682855 A2 | 1/2014 |
| EP | 2830297 A1 | 1/2015 |
| EP | 2843530 A1 | 3/2015 |
| EP | 2950198 A1 | 12/2015 |
| EP | 2966855 A2 | 1/2016 |
| EP | 2972677 A1 | 1/2016 |
| EP | 2430766 B1 | 3/2016 |
| EP | 3008575 A1 | 4/2016 |
| EP | 3012732 A1 | 4/2016 |
| EP | 3033837 A1 | 6/2016 |
| EP | 3033837 A4 | 3/2017 |
| EP | 2194508 B1 | 12/2017 |
| EP | 3333544 A1 | 6/2018 |
| EP | 3033837 B1 | 10/2018 |
| EP | 3393119 A1 | 10/2018 |
| EP | 3135028 B1 | 1/2019 |
| EP | 2482179 B1 | 3/2019 |
| EP | 3457680 A1 | 3/2019 |
| EP | 3012732 B1 | 5/2019 |
| EP | 3008575 B1 | 7/2019 |
| EP | 3633975 A1 | 4/2020 |
| EP | 2682855 B1 | 2/2021 |
| GB | 2307383 A | 5/1997 |
| GB | 2515797 A | 1/2015 |
| GB | 2523670 A | 9/2015 |
| JP | 2-179078 A | 7/1990 |
| JP | 9-116792 A | 5/1997 |
| JP | 11-355617 A | 12/1999 |
| JP | 2000-207549 A | 7/2000 |
| JP | 2000-244905 A | 9/2000 |
| JP | 2001-298649 A | 10/2001 |
| JP | 2003-8964 A | 1/2003 |
| JP | 2003-18438 A | 1/2003 |
| JP | 2003-32597 A | 1/2003 |
| JP | 2003-241293 A | 8/2003 |
| JP | 2003-248549 A | 9/2003 |
| JP | 2004-15595 A | 1/2004 |
| JP | 2004-135074 A | 4/2004 |
| JP | 2005-31466 A | 2/2005 |
| JP | 2005-191641 A | 7/2005 |
| JP | 2005-311699 A | 11/2005 |
| JP | 3872041 B2 | 1/2007 |
| JP | 2007-28211 A | 2/2007 |
| JP | 2007-124398 A | 5/2007 |
| JP | 2008-66978 A | 3/2008 |
| JP | 2009-105919 A | 5/2009 |
| JP | 2009-212899 A | 9/2009 |
| JP | 2009-273023 A | 11/2009 |
| JP | 2009-545256 A | 12/2009 |
| JP | 2010-117444 A | 5/2010 |
| JP | 2010-119147 A | 5/2010 |
| JP | 2010-182023 A | 8/2010 |
| JP | 2010-268052 A | 11/2010 |
| JP | 2011-87167 A | 4/2011 |
| JP | 2011-91570 A | 5/2011 |
| JP | 2011-124864 A | 6/2011 |
| JP | 2011-211552 A | 10/2011 |
| JP | 2012-79302 A | 4/2012 |
| JP | 2012-89973 A | 5/2012 |
| JP | 2012-147379 A | 8/2012 |
| JP | 2013-70303 A | 4/2013 |

(56) References Cited

FOREIGN PATENT DOCUMENTS

| | | |
|---|---|---|
| JP | 2013-106289 A | 5/2013 |
| JP | 2013-546238 A | 12/2013 |
| JP | 2014-23083 A | 2/2014 |
| JP | 2014-212415 A | 11/2014 |
| JP | 2015-1716 A | 1/2015 |
| JP | 2015-5255 A | 1/2015 |
| JP | 2015-22716 A | 2/2015 |
| JP | 2015-25897 A | 2/2015 |
| JP | 2015-50713 A | 3/2015 |
| JP | 2015-76717 A | 4/2015 |
| JP | 2015-91098 A | 5/2015 |
| JP | 2015-149095 A | 8/2015 |
| JP | 2016-66978 A | 4/2016 |
| JP | 2016-72965 A | 5/2016 |
| JP | 2016-129315 A | 7/2016 |
| JP | 2016-175175 A | 10/2016 |
| JP | 2017-34474 A | 2/2017 |
| JP | 2018-121235 A | 8/2018 |
| JP | 2019-62556 A | 4/2019 |
| JP | 2020-42602 A | 3/2020 |
| JP | 6982047 B2 | 11/2021 |
| KR | 10-2012-0025872 A | 3/2012 |
| KR | 10-2012-0048397 A | 5/2012 |
| KR | 10-2012-0057696 A | 6/2012 |
| KR | 10-2012-0093322 A | 8/2012 |
| KR | 10-2013-0033445 A | 4/2013 |
| KR | 10-1341095 B1 | 12/2013 |
| KR | 10-2014-0019631 A | 2/2014 |
| KR | 10-2014-0049850 A | 4/2014 |
| KR | 10-2014-0062801 A | 5/2014 |
| KR | 10-2015-0014290 A | 2/2015 |
| KR | 10-2016-0019145 A | 2/2016 |
| KR | 10-2016-0020791 A | 2/2016 |
| KR | 10-2016-0075583 A | 6/2016 |
| KR | 10-1674959 B1 | 11/2016 |
| KR | 10-2017-0123125 A | 11/2017 |
| KR | 10-2017-0135975 A | 12/2017 |
| KR | 10-2018-0037076 A | 4/2018 |
| KR | 10-2018-0095331 A | 8/2018 |
| KR | 10-2018-0108847 A | 10/2018 |
| KR | 10-2018-0137610 A | 12/2018 |
| KR | 10-2019-0034248 A | 4/2019 |
| WO | 99/39307 A1 | 8/1999 |
| WO | 2005/043892 A1 | 5/2005 |
| WO | 2007/126707 A1 | 11/2007 |
| WO | 2008/014301 A2 | 1/2008 |
| WO | 2008/025120 A1 | 3/2008 |
| WO | 2010/059426 A2 | 5/2010 |
| WO | 2010/077048 A2 | 7/2010 |
| WO | 2010/102678 A1 | 9/2010 |
| WO | 2010/077048 A3 | 10/2010 |
| WO | 2010/131869 A2 | 11/2010 |
| WO | 2010/134275 A1 | 11/2010 |
| WO | 2011/007264 A1 | 1/2011 |
| WO | 2010/131869 A3 | 2/2011 |
| WO | 2010/059426 A3 | 5/2011 |
| WO | 2012/001947 A1 | 1/2012 |
| WO | 2012/006251 A1 | 1/2012 |
| WO | 2012/051720 A2 | 4/2012 |
| WO | 2014/066115 A1 | 5/2014 |
| WO | 2014/159779 A1 | 10/2014 |
| WO | 2014/160819 A1 | 10/2014 |
| WO | 2014/165141 A1 | 10/2014 |
| WO | 2014/200734 A1 | 12/2014 |
| WO | 2014/200798 A1 | 12/2014 |
| WO | 2015/023044 A1 | 2/2015 |
| WO | 2015/026864 A1 | 2/2015 |
| WO | 2015/080744 A1 | 6/2015 |
| WO | 2015/085042 A1 | 6/2015 |
| WO | 2015/112868 A1 | 7/2015 |
| WO | 2014/200798 A8 | 8/2015 |
| WO | 2015/183438 A1 | 12/2015 |
| WO | 2015/187494 A1 | 12/2015 |
| WO | 2015/190666 A1 | 12/2015 |
| WO | 2016/028806 A1 | 2/2016 |
| WO | 2016/028807 A1 | 2/2016 |
| WO | 2016/028808 A1 | 2/2016 |
| WO | 2016/028809 A1 | 2/2016 |
| WO | 2016/073804 A2 | 5/2016 |
| WO | 2016/073804 A3 | 7/2016 |
| WO | 2016/172619 A1 | 10/2016 |
| WO | 2016/204936 A1 | 12/2016 |
| WO | 2017/058834 A1 | 4/2017 |
| WO | 2017/218193 A1 | 12/2017 |
| WO | 2018/048838 A1 | 3/2018 |
| WO | 2018/057268 A1 | 3/2018 |
| WO | 2018/099037 A1 | 6/2018 |
| WO | 2018/144339 A2 | 8/2018 |
| WO | 2018/159864 A1 | 9/2018 |
| WO | 2019/050562 A1 | 3/2019 |

OTHER PUBLICATIONS

Advisory Action received for U.S. Appl. No. 16/144,629, dated Dec. 13, 2019, 9 pages.
Advisory Action received for U.S. Appl. No. 16/144,629, dated Jan. 6, 2021, 10 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Applicant Initiated Interview Summary received for U.S. Appl. No. 17/190,879, dated Oct. 26, 2021, 3 pages.
Applicant-Initiated Interview Summary received for U.S. Appl. No. 15/094,238, dated Apr. 24, 2020, 3 pages.
Applicant-Initiated Interview Summary received for U.S. Appl. No. 15/094,238, dated Feb. 28, 2019, 3 pages.
Applicant-Initiated Interview Summary received for U.S. Appl. No. 15/094,238, dated Jan. 22, 2020, 3 pages.
Applicant-Initiated Interview Summary received for U.S. Appl. No. 15/094,238, dated Sep. 3, 2019, 3 pages.
Applicant-Initiated Interview Summary received for U.S. Appl. No. 16/144,629, dated Jul. 2, 2020, 5 pages.
Applicant-Initiated interview Summary received for U.S. Appl. No. 16/144,629, dated Nov. 23, 2020, 3 pages.
Applicant-Initiated Interview Summary received for U.S. Appl. No. 16/528,257, dated Nov. 18, 2021, 2 pages.
Applicant-Initiated Interview Summary received for U.S. Appl. No. 16/528,941, dated Jun. 19, 2020, 3 pages.
Applicant-Initiated interview Summary received for U.S. Appl. No. 16/528,941, dated Nov. 10, 2020, 2 pages.
Applicant-Initiated Interview Summary received for U.S. Appl. No. 16/584,100, dated Feb. 19, 2020, 3 pages.
Applicant-Initiated Interview Summary received for U.S. Appl. No. 16/586,344, dated Feb. 27, 2020, 3 pages.
Applicant-Initiated Interview Summary received for U.S. Appl. No. 17/088,790, dated Jan. 14, 2022, 5 pages.
Applicant-Initiated interview Summary received for U.S. Appl. No. 17/088,790, dated Jul. 7, 2022, 4 pages.
AstroVideo,"AstroVideo enables you to use a low-cost, low-light video camera to capture astronomical images.", Available online at: https://www.coaa.co.uk/astrovideo.htm, Retrieved on Nov. 18, 2019, 5 pages.
AT&T,"Pantech C3b User Guide", At&T, Feb. 10, 2007, 14 pages.
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Certificate of Examination received for Australian Patent Application No. 2017100683, dated Jan. 16, 2018, 2 pages.
Certificate of Examination received for Australian Patent Application No. 2020100720, dated Nov. 11, 2020, 2 pages.

(56) References Cited

OTHER PUBLICATIONS

Certificate of Examination received for Australian Patent Application No. 2020104220, dated Apr. 1, 2021, 2 pages.
Corrected Notice of Allowance received for U.S. Appl. No. 14/641,251, dated Jun. 17, 2016, 2 pages.
Corrected Notice of Allowance received for U.S. Appl. No. 15/268,115, dated Apr. 13, 2018, 11 pages.
Corrected Notice of Allowance received for U.S. Appl. No. 15/268,115, dated Mar. 21, 2018, 9 pages.
Corrected Notice of Allowance received for U.S. Appl. No. 15/273,453, dated Dec. 21, 2017, 3 pages.
Corrected Notice of Allowance received for U.S. Appl. No. 15/273,453, dated Feb. 8, 2018, 2 pages.
Corrected Notice of Allowance received for U.S. Appl. No. 15/273,453, dated Nov. 27, 2017, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Corrected Notice of Allowance received for U.S. Appl. No. 15/858,175, dated Sep. 21, 2018, 2 pages.
Corrected Notice of Allowance received for U.S. Appl. No. 16/143,396, dated Jan. 30, 2020, 2 pages.
Corrected Notice of Allowance received for U.S. Appl. No. 16/144,629, dated Apr. 21, 2022, 5 pages.
Corrected Notice of Allowance received for U.S. Appl. No. 16/144,629, dated Aug. 24, 2022, 6 pages.
Corrected Notice of Allowance received for U.S. Appl. No. 16/144,629, dated Jun. 23, 2022, 5 pages.
Corrected Notice of Allowance received for U.S. Appl. No. 16/191,117, dated Dec. 9, 2019, 2 pages.
Corrected Notice of Allowance received for U.S. Appl. No. 16/191,117, dated Feb. 28, 2020, 2 pages.
Corrected Notice of Allowance received for U.S. Appl. No. 16/191,117, dated Nov. 20, 2019, 2 pages.
Corrected Notice of Allowance received for U.S. Appl. No. 16/528,257, dated Feb. 3, 2022, 2 pages.
Corrected Notice of Allowance received for U.S. Appl. No. 16/582,595, dated Apr. 7, 2020, 5 pages.
Corrected Notice of Allowance received for U.S. Appl. No. 16/582,595, dated Apr. 22, 2020, 5 pages.
Corrected Notice of Allowance received for U.S. Appl. No. 16/583,020, dated Mar. 24, 2020, 2 pages.
Corrected Notice of Allowance received for U.S. Appl. No. 16/584,044, dated Apr. 16, 2020, 3 pages.
Corrected Notice of Allowance received for U.S. Appl. No. 16/584,044, dated Jan. 29, 2020, 3 pages.
Corrected Notice of Allowance received for U.S. Appl. No. 16/584,044, dated Mar. 4, 2020, 2 pages.
Corrected Notice of Allowance received for U.S. Appl. No. 16/584,100, dated Feb. 21, 2020, 9 pages.
Corrected Notice of Allowance received for U.S. Appl. No. 16/584,693, dated Feb. 21, 2020, 15 pages.
Corrected Notice of Allowance received for U.S. Appl. No. 16/584,693, dated Mar. 4, 2020, 2 pages.
Corrected Notice of Allowance received for U.S. Appl. No. 16/584,693, dated Mar. 20, 2020, 2 pages.
Corrected Notice of Allowance received for U.S. Appl. No. 16/586,314, dated Apr. 8, 2020, 5 pages.
Corrected Notice of Allowance received for U.S. Appl. No. 16/586,314, dated Mar. 4, 2020, 3 pages.
Corrected Notice of Allowance received for U.S. Appl. No. 16/586,344, dated Apr. 7, 2020, 4 pages.
Corrected Notice of Allowance received for U.S. Appl. No. 16/586,344, dated Jan. 23, 2020, 4 pages.
Corrected Notice of Allowance received for U.S. Appl. No. 16/586,344, dated Mar. 17, 2020, 4 pages.
Corrected Notice of Allowance received for U.S. Appl. No. 16/825,879, dated Aug. 13, 2021, 2 pages.
Corrected Notice of Allowance received for U.S. Appl. No. 16/825,879, dated Jul. 23, 2021, 2 pages.
Corrected Notice of Allowance received for U.S. Appl. No. 16/825,879, dated Sep. 15, 2021, 2 pages.
Corrected Notice of Allowance received for U.S. Appl. No. 16/835,651, dated Aug. 10, 2021, 4 pages.
Corrected Notice of Allowance received for U.S. Appl. No. 16/835,651, dated Aug. 13, 2021, 2 pages.
Corrected Notice of Allowance received for U.S. Appl. No. 16/835,651, dated Jul. 28, 2021, 4 pages.
Corrected Notice of Allowance received for U.S. Appl. No. 16/835,651, dated Jun. 14, 2021, 2 pages.
Corrected Notice of Allowance received for U.S. Appl. No. 16/840,719, dated Jul. 8, 2021, 8 pages.
Corrected Notice of Allowance received for U.S. Appl. No. 16/840,719, dated May 14, 2021, 4 pages.
Corrected Notice of Allowance received for U.S. Appl. No. 17/190,879, dated Nov. 19, 2021, 2 pages.
Corrected Notice of Allowance received for U.S. Appl. No. 17/409,598, dated Jul. 7, 2022, 2 pages.
Corrected Notice of Allowance received for U.S. Appl. No. 17/409,598, dated Jul. 18, 2022, 3 pages.
Decision of Refusal received for Japanese Patent Application No. 2018-243463, dated Feb. 25, 2019, 8 pages.
Decision of Refusal received for Japanese Patent Application No. 2018-545502, dated Feb. 25, 2019, 11 pages.
Decision on Appeal received for Japanese Patent Application No. 2018-225131, mailed on Mar. 11, 2021, 5 pages.
Decision on Appeal received for Japanese Patent Application No. 2018-545502, mailed on Mar. 25, 2021, 3 pages.
Decision on Appeal received for U.S. Appl. No. 16/144,629, mailed on Jan. 18, 2022, 8 pages.
Decision to grant received for Danish Patent Application No. PA201570788, dated Jul. 10, 2017, 2 pages.
Decision to Grant received for Danish Patent Application No. PA201570791, dated Jun. 7, 2017, 2 pages.
Decision to Grant received for Danish Patent Application No. PA201670627, dated Nov. 29, 2018, 2 pages.
Decision to Grant received for Danish Patent Application No. PA201670753, dated Mar. 6, 2019, 2 pages.
Decision to Grant received for Danish Patent Application No. PA201670755, dated Mar. 6, 2019, 2 pages.
Decision to Grant received for Danish Patent Application No. PA201970593, dated Sep. 7, 2021, 2 pages.
Decision to Grant received for Danish Patent Application No. PA201970601, dated Feb. 3, 2021, 2 pages.
Decision to Grant received for Danish Patent Application No. PA201970603, dated May 21, 2021, 2 pages.
Decision to Grant received for European Patent Application No. 15712218.5, dated Jun. 7, 2018, 2 pages.
Decision to Grant received for European Patent Application No. 16784025.5, dated Nov. 11, 2021, 2 pages.
Decision to Grant received for European Patent Application No. 17809168.2, dated Oct. 21, 2021, 3 pages.
Decision to Grant received for European Patent Application No. 18176890.4, dated Jul. 9, 2020, 3 pages.
Decision to Grant received for European Patent Application No. 18183054.8, dated Jan. 21, 2021, 3 pages.
Decision to Grant received for European Patent Application No. 18209460.7, dated Apr. 9, 2021, 2 pages.
Decision to Grant received for European Patent Application No. 18214698.5, dated Sep. 10, 2020, 3 pages.
Decision to Grant received for Japanese Patent Application No. 2018-243463, dated Aug. 17, 2020, 2 pages.
Decision to Grant received for Japanese Patent Application No. 2019-203399, dated Oct. 20, 2021, 3 pages.
Decision to Grant received for Japanese Patent Application No. 2020-070418, dated Feb. 8, 2021, 3 pages.
Decision to Grant received for Japanese Patent Application No. 2020-184470, dated Jul. 1, 2021, 3 pages.
Decision to Grant received for Japanese Patent Application No. 2020-184471, dated Jul. 1, 2021, 3 pages.

(56) References Cited

OTHER PUBLICATIONS

Decision to Grant received for Japanese Patent Application No. 2021-051385, dated Jul. 8, 2021, 3 pages.
Decision to Refuse received for European Patent Application No. 17184710.6, dated Jun. 16, 2020, 9 pages.
Decision to Refuse received for Japanese Patent Application No. 2018-225131, dated Jul. 8, 2019, 6 pages.
Decision to Refuse received for Japanese Patent Application No. 2018-243463, dated Jul. 8, 2019, 5 pages.
Decision to Refuse received for Japanese Patent Application No. 2018-545502, dated Jul. 8, 2019, 5 pages.
Dialandroid, "Google Camera Lens Blur vs Galaxy S5 Selective Focus", Available online at: https://www.youtube.com/watch?v=4RJf9V85hHc, Apr. 16, 2014, 1 page.
European Search Report received for European Patent Application No. 18209460.7, dated Mar. 15, 2019, 4 pages.
European Search Report received for European Patent Application No. 18214698.5, dated Mar. 21, 2019, 5 pages.
European Search Report received for European Patent Application No. 20206196.6, dated Dec. 8, 2020, 4 pages.
European Search Report received for European Patent Application No. 20206197.4, dated Nov. 30, 2020, 4 pages.
European Search Report received for European Patent Application No. 20210373.5, dated Apr. 13, 2021, 4 pages.
European Search Report received for European Patent Application No. 21157252.4, dated Apr. 16, 2021, 4 pages.
European Search Report received for European Patent Application No. 21163791.3, dated May 6, 2021, 5 pages.
Examiner Initiated-Interview Summary received for U.S. Appl. No. 16/528,941, dated Dec. 1, 2020, 2 pages.
Examiner's Answer to Appeal Brief received for U.S. Appl. No. 16/144,629, mailed on Jul. 21, 2021, 21 pages.
Extended European Search Report (includes Supplementary European Search Report and Search Opinion) received for European Patent Application No. 17184710.6, dated Nov. 28, 2017, 10 pages.
Extended European Search Report received for European Patent Application No. 16784025.5, dated Apr. 16, 2018, 11 pages.
Extended European Search Report received for European Patent Application No. 20168009.7, dated Sep. 11, 2020, 12 pages.
Extended European Search Report received for European Patent Application No. 21202358.4, dated Dec. 6, 2021, 8 pages.
Extended Search Report received for European Patent Application 17809168.2, dated Jun. 28, 2018, 9 pages.
Feng et al., "3D Direct Human-Computer Interface Paradigm Based on Free Hand Tracking", Chinese Journal of Computers, vol. 37, No. 6, Jun. 30, 2014, 15 pages.
Final Office Action received for U.S. Appl. No. 15/094,238, dated Feb. 6, 2020, 38 pages.
Final Office Action received for U.S. Appl. No. 15/094,238, dated Jul. 1, 2019, 29 pages.
Final Office Action received for U.S. Appl. No. 15/268,115, dated Oct. 11, 2017, 48 pages.
Final Office Action received for U.S. Appl. No. 16/143,396, dated Jun. 20, 2019, 14 pages.
Final Office Action received for U.S. Appl. No. 16/144,629, dated Sep. 11, 2020, 22 pages.
Final Office Action received for U.S. Appl. No. 16/144,629, dated Sep. 18, 2019, 22 pages.
Final Office Action received for U.S. Appl. No. 16/528,941, dated Jul. 13, 2020, 15 pages.
Final Office Action received for U.S. Appl. No. 17/088,790, dated May 17, 2022, 37 pages.
Franks Tech Help,"DSLR Camera Remote Control on Android Tablet, DSLR Dashboard, Nexus 10, Canon Camera, OTG Host Cable", Available online at: https://www.youtube.com/watch?v=DD4dCVinreU, Dec. 10, 2013, 1 page.
Fuji Film, "Taking Pictures Remotely: Free iPhone/Android App Fuji Film Camera Remote", Available at <http://app.fujifilm-dsc.com/en/camera_remote/guide05.html>, Apr. 22, 2014, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson Andrews., "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review: Camera", Available Online at <https://web.archive.org/web/20180823142417/https://www.gsmarena.com/honor_10-review-1771p5.php>, Aug. 23, 2018, 11 pages.
Hall Brent, "Samsung Galaxy Phones Pro Mode (S7/S8/S9/Note 8/Note 9): When, why, & How to Use It", See Especially 3:18-5:57, Available Online at <https://www.youtube.com/watch?v=KwPxGUDRkTg>, Jun. 19, 2018, 3 pages.
Hernández Carlos, "Lens Blur in the New Google Camera App", Available online at: https://research.googleblog.com/2014/04/lens-blur-in-new-google-camera-app.html, https://ai.googleblog.com/2014/04/lens-blur-in-new-google-camera-app.html, Apr. 16, 2014, 6 pages.
Huawei Mobile Ph, "Huawei P10 Tips & Tricks: Compose Portraits with Wide Aperture KBokeh)", Available Online at <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S10 vs Huawei P30 Pro (Review/How to/Explained)", Online Available at: https://www.youtube.com/watch?v=d4r3PWioY4Y, Apr. 26, 2019, 4 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant received for Danish Patent Application No. PA201670627, dated Jun. 11, 2018, 2 pages.
Intention to Grant received for Danish Patent Application No. PA201670753, dated Oct. 29, 2018, 2 pages.
Intention to Grant received for Danish Patent Application No. PA201670755, dated Nov. 13, 2018, 2 pages.
Intention to Grant received for Danish Patent Application No. PA201970593, dated Apr. 13, 2021, 2 pages.
Intention to Grant received for Danish Patent Application No. PA201970601, dated Sep. 21, 2020, 2 pages.
Intention to Grant received for Danish Patent Application No. PA201970603, dated Jan. 13, 2021, 2 pages.
Intention to Grant received for European Patent Application No. 15712218.5, dated Jan. 24, 2018, 7 pages.
Intention to Grant received for European Patent Application No. 16784025.5, dated Jul. 15, 2021, 8 pages.
Intention to Grant received for European Patent Application No. 17809168.2, dated Jun. 25, 2021, 8 pages.
Intention to Grant received for European Patent Application No. 18176890.4, dated Feb. 28, 2020, 8 pages.
Intention to Grant received for European Patent Application No. 18183054.8, dated Nov. 5, 2020, 6 pages.
Intention to Grant received for European Patent Application No. 18209460.7, dated Jan. 15, 2021, 8 pages.
Intention to Grant received for European Patent Application No. 18214698.5, dated Apr. 21, 2020, 8 pages.
Intention to Grant received for European Patent Application No. 20168009.7, dated May 17, 2022, 9 pages.
International Preliminary Report on Patentability and Written Opinion received for PCT Application No. PCT/US2016/029030, dated Nov. 2, 2017, 35 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2017/035321, dated Dec. 27, 2018, 11 Pages.

(56) References Cited

OTHER PUBLICATIONS

International Preliminary Report on Patentability received for PCT Patent Application No. PCT/US2019/049101, dated Mar. 25, 2021, 17 pages.
International Preliminary Report on Patentability received for PCT Patent Application No. PCT/US2020/031643, dated Nov. 18, 2021, 27 pages.
International Search Report & Written Opinion received for PCT Patent Application No. PCT/US2016/029030, dated Aug. 5, 2016, 37 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2017/035321, dated Oct. 6, 2017, 15 pages.
International Search Report and Written Opinion received for PCT Patent Application No. PCT/US2019/049101, dated Dec. 16, 2019, 26 pages.
International Search Report and Written Opinion received for PCT Patent Application No. PCT/US2020/031643, dated Dec. 2, 2020, 33 pages.
International Search Report and Written Opinion received for PCT Patent Application No. PCT/US2020/031643, dated Nov. 2, 2020, 34 pages.
Invitation to Pay Addition Fees received for PCT Patent Application No. PCT/US2017/035321, dated Aug. 17, 2017, 3 pages.
Invitation to Pay Additional Fees and Partial International Search Report received for PCT Patent Application No. PCT/US2019/049101, dated Oct. 24, 2019, 17 pages.
Invitation to Pay Additional Fees received for PCT Patent Application No. PCT/US2020/031643, dated Sep. 9, 2020, 30 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Non-Final Office Action received for U.S. Appl. No. 16/528,257, dated Jul. 30, 2021, 12 pages.
Non-Final Office Action received for U.S. Appl. No. 12/508,534, dated Dec. 30, 2011, 11 pages.
Non-Final Office Action received for U.S. Appl. No. 15/094,238, dated Nov. 29, 2018, 24 pages.
Non-Final Office Action received for U.S. Appl. No. 15/094,238, dated Oct. 1, 2019, 32 pages.
Non-Final Office Action received for U.S. Appl. No. 15/136,323, dated Apr. 6, 2017, 27 pages.
Non-Final Office Action received for U.S. Appl. No. 15/268,115, dated Apr. 13, 2017, 44 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/863,369, dated Apr. 4, 2018, 15 pages.
Non-Final Office Action received for U.S. Appl. No. 16/143,396, dated Jan. 7, 2019, 13 pages.
Non-Final Office Action received for U.S. Appl. No. 16/144,629, dated Mar. 13, 2020, 24 pages.
Non-Final Office Action received for U.S. Appl. No. 16/144,629, dated Mar. 29, 2019, 18 pages.
Non-Final Office Action received for U.S. Appl. No. 16/528,941, dated Dec. 7, 2020, 15 pages.
Non-Final Office Action received for U.S. Appl. No. 16/528,941, dated Jan. 30, 2020, 14 pages.
Non-Final Office Action received for U.S. Appl. No. 16/582,595, dated Nov. 26, 2019, 17 pages.
Non-Final Office Action received for U.S. Appl. No. 16/583,020, dated Nov. 14, 2019, 9 pages.
Non-Final Office Action received for U.S. Appl. No. 16/825,879, dated May 5, 2021, 12 pages.
Non-Final Office Action received for U.S. Appl. No. 17/088,790, dated Sep. 17, 2021, 31 pages.
Non-Final Office Action received for U.S. Appl. No. 17/190,879, dated Oct. 13, 2021, 10 pages.
Non-Final Office Action received for U.S. Appl. No. 17/479,897, dated Aug. 30, 2022, 10 pages.
Notice of Acceptance received for Australian Patent Application No. 2016252993, dated Dec. 19, 2017, 3 pages.
Notice of Acceptance received for Australian Patent Application No. 2017286130, dated Apr. 26, 2019, 3 pages.
Notice of Acceptance received for Australian Patent Application No. 2019213341, dated Aug. 25, 2020, 3 pages.
Notice of Acceptance received for Australian Patent Application No. 2019338180, dated Jun. 27, 2022, 3 pages.
Notice of Acceptance received for Australian Patent Application No. 2020260413, dated Oct. 14, 2021, 3 pages.
Notice of Acceptance received for Australian Patent Application No. 2020267151, dated Dec. 9, 2020, 3 pages.
Notice of Acceptance received for Australian Patent Application No. 2020277216, dated Mar. 15, 2021, 3 pages.
Notice of Acceptance received for Australian Patent Application No. 2021201167, dated Mar. 15, 2021, 3 pages.
Notice of Acceptance received for Australian Patent Application No. 2021203210, dated Jul. 9, 2021, 3 pages.
Notice of Acceptance received for Australian Patent Application No. 2021254567, dated Nov. 17, 2021, 3 pages.
Notice of Acceptance received for Australian Patent Application No. 2022200966, dated Feb. 25, 2022, 3 pages.
Notice of Acceptance received for Australian Patent Application No. 2022202377, dated May 11, 2022, 3 pages.
Notice of Allowance received for Brazilian Patent Application No. 112018074765-3, dated Oct. 8, 2019, 2 pages.
Notice of Allowance received for Chinese Patent Application No. 201580046237.6, dated Aug. 29, 2018, 4 pages.
Notice of Allowance received for Chinese Patent Application No. 201680023520.1, dated Jun. 28, 2019, 2 pages.
Notice of Allowance received for Chinese Patent Application No. 201710657424.9, dated May 8, 2020, 2 pages.
Notice of Allowance received for Chinese Patent Application No. 201780002533.5, dated Apr. 14, 2020, 2 pages.
Notice of Allowance received for Chinese Patent Application No. 201810566134.8, dated Apr. 7, 2020, 3 pages.
Notice of Allowance received for Chinese Patent Application No. 201810664927.3, dated Jul. 19, 2019, 2 pages.
Notice of Allowance received for Chinese Patent Application No. 201811512767.7, dated Jul. 27, 2020, 4 pages.
Notice of Allowance received for Chinese Patent Application No. 201910864074.2, dated Mar. 10, 2021, 2 pages.
Notice of Allowance received for Chinese Patent Application No. 202010287950.2, dated Mar. 22, 2022, 7 pages.
Notice of Allowance received for Chinese Patent Application No. 202010287953.6, dated Mar. 18, 2021, 7 pages.
Notice of Allowance received for Chinese Patent Application No. 202010287958.9, dated Aug. 27, 2021, 6 pages.
Notice of Allowance received for Chinese Patent Application No. 202010287961.0, dated Mar. 9, 2021, 8 pages.
Notice of Allowance received for Chinese Patent Application No. 202010287975.2, dated Mar. 1, 2021, 7 pages.
Notice of Allowance received for Chinese Patent Application No. 202010600151.6, dated Aug. 13, 2021, 2 pages.
Notice of Allowance received for Chinese Patent Application No. 202010600197.8, dated Feb. 9, 2022, 5 pages.
Notice of Allowance received for Chinese Patent Application No. 202010601484.0, dated Nov. 23, 2021, 2 pages.
Notice of Allowance received for Chinese Patent Application No. 202011480411.7, dated Feb. 18, 2022, 6 pages.
Notice of Allowance received for Japanese Patent Application No. 2018-171188, dated Jul. 16, 2019, 3 pages.
Notice of Allowance received for Japanese Patent Application No. 2021-510849, dated May 16, 2022, 4 pages.
Notice of Allowance received for Korean Patent Application No. 10-2018-7026743, dated Mar. 20, 2019, 7 pages.

(56) References Cited

OTHER PUBLICATIONS

Notice of Allowance received for Korean Patent Application No. 10-2018-7028849, dated Feb. 1, 2019, 4 pages.
Notice of Allowance received for Korean Patent Application No. 10-2018-7034780, dated Jun. 19, 2019, 4 pages.
Notice of Allowance received for Korean Patent Application No. 10-2018-7036893, dated Jun. 12, 2019, 4 pages.
Notice of Allowance received for Korean Patent Application No. 10-2019-7027042, dated Nov. 26, 2020, 4 pages.
Notice of Allowance received for Korean Patent Application No. 10-2020-0052618, dated Mar. 23, 2021, 5 pages.
Notice of Allowance received for Korean Patent Application No. 10-2020-0143726, dated Nov. 10, 2020, 5 pages.
Notice of Allowance received for Korean Patent Application No. 10-2020-0155924, dated Nov. 23, 2020, 7 pages.
Notice of Allowance received for Korean Patent Application No. 10-2021-0022053, dated Nov. 23, 2021, 5 pages.
Notice of Allowance received for Korean Patent Application No. 10-2021-7000954, dated Aug. 18, 2021, 5 pages.
Notice of Allowance received for Korean Patent Application No. 10-2021-7035687, dated Dec. 30, 2021, 5 pages.
Notice of Allowance received for Korean Patent Application No. 10-2021-7036337, dated Apr. 5, 2022, 4 pages.
Notice of Allowance received for Taiwanese Patent Application No. 104107328, dated Jun. 12, 2017, 3 pages.
Notice of Allowance received for U.S. Appl. No. 16/528,941, dated Aug. 10, 2021, 5 pages.
Notice of Allowance received for U.S. Appl. No. 16/528,941, dated May 19, 2021, 5 pages.
Notice of Allowance received for U.S. Appl. No. 14/641,251, dated May 18, 2016, 13 pages.
Notice of Allowance received for U.S. Appl. No. 15/094,238, dated Jul. 9, 2020, 19 pages.
Notice of Allowance received for U.S. Appl. No. 15/136,323, dated Feb. 28, 2018, 9 pages.
Notice of Allowance received for U.S. Appl. No. 15/136,323, dated Oct. 12, 2017, 8 pages.
Notice of Allowance received for U.S. Appl. No. 15/268,115, dated Mar. 7, 2018, 15 pages.
Notice of Allowance received for U.S. Appl. No. 15/273,453, dated Oct. 12, 2017, 11 pages.
Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/858,175, dated Jun. 1, 2018, 8 pages.
Notice of Allowance received for U.S. Appl. No. 15/858,175, dated Sep. 12, 2018, 8 pages.
Notice of Allowance received for U.S. Appl. No. 15/863,369, dated Jun. 28, 2018, 8 pages.
Notice of Allowance received for U.S. Appl. No. 15/975,581, dated Oct. 3, 2018, 25 pages.
Notice of Allowance received for U.S. Appl. No. 16/143,396, dated Nov. 27, 2019, 8 pages.
Notice of Allowance received for U.S. Appl. No. 16/144,629, dated Apr. 7, 2022, 8 pages.
Notice of Allowance received for U.S. Appl. No. 16/144,629, dated Jul. 25, 2022, 10 pages.
Notice of Allowance received for U.S. Appl. No. 16/191,117, dated Oct. 29, 2019, 9 pages.
Notice of Allowance received for U.S. Appl. No. 16/528,257, dated Jan. 14, 2022, 10 pages.
Notice of Allowance received for U.S. Appl. No. 16/582,595, dated Mar. 20, 2020, 9 pages.
Notice of Allowance received for U.S. Appl. No. 16/583,020, dated Apr. 1, 2020, 5 pages.
Notice of Allowance received for U.S. Appl. No. 16/583,020, dated Feb. 28, 2020, 5 pages.
Notice of Allowance received for U.S. Appl. No. 16/584,044, dated Dec. 11, 2019, 15 pages.
Notice of Allowance received for U.S. Appl. No. 16/584,044, dated Mar. 30, 2020, 16 pages.
Notice of Allowance received for U.S. Appl. No. 16/584,044, dated Nov. 14, 2019, 13 pages.
Notice of Allowance received for U.S. Appl. No. 16/584,100, dated Apr. 8, 2020, 12 pages.
Notice of Allowance received for U.S. Appl. No. 16/584,100, dated Jan. 14, 2020, 13 pages.
Notice of Allowance received for U.S. Appl. No. 16/584,693, dated Jan. 15, 2020, 15 pages.
Notice of Allowance received for U.S. Appl. No. 16/584,693, dated May 4, 2020, 12 pages.
Notice of Allowance received for U.S. Appl. No. 16/586,314, dated Apr. 1, 2020, 8 pages.
Notice of Allowance received for U.S. Appl. No. 16/586,314, dated Jan. 9, 2020, 10 pages.
Notice of Allowance received for U.S. Appl. No. 16/586,344, dated Dec. 16, 2019, 12 pages.
Notice of Allowance received for U.S. Appl. No. 16/586,344, dated Mar. 27, 2020, 12 pages.
Notice of Allowance received for U.S. Appl. No. 16/825,879, dated Jul. 13, 2021, 9 pages.
Notice of Allowance received for U.S. Appl. No. 16/825,879, dated Sep. 28, 2021, 8 pages.
Notice of Allowance received for U.S. Appl. No. 16/835,651, dated Jul. 23, 2021, 8 pages.
Notice of Allowance received for U.S. Appl. No. 16/835,651, dated Jun. 1, 2021, 10 pages.
Notice of Allowance received for U.S. Appl. No. 16/835,651, dated Nov. 10, 2021, 9 pages.
Notice of Allowance received for U.S. Appl. No. 16/840,719, dated Apr. 30, 2021, 13 pages.
Notice of Allowance received for U.S. Appl. No. 17/190,879, dated Nov. 10, 2021, 8 pages.
Notice of Allowance received for U.S. Appl. No. 17/409,598, dated Jun. 21, 2022, 12 pages.
Notice of Allowance received for U.S. Appl. No. 17/409,598, dated Sep. 14, 2022, 9 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action Received for Australian Patent Application No. 2017286130, dated Jan. 21, 2019, 4 pages.
Office Action received for Australian Patent Application No. 2019213341, dated Jun. 30, 2020, 6 pages.
Office Action received for Australian Patent Application No. 2019338180, dated Feb. 18, 2022, 3 pages.
Office Action received for Australian Patent Application No. 2020100720, dated Jul. 9, 2020, 7 pages.
Office Action received for Australian Patent Application No. 2020100720, dated Sep. 1, 2020, 5 pages.
Office Action received for Australian Patent Application No. 2020260413, dated Jun. 24, 2021, 2 pages.
Office Action received for Australian Patent Application No. 2020277216, dated Dec. 17, 2020, 5 pages.
Office Action received for Chinese Patent Application No. 201580046237.6, dated Feb. 6, 2018, 10 pages.
Office Action received for Chinese Patent Application No. 201680023520.1, dated Jan. 3, 2019, 10 pages.

(56) References Cited

OTHER PUBLICATIONS

Office Action received for Chinese Patent Application No. 201710657424.9, dated Sep. 17, 2019, 23 pages.
Office Action received for Chinese Patent Application No. 201780002533.5, dated Apr. 25, 2019, 17 pages.
Office Action received for Chinese Patent Application No. 201780002533.5, dated Feb. 3, 2020, 6 pages.
Office Action received for Chinese Patent Application No. 201780002533.5, dated Sep. 26, 2019, 21 pages.
Office Action received for Chinese Patent Application No. 201810566134.8, dated Aug. 13, 2019, 14 pages.
Office Action received for Chinese Patent Application No. 201810664927.3, dated Mar. 28, 2019, 11 pages.
Office Action received for Chinese Patent Application No. 201811446867.4, dated Dec. 31, 2019, 12 pages.
Office Action received for Chinese Patent Application No. 201811446867.4, dated May 6, 2020, 10 pages.
Office Action received for Chinese Patent Application No. 201811446867.4, dated Sep. 8, 2020, 9 pages.
Office Action received for Chinese Patent Application No. 201811512767.7, dated Dec. 20, 2019, 14 pages.
Office Action received for Chinese Patent Application No. 201811512767.7, dated Jun. 4, 2020, 6 pages.
Office Action received for Chinese Patent Application No. 201910864074.2, dated Sep. 23, 2020, 11 pages.
Office Action received for Chinese Patent Application No. 202010287950.2, dated Aug. 10, 2021, 12 pages.
Office Action received for Chinese Patent Application No. 202010287950.2, dated Feb. 20, 2021, 22 pages.
Office Action received for Chinese Patent Application No. 202010287950.2, dated Nov. 19, 2021, 8 pages.
Office Action received for Chinese Patent Application No. 202010287953.6, dated Jan. 14, 2021, 14 pages.
Office Action received for Chinese Patent Application No. 202010287958.9, dated Jan. 5, 2021, 16 pages.
Office Action received for Chinese Patent Application No. 202010287961.0, dated Dec. 30, 2020, 16 pages.
Office Action received for Chinese Patent Application No. 202010287975.2, dated Dec. 30, 2020, 17 pages.
Office Action received for Chinese Patent Application No. 202010600151.6, dated Apr. 29, 2021, 11 pages.
Office Action received for Chinese Patent Application No. 202010600197.8, dated Jul. 2, 2021, 14 pages.
Office Action received for Chinese Patent Application No. 202010601484.0, dated Jun. 3, 2021, 13 pages.
Office Action received for Chinese Patent Application No. 202011480411.7, dated Aug. 2, 2021, 12 pages.
Office Action received for Chinese Patent Application No. 202011480411.7, dated Jan. 12, 2022, 7 pages.
Office Action received for Chinese Patent Application No. 202110766668.7, dated Feb. 16, 2022, 12 pages.
Office Action received for Danish Patent Application No. PA201570788, dated Apr. 8, 2016, 11 pages.
Office Action received for Danish Patent Application No. PA201570788, dated Sep. 13, 2016, 3 pages.
Office action received for Danish Patent Application No. PA201570791, dated Apr. 6, 2016, 12 pages.
Office action received for Danish Patent Application No. PA201570791, dated Sep. 6, 2016, 4 pages.
Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017., 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Office Action received for Danish Patent Application No. PA201870623, dated Jan. 30, 2020, 2 pages.
Office Action received for Danish Patent Application No. PA201870623, dated Jul. 12, 2019, 4 pages.
Office Action received for Danish Patent Application No. PA201970592, dated Mar. 2, 2020, 5 pages.
Office Action received for Danish Patent Application No. PA201970592, dated Oct. 26, 2020, 5 pages.
Office Action received for Danish Patent Application No. PA201970593, dated Apr. 16, 2020, 2 pages.
Office Action received for Danish Patent Application No. PA201970593, dated Feb. 2, 2021, 2 pages.
Office Action received for Danish Patent Application No. PA201970593, dated Mar. 10, 2020, 4 pages.
Office Action received for Danish Patent Application No. PA201970595, dated Mar. 10, 2020, 4 pages.
Office Action received for Danish Patent Application No. PA201970600, dated Mar. 9, 2020, 5 pages.
Office Action received for Danish Patent Application No. PA201970601, dated Aug. 13, 2020, 3 pages.
Office Action received for Danish Patent Application No. PA201970601, dated Jan. 31, 2020, 3 pages.
Office Action received for Danish Patent Application No. PA201970601, dated Nov. 11, 2019, 8 pages.
Office Action received for Danish Patent Application No. PA201970603, dated Nov. 4, 2020, 3 pages.
Office Action received for Danish Patent Application No. PA201970605, dated Mar. 10, 2020, 5 pages.
Office Action received for European Patent Application 17809168.2, dated Jan. 7, 2020, 5 pages.
Office Action received for European Patent Application 17809168.2, dated Oct. 8, 2020, 4 pages.
Office Action received for European Patent Application No. 15712218.5, dated Aug. 3, 2017, 4 pages.
Office Action received for European Patent Application No. 16784025.5, dated Jul. 17, 2020, 6 pages.
Office Action received for European Patent Application No. 17184710.6, dated Dec. 21, 2018, 7 pages.
Office Action received for European Patent Application No. 18176890.4, dated Oct. 16, 2018, 8 pages.
Office Action received for European Patent Application No. 18183054.8, dated Feb. 24, 2020, 6 pages.
Office Action received for European Patent Application No. 18183054.8, dated Nov. 16, 2018, 8 Pages.
Office Action received for European Patent Application No. 18209460.7, dated Apr. 10, 2019, 7 pages.
Office Action received for European Patent Application No. 18209460.7, dated Apr. 21, 2020, 5 pages.
Office Action received for European Patent Application No. 18214698.5, dated Apr. 2, 2019, 8 pages.
Office Action received for European Patent Application No. 20168009.7, dated Apr. 20, 2021, 6 pages.
Office Action received for European Patent Application No. 20168009.7, dated Sep. 13, 2021, 8 pages.
Office Action received for European Patent Application No. 20206196.6, dated Aug. 10, 2022, 13 pages.
Office Action received for European Patent Application No. 20206196.6, dated Jan. 13, 2021, 10 pages.
Office Action received for European Patent Application No. 20206197.4, dated Aug. 27, 2021, 6 pages.
Office Action received for European Patent Application No. 20206197.4, dated Jan. 12, 2021, 9 pages.

(56) References Cited

OTHER PUBLICATIONS

Office Action received for European Patent Application No. 20206197.4, dated Mar. 18, 2022, 7 pages.
Office Action received for European Patent Application No. 20210373.5, dated Dec. 9, 2021, 7 pages.
Office Action received for European Patent Application No. 20210373.5, dated May 10, 2021, 9 pages.
Office Action received for European Patent Application No. 20210373.5, dated May 31, 2022, 5 pages.
Office Action received for European Patent Application No. 21157252.4, dated Apr. 23, 2021, 8 pages.
Office Action received for European Patent Application No. 21163791.3, dated Jun. 2, 2021, 8 pages.
Office Action received for Indian Patent Application No. 201817024430, dated Sep. 27, 2021, 8 pages.
Office Action received for Indian Patent Application No. 201818025015, dated Feb. 4, 2022, 7 pages.
Office Action received for Indian Patent Application No. 201818045872, dated Oct. 13, 2021, 7 pages.
Office Action received for Indian Patent Application No. 201818046896, dated Feb. 2, 2022, 7 pages.
Office Action received for Indian Patent Application No. 202118021941, dated Mar. 23, 2022, 5 pages.
Office Action received for Indian Patent Application No. 202118028159, dated Jun. 27, 2022, 6 pages.
Office Action received for Japanese Patent Application No. 2018-225131, dated Aug. 17, 2020, 21 pages.
Office Action received for Japanese Patent Application No. 2018-225131, dated Mar. 4, 2019, 10 pages.
Office Action received for Japanese Patent Application No. 2018-545502, dated Aug. 17, 2020, 14 pages.
Office Action received for Japanese Patent Application No. 2019-203399, dated Aug. 10, 2021, 4 pages.
Office Action received for Japanese Patent Application No. 2020-070418, dated Aug. 3, 2020, 22 pages.
Office Action received for Japanese Patent Application No. 2020-184470, dated May 10, 2021, 3 pages.
Office Action received for Japanese Patent Application No. 2020-184471, dated May 10, 2021, 3 pages.
Office Action received for Japanese Patent Application No. 2021-565919, dated Jun. 13, 2022, 4 pages.
Office Action received for Korean Patent Application No. 10-2018-7026743, dated Jan. 17, 2019, 5 pages.
Office Action received for Korean Patent Application No. 10-2018-7034780, dated Apr. 4, 2019, 11 pages.
Office Action received for Korean Patent Application No. 10-2018-7036893, dated Apr. 9, 2019, 6 pages.
Office Action received for Korean Patent Application No. 10-2019-7027042, dated May 13, 2020, 6 pages.
Office Action received for Korean Patent Application No. 10-2020-0052618, dated Aug. 18, 2020, 11 pages.
Office Action received for Korean Patent Application No. 10-2021-0022053, dated Mar. 1, 2021, 11 pages.
Office Action received for Korean Patent Application No. 10-2021-7000954, dated Jan. 28, 2021, 5 pages.
Office Action received for Korean Patent Application No. 10-2021-7036337, dated Dec. 8, 2021, 6 pages.
Office Action received for Korean Patent Application No. 10-2022-7010505, dated Jun. 14, 2022, 5 pages.
Office Action received for Korean Patent Application No. 10-2022-7023077, dated Jul. 25, 2022, 6 pages.
Office Action received for Taiwanese Patent Application No. 104107328, dated Dec. 28, 2016, 4 pages.
Osxdaily, "How to Zoom the Camera on iPhone", Available Online at: https://osxdaily.com/2012/04/18/zoom-camera-iphone/, Apr. 18, 2012, 6 pages.
Peters, "Long-Awaited iPhone Goes on Sale", nytimes.com, Jun. 29, 2007, 3 pages.
Playmemories Camera Apps,"PlayMemories Camera Apps Help Guide", available at <https://www.playmemoriescameraapps.com/portal/manual/IS9104-NPIA09014_00-F00002/en/index.html>, 2012, 3 pages.
Pre-Appeal Review Report received for Japanese Patent Application No. 2018-225131, mailed on Jan. 24, 2020, 8 pages.
Pre-Appeal Review Report received for Japanese Patent Application No. 2018-545502, mailed on Jan. 24, 2020, 8 pages.
Record of Oral Hearing received for U.S. Appl. No. 16/144,629, mailed on Jan. 28, 2022, 13 pages.
Remote Shot for Smartwatch 2, Available online at:—https://play.google.com/store/apps/details?id=net.watea.sw2.rshot&hl=en, Nov. 21, 2017, 3 pages.
Result of Consultation received for European Patent Application No. 17184710.6, dated Feb. 21, 2020, 6 pages.
Result of Consultation received for European Patent Application No. 17184710.6, dated Feb. 28, 2020, 3 pages.
Schiffhauer Alexander, "See the Light with Night Sight", Available online at: https://www.blog.google/products/pixel/see-light-night-sight, Nov. 14, 2018, 6 pages.
Search Report and Opinion received for Danish Patent Application No. PA201870623, dated Dec. 20, 2018, 8 pages.
Search Report and Opinion received for Danish Patent Application No. PA201970592, dated Nov. 7, 2019, 8 pages.
Search Report and Opinion received for Danish Patent Application No. PA201970593, dated Oct. 29, 2019, 10 pages.
Search Report and Opinion received for Danish Patent Application No. PA201970595, dated Nov. 8, 2019, 16 pages.
Search Report and Opinion received for Danish Patent Application No. PA201970600, dated Nov. 5, 2019, 11 pages.
Search Report and Opinion received for Danish Patent Application No. PA201970603, dated Nov. 15, 2019, 9 pages.
Search Report and Opinion received for Danish Patent Application No. PA201970605, dated Nov. 12, 2019, 10 pages.
Seberini Laurence, "Tutorial on the Lens Blur Feature for Google Camera App (Android)", Available online at: https://www.youtube.com/watch?v=GmpmhvVIkIc, Jan. 25, 2015, 1 page.
Shaw et al., "Skills for Closeups Photography", Watson-Guptill Publications, Nov. 1999, 5 pages.
shiftdelete.net,"OPPO Reno 10x Zoom Ön İnceleme—Huawei P30 Pro'ya rakip mi geliyor?", Available online at <https://www.youtube.com/watch?v=ev2wlUztdrg>, See especially 5:34-6:05., Apr. 24, 2019, 2 pages.
Smart Reviews,"Honor10 AI Camera's in Depth Review", See Especially 2:37-2:48; 6:39-6:49, Available Online at <https://www.youtube.com/watch?v=oKFqRvxeDBQ>, May 31, 2018, 2 pages.
Sony Xperia XZ3 Camera Review—The Colors, Duke, The Colors! Android Headlines—Android News & Tech News, Available online at <https://www.youtube.com/watch?v=mwpYXzWVOgw>, See especially 1:02-1:27, 2:28-2:30, Nov. 3, 2018, 3 pages.
Sony, "User Guide, Xperia XZ3, H8416/H9436/H9493", Sony Mobile Communications Inc., Retrieved from <https://www-support-downloads.sonymobile.com/h8416/userguide_EN_H8416-H9436-H9493_2_Android9.0.pdf>, See pp. 86-102., 2018, 121 pages.
Summons to Attend Oral Proceedings received for European Patent Application No. 17184710.6, mailed on Sep. 17, 2019, 7 pages.
Supplemental Notice of Allowance received for U.S. Appl. No. 15/136,323, dated Jan. 31, 2018, 6 pages.
Supplemental Notice of Allowance received for U.S. Appl. No. 15/863,369, dated Aug. 8, 2018, 4 pages.
Supplementary European Search Report received for European Patent Application No. 18176890.4, dated Sep. 20, 2018, 4 pages.
Supplementary European Search Report received for European Patent Application No. 18183054.8, dated Oct. 11, 2018, 4 pages.
Techsmith, "Snagit® 11 Snagit 11.4 Help", available at <http://assets.techsmith.com/Downloads/ua-tutorials-snagit-11/Snagit_11.pdf>, Jan. 2014, 146 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Available online at <https://www.youtube.com/watch?v=TGCKxBuiO5c>, See especially 12:40-17:25, Oct. 7, 2018, 3 pages.

(56) References Cited

OTHER PUBLICATIONS

Tico et al., "Robust method of digital image stabilization", Nokia Research Center, ISCCSP, Malta, Mar. 12-14, 2008, pp. 316-321.
Vivo India, "Bokeh Mode | Vivo V9", Available Online at <https://www.youtube.com/watch?v=B5AIHhH5Rxs>, Mar. 25, 2018, 3 pages.
Wong Richard, "Huawei Smartphone (P20/P10/P9, Mate 10/9) Wide Aperture Mode Demo", Available Online at <https://www.youtube.com/watch?v=eLY3LsZGDPA>, May 7, 2017, 2 pages.
Xeetechcare, "Samsung Galaxy S10—Super Night Mode & Ultra-Fast Charging!", Online Available at: https://www.youtube.com/watch?v=3bguV4FX6aA, Mar. 28, 2019, 4 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
Non-Final Office Action received for U.S. Appl. No. 17/041,412, dated Dec. 5, 2022, 13 pages.
Non-Final Office Action received for U.S. Appl. No. 17/510,168, dated Dec. 6, 2022, 11 pages.
Notice of Allowance received for U.S. Appl. No. 17/566,094, dated Nov. 22, 2022, 10 pages.
Office Action received for Australian Patent Application No. 2021290292, dated Nov. 24, 2022, 2 pages.
Applicant-Initiated Interview Summary received for U.S. Appl. No. 17/041,412, dated Jan. 31, 2023, 7 pages.
Corrected Notice of Allowance received for U.S. Appl. No. 17/566,094, dated Jan. 5, 2023, 2 pages.
Corrected Notice of Allowance received for U.S. Appl. No. 17/566,094, dated Jan. 23, 2023, 2 pages.
Final Office Action received for U.S. Appl. No. 17/479,897, dated Jan. 10, 2023, 15 pages.
Intention to Grant received for European Patent Application No. 20210373.5, dated Jan. 10, 2023, 12 pages.
Notice of Acceptance received for Australian Patent Application No. 2021290292, dated Jan. 23, 2023, 3 pages.
Notice of Allowance received for Brazilian Patent Application No. BR122018076550-0, dated Jan. 3, 2022, 3 pages (1 page of English Translation and 2 pages of Official Copy).
Notice of Allowance received for Korean Patent Application No. 10-2022-7010505, dated Dec. 26, 2022, 7 pages (2 pages of English Translation and 5 pages of Official Copy).
Office Action received for European Patent Application No. 19769316.1, dated Jan. 12, 2023, 10 pages.
Applicant-Initiated Interview Summary received for U.S. Appl. No. 17/479,897, dated Oct. 31, 2022, 3 pages.
Office Action received for Chinese Patent Application No. 202110766668.7, dated Sep. 15, 2022, 18 pages (9 pages of English Translation and 9 pages of Official Copy).
Office Action received for Korean Patent Application No. 10-2021-7006145, dated Oct. 12, 2022, 14 pages (6 pages of English Translation and 8 pages of Official Copy).
Drunk Beauty Flower Digital Technology, "iPhone XS Max Camera Tips, Tricks, Features and Complete Tutorial", Available online at: https://www.ixigua.com/6606874981844386308?wid_try=1, Oct. 2, 2018, 2 pages (Official Copy Only). {See communication under 37 CFR § 1.98(a) (3)}.
Corrected Notice of Allowance received for U.S. Appl. No. 17/566,094, dated Feb. 8, 2023, 2 pages.
Non-Final Office Action received for U.S. Appl. No. 17/088,790, dated Feb. 21, 2023, 39 pages.
Notice of Allowance received for U.S. Appl. No. 17/510,168, dated Feb. 13, 2023, 10 pages.
Office Action received for Indian Patent Application No. 202117009020, dated Feb. 6, 2023, 7 pages.
Office Action received for Japanese Patent Application No. 2021-187533, dated Feb. 6, 2023, 7 pages (4 pages of English Translation and 3 pages of Official Copy).
Intention to Grant received for European Patent Application No. 20168009.7, dated Oct. 31, 2022, 9 pages.
Notice of Allowance received for Korean Patent Application No. 10-2022-7023077, dated Nov. 1, 2022, 8 pages (2 pages of English Translation and 6 pages of Official Copy).
Notice of Allowance received for U.S. Appl. No. 17/732,191, dated Nov. 9, 2022, 12 pages.
Corrected Notice of Allowance received for U.S. Appl. No. 17/409,598, dated Sep. 30, 2022, 2 pages.
Notice of Allowance received for Japanese Patent Application No. 2021-565919, dated Oct. 3, 2022, 3 pages (1-page English Translation and 2 pages Official Copy).
Office Action received for Brazilian Patent Application No. BR122018076550-0, dated Sep. 28, 2022, 7 pages (1 page of English Translation and 6 pages of Official Copy).
Office Action received for European Patent Application No. 21163791.3, dated Sep. 20, 2022, 6 pages.
Drunk Beauty Flower Digital Technology, "iPhone XS Max Camera Tips, Tricks, Features and Complete Tutorial", Available online at: https://www.ixigua.com/6606874981844386308?wid_try=1, Oct. 2, 2018, 2 pages, Cited by Chinese Patent office in an Office Action for related Patent Application No. 202110766668.7 dated Sep. 15, 2022.
Board Opinion received for Chinese Patent Application No. 201811446867.4, mailed on Feb. 14, 2023, 11 pages (4 pages of English Translation and 7 pages of Official Copy).
Corrected Notice of Allowance received for U.S. Appl. No. 17/566,094, dated Mar. 7, 2023, 2 pages.
Intention to Grant received for European Patent Application No. 20168009.7, dated Feb. 28, 2023, 10 pages.
Notice of Allowance received for U.S. Appl. No. 17/566,094, dated Feb. 23, 2023, 8 pages.
Notice of Allowance received for U.S. Appl. No. 17/732,191, dated Feb. 27, 2023, 12 pages.
Office Action received for Chinese Patent Application No. 202110766668.7, dated Jan. 20, 2023, 11 pages (6 pages of English Translation and 5 pages of Official Copy).
Corrected Notice of Allowance received for U.S. Appl. No. 17/510,168, dated Mar. 16, 2023, 2 pages.
Notice of Allowance received for Korean Patent Application No. 10-2021-7006145, dated Mar. 6, 2023, 5 pages (2 pages of English Translation and 3 pages of Official Copy).
Notice of Allowance received for U.S. Appl. No. 17/041,412, dated Mar. 15, 2023, 13 pages.
Corrected Notice of Allowance received for U.S. Appl. No. 17/041,412, dated Mar. 23, 2023, 7 pages.
Corrected Notice of Allowance received for U.S. Appl. No. 17/041,412, dated Mar. 31, 2023, 6 pages.
Corrected Notice of Allowance received for U.S. Appl. No. 17/510,168, dated Mar. 29, 2023, 2 pages.

* cited by examiner

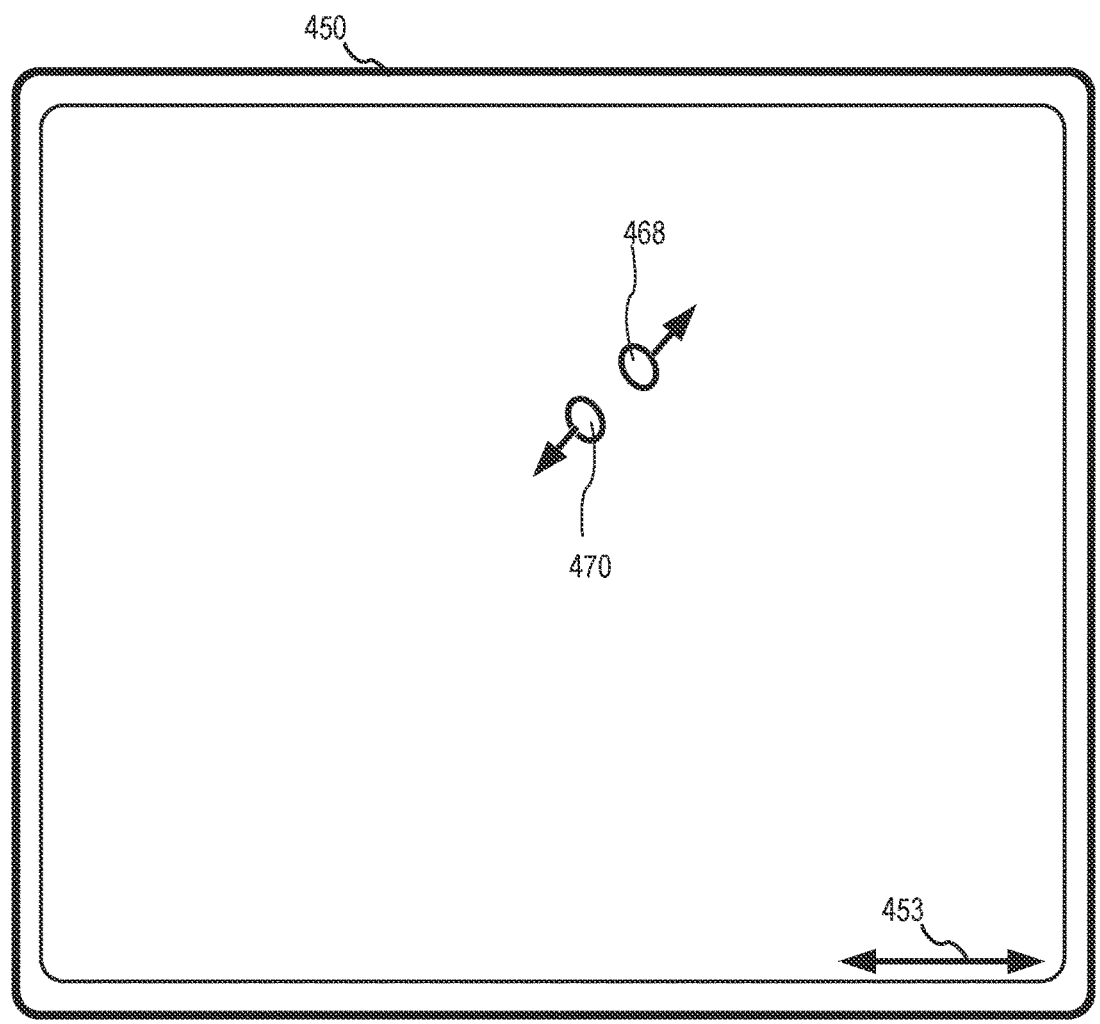
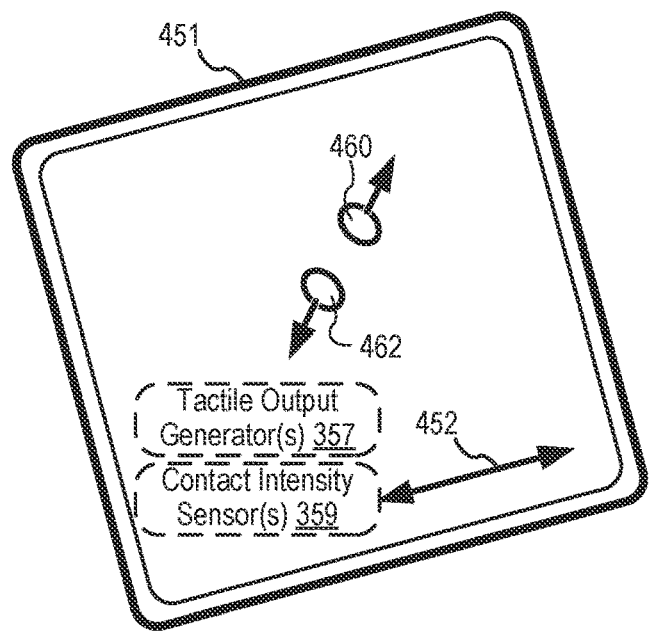
*FIG. 4B*

800

802
DISPLAYING A DIGITAL VIEWFINDER HAVING CONTENT FROM ONE OF A FIRST CAMERA (E.G., WIDER-ANGLE) AND A SECOND CAMERA (E.G., HIGHER OPTICAL MAGNIFICATION) IS DISPLAYED AT A ZOOM SETTING

   

804
DETECT USER INPUT TO STORE CONTENT

806
IS ZOOM SETTING ABOVE OR BELOW THRESHOLD?

BELOW

ABOVE

808
STORE CONTENT CAPTURED FROM FIRST CAMERA (E.G., WIDER-ANGLE)

810
STORE CONTENT CAPTURED FROM SECOND CAMERA (E.G., HIGHER OPTICAL-MAGNIFICATION)

902
DISPLAY A FIRST VIEWFINDER HAVING CONTENT FROM A FIRST CAMERA (E.G., WIDER-ANGLE) AND A SECOND VIEWFINDER HAVING CONTENT FROM A SECOND CAMERA (E.G., HIGHER OPTICAL MAGNIFICATION)

904
DETECT USER INPUT REPRESENTING MANIPULATION OF THE FIRST VIEWFINDER AND UPDATING THE FIRST VIEWFINDER CORRESPONDINGLY

906
DETECT USER INPUT REPRESENTING INSTRUCTION TO FREEZE THE SECOND VIEWFINDER AND FREEZING THE SECOND VIEWFINDER CORRESPONDINGLY, INDEPENDENT OF THE FIRST VIEWFINDER

908
OPTIONALLY, UNFREEZE THE SECOND VIEWFINDER

910
STORE CONTENTS FROM BOTH FIRST AND SECOND CAMERAS INTO LONG-TERM STORAGE AS DIGITAL MEDIA

OPTIONALLY, STORE AS "DIPTYCH" IMAGE

DISPLAY IN A FIRST PORTION OF THE DISPLAY A FIRST DIGITAL VIEWFINDER HAVING CONTENT FROM A FIRST CAMERA (E.G., WIDER-ANGLE)

1004

DISPLAY IN A SECOND PORTION OF THE DISPLAY A SECOND DIGITAL VIEWFINDER HAVING CONTENT FROM A SECOND CAMERA (E.G., HIGHER OPTICAL MAGNIFICATION)

1006

DETECT USER INPUT TO STORE CONTENT

1010

RESPONSIVE TO THE DETECTED USER INPUT, CONCURRENTLY STORE A FIRST VISUAL MEDIA USING CONTENT FROM THE FIRST CAMERA AND STORE A SECOND VISUAL MEDIA USING CONTENT FROM THE SECOND CAMERA,

THE FIRST AND SECOND CAMERAS HAVING OVERLAPPING FIELDS OF VIEW, AND

THE FIRST AND SECOND VISUAL MEDIA HAVING DIFFERENT VISUAL CHARACTERISTICS

1012

PLAYBACK RECORDED VISUAL MEDIA

*FIG. 10*

DIGITAL VIEWFINDER USER INTERFACE FOR MULTIPLE CAMERAS

CROSS-REFERENCE TO RELATED APPLICATIONS

This application is a continuation of U.S. application Ser. No. 17/409,598, entitled "DIGITAL VIEWFINDER USER INTERFACE FOR MULTIPLE CAMERAS," filed Aug. 23, 2021, which is a continuation of U.S. application Ser. No. 16/840,719, entitled "DIGITAL VIEWFINDER USER INTERFACE FOR MULTIPLE CAMERAS," filed Apr. 6, 2020, which is a continuation of U.S. application Ser. No. 16/143,396, entitled "DIGITAL VIEWFINDER USER INTERFACE FOR MULTIPLE CAMERAS," filed Sep. 26, 2018, which is a continuation of U.S. application Ser. No. 15/863,369, entitled "DIGITAL VIEWFINDER USER INTERFACE FOR MULTIPLE CAMERAS," filed Jan. 5, 2018, which is a continuation of U.S. application Ser. No. 15/136,323, entitled "DIGITAL VIEWFINDER USER INTERFACE FOR MULTIPLE CAMERAS," filed Apr. 22, 2016, which claims the benefit of U.S. Provisional Application Ser. No. 62/151,955, entitled "DIGITAL VIEWFINDER USER INTERFACE FOR MULTIPLE CAMERAS," filed on Apr. 23, 2015, which are hereby incorporated by reference in their entirety.

FIELD

The disclosed examples relate generally to user interfaces of electronic devices, particularly devices having built-in cameras.

BACKGROUND

Some portable electronic devices have built-in cameras. These devices may provide digital viewfinders for user-interaction with the cameras. The digital viewfinders may allow variable image zooming through the use of optical and/or digital magnification. Optical magnification provides better visual quality but introduces complexities in the device's optical train, as optical zooming is achieved by moving physical components (e.g., lenses) along a physical, optical train. Digital magnification avoids these complexities, thereby permitting more efficient device packaging, but may suffer in visual quality.

SUMMARY

In some embodiments, at an electronic device with a first camera, a second camera, and a display, performing a method comprising: displaying a digital viewfinder comprising content from one of the first and second cameras displayed at a zoom setting; detecting input representing an instruction to store visual media; in response to detecting the input representing the instruction to store visual media: in accordance with a determination that the zoom setting is below a threshold zoom value, storing visual media using content from the first camera; and in accordance with a determination that the zoom setting is above the threshold zoom value, storing visual media using content from the second camera.

In some embodiments, at an electronic device with a first camera, a second camera, and a display, performing a method comprising: displaying, in a first portion of the display, a first digital viewfinder, the first digital viewfinder displaying content from the first camera; displaying, in a second portion of the display, a second digital viewfinder, the second digital viewfinder displaying content from the second camera; detecting a first input representing an instruction to zoom the first digital viewfinder; in response to detecting the first input, zooming the first digital viewfinder independently of the second digital viewfinder; detecting a second input representing an instruction to freeze the first digital viewfinder; and in response to detecting the second input, freezing the first digital viewfinder independently of the second digital viewfinder.

In some embodiments, at an electronic device with a first camera, a second camera, and a display, performing a method comprising: displaying in a first portion of the display a first digital viewfinder, the first digital viewfinder displaying content from the first camera; displaying in a second portion of the display a second digital viewfinder, the second digital viewfinder displaying content from the second camera; detecting a first input; and in response to detecting the first input, concurrently storing first visual media using content from the first camera and storing second visual media using content from the second camera, wherein the first and the second cameras have overlapping fields of view, and wherein the first visual media and the second visual media have different visual characteristics.

In some embodiments, a non-transitory computer readable storage medium stores computer-executable instructions, the computer-executable instructions comprising instructions, which when executed by a device, cause the device to: display a digital viewfinder comprising content from one of a first and a second camera displayed at a zoom setting; detect input representing an instruction to store visual media; in response to detecting the input representing the instruction to store visual media: in accordance with a determination that the zoom setting is below a threshold zoom value, store visual media using content from the first camera; and in accordance with a determination that the zoom setting is above the threshold zoom value, store visual media using content from the second camera.

In some embodiments, a non-transitory computer readable storage medium stores computer-executable instructions, the computer-executable instructions comprising instructions, which when executed by a device, cause the device to: display, in a first portion of a display, a first digital viewfinder, the first digital viewfinder displaying content from a first camera; display, in a second portion of the display, a second digital viewfinder, the second digital viewfinder displaying content from a second camera; detect a first input representing an instruction to zoom the first digital viewfinder; in response to detecting the first input, zooming the first digital viewfinder independently of the second digital viewfinder; detect a second input representing an instruction to freeze the first digital viewfinder; and in response to detecting the second input, freezing the first digital viewfinder independently of the second digital viewfinder.

In some embodiments, a non-transitory computer readable storage medium stores computer-executable instructions, the computer-executable instructions comprising instructions, which when executed by a device, cause the device to: display in a first portion of the display a first digital viewfinder, the first digital viewfinder displaying content from the first camera; display in a second portion of the display a second digital viewfinder, the second digital viewfinder displaying content from the second camera; detect a first input; and in response to detecting the first input, concurrently store first visual media using content from the first camera and store second visual media using content from the second camera, wherein the first and the second cameras have overlapping fields of view, and wherein the first visual media and the second visual media have different visual characteristics.

In some embodiments, a transitory computer readable storage medium stores computer-executable instructions, the computer-executable instructions comprising instructions, which when executed by a device, cause the device to: display a digital viewfinder comprising content from one of a first and a second camera displayed at a zoom setting; detect input representing an instruction to store visual media; in response to detecting the input representing the instruction to store visual media: in accordance with a determination that the zoom setting is below a threshold zoom value, store visual media using content from the first camera; and in accordance with a determination that the zoom setting is above the threshold zoom value, store visual media using content from the second camera.

In some embodiments, a transitory computer readable storage medium stores computer-executable instructions, the computer-executable instructions comprising instructions, which when executed by a device, cause the device to: display, in a first portion of a display, a first digital viewfinder, the first digital viewfinder displaying content from a first camera; display, in a second portion of the display, a second digital viewfinder, the second digital viewfinder displaying content from a second camera; detect a first input representing an instruction to zoom the first digital viewfinder; in response to detecting the first input, zooming the first digital viewfinder independently of the second digital viewfinder; detect a second input representing an instruction to freeze the first digital viewfinder; and in response to detecting the second input, freezing the first digital viewfinder independently of the second digital viewfinder.

In some embodiments, a transitory computer readable storage medium stores computer-executable instructions, the computer-executable instructions comprising instructions, which when executed by a device, cause the device to: display in a first portion of the display a first digital viewfinder, the first digital viewfinder displaying content from the first camera; display in a second portion of the display a second digital viewfinder, the second digital viewfinder displaying content from the second camera; detect a first input; and in response to detecting the first input, concurrently store first visual media using content from the first camera and store second visual media using content from the second camera, wherein the first and the second cameras have overlapping fields of view, and wherein the first visual media and the second visual media have different visual characteristics.

In some embodiments, a device comprises: one or more processors; a memory; and computer-executable instructions, wherein the computer-executable instructions are stored in the memory and configured to be executed by the one or more processors, the computer-executable instructions including instructions for: display a digital viewfinder comprising content from one of a first and a second camera displayed at a zoom setting; detect input representing an instruction to store visual media; in response to detecting the input representing the instruction to store visual media: in accordance with a determination that the zoom setting is below a threshold zoom value, store visual media using content from the first camera; and in accordance with a determination that the zoom setting is above the threshold zoom value, store visual media using content from the second camera.

In some embodiments, a device comprises: one or more processors; a memory; and computer-executable instructions, wherein the computer-executable instructions are stored in the memory and configured to be executed by the one or more processors, the computer-executable instructions including instructions for: display, in a first portion of a display, a first digital viewfinder, the first digital viewfinder displaying content from a first camera; display, in a second portion of the display, a second digital viewfinder, the second digital viewfinder displaying content from a second camera; detect a first input representing an instruction to zoom the first digital viewfinder; in response to detecting the first input, zooming the first digital viewfinder independently of the second digital viewfinder; detect a second input representing an instruction to freeze the first digital viewfinder; and in response to detecting the second input, freezing the first digital viewfinder independently of the second digital viewfinder.

In some embodiments, a device comprises: one or more processors; a memory; and computer-executable instructions, wherein the computer-executable instructions are stored in the memory and configured to be executed by the one or more processors, the computer-executable instructions including instructions for: display in a first portion of the display a first digital viewfinder, the first digital viewfinder displaying content from the first camera; display in a second portion of the display a second digital viewfinder, the second digital viewfinder displaying content from the second camera; detect a first input; and in response to detecting the first input, concurrently store first visual media using content from the first camera and store second visual media using content from the second camera, wherein the first and the second cameras have overlapping fields of view, and wherein the first visual media and the second visual media have different visual characteristics.

In some embodiments, a device, comprises: means for displaying a digital viewfinder comprising content from one of a first and a second camera displayed at a zoom setting; means for detecting input representing an instruction to store visual media; means for, in response to detecting the input representing the instruction to store: in accordance with a determination that the zoom setting is below a threshold zoom value, storing visual media using content from the first camera; and in accordance with a determination that the zoom setting is above the threshold zoom value, storing visual media using content from the second camera.

In some embodiments, a device, comprises: means for displaying, in a first portion of the display, a first digital viewfinder, the first digital viewfinder displaying content from the first camera; means for displaying, in a second portion of the display, a second digital viewfinder, the second digital viewfinder displaying content from the second camera; means for detecting a first input representing an instruction to zoom the first digital viewfinder; means for, in response to detecting the first input, zooming the first digital viewfinder independently of the second digital viewfinder; means for detecting a second input representing an instruction to freeze the first digital viewfinder; and means for, in response to detecting the second input, freezing the first digital viewfinder independently of the second digital viewfinder.

In some embodiments, a device, comprises: means for displaying in a first portion of the display a first digital viewfinder, the first digital viewfinder displaying content from a first camera; means for displaying in a second portion of the display a second digital viewfinder, the second digital viewfinder displaying content from a second camera; means for detecting a first input; and means for, in response to detecting the first input, concurrently storing first visual media using content from the first camera and storing second visual media using content from the second camera, wherein the first and the second cameras have overlapping fields of view, and wherein the first visual media and the second visual media have different visual characteristics.

In some embodiments, a device, comprises: a display unit configured to displaying one or more digital viewfinders; an input detection unit configured to detect input representing an instruction to store visual media; a processing unit operatively coupled to the display unit and the input detection unit, configured to enable display, via the display unit, of a digital viewfinder comprising content from one of a first and a second camera displayed at a zoom setting; and a visual media storing unit configured to: store visual media using content from the first camera, in response to detecting the input representing the instruction to store visual media, and in accordance with a determination that the zoom setting is below a threshold zoom value; and store visual media using content from the second camera, in response to detecting the input representing the instruction to store visual media, and in accordance with a determination that the zoom setting is above the threshold zoom value.

In some embodiments, a device, comprises: a display unit configured to displaying two or more digital viewfinders; an input detection unit; and a processing unit operatively coupled to the display unit and the input detection unit, configured to: enable display, via a first portion of the display unit, of a first digital viewfinder, the first digital viewfinder displaying content from a first camera, and enable display, via a second portion of the display unit, of a second digital viewfinder, the second digital viewfinder displaying content from a second camera; detect, via the input detection unit, a first input representing an instruction to zoom the first digital viewfinder; in response to detecting the first input, zoom the first digital viewfinder independently of the second digital viewfinder; detect, via the input detection unit, a second input representing an instruction to freeze the first digital viewfinder; and in response to detecting the second input, freeze the first digital viewfinder independently of the second digital viewfinder.

In some embodiments, a device comprises: a display unit configured to displaying two or more digital viewfinders; an input detection unit; a processing unit operatively coupled to the display unit and the input detection unit, configured to: enable display, via a first portion of the display unit, of a first digital viewfinder, the first digital viewfinder displaying content from a first camera; enable display, via a second portion of the display unit, of a second digital viewfinder, the second digital viewfinder displaying content from a second camera; detect, via the input detection unit, a first input; and a visual media storing unit configured to, in response to detecting the first input, concurrently store first visual media using content from the first camera and store second visual media using content from the second camera, wherein the first and the second cameras have overlapping fields of view, and wherein the first visual media and the second visual media have different visual characteristics.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 4A and 4B illustrate an exemplary user interface for a menu of applications on a portable multifunction device in accordance with some embodiments.

FIGS. 8A-8C are flow diagrams illustrating an exemplary process for providing viewfinder zoom capabilities using multiple cameras in accordance with some embodiments.

FIG. 9 is a flow diagram illustrating an exemplary process for storing visual content using multiple cameras in accordance with some embodiments.

FIG. 10 is a flow diagram illustrating an exemplary process for storing visual content using multiple cameras in accordance with some embodiments.

DESCRIPTION OF EMBODIMENTS

Figure 1A:
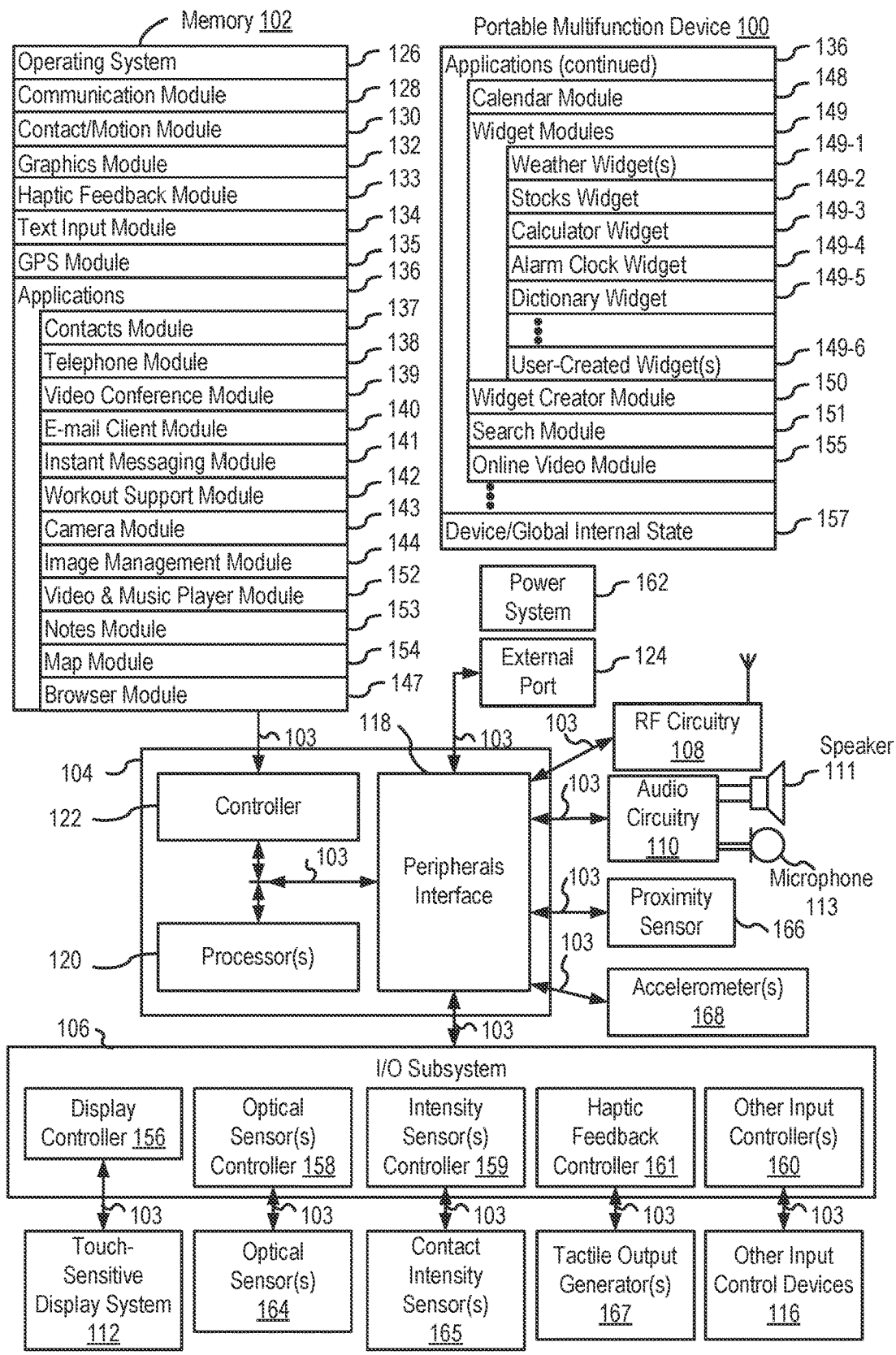
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

Efficient device packaging allows desirable, highly-portable electronic devices to be designed and manufactured. But, some electronic device components complicate the design of smaller devices, particularly thinner ones. Camera sensors and related components constitute an example: they involve physical components organized along optical trains that lend to thicker designs. Consider, for instance, the ability of a camera (e.g., CCD sensor and related lenses) to perform variable optical zooming depends on the arrangement of moveable (e.g., motorized) lens(es) among an optical train. When incorporated into cellular phones, the usual orientation of camera components is at odds with the form-factor of the overall phone: the camera's optical train typically runs along the thickness of the device. The use of cameras of thinner design—such as fixed focal length cameras—introduces other issues. Namely, fixed focal length cameras do not have variable, optical zoom capabilities. While it is still possible to perform digital zooming, digital zooming impacts image quality.

The embodiments described herein include electronic devices that utilize multiple cameras to provide improved camera capabilities. In some embodiments, multiple cameras of fixed focal length are used with variable digital magnification to mimic optical zooming capabilities. The described embodiments also include complementary user interfaces that enable these improved camera capabilities.

Together, the described embodiments permit efficient packaging and production of thin and light devices, while improving the performance of the device's camera optical capabilities. The use of fixed focal length cameras is beneficial as they are thinner than their variable focal length counterparts. The use of multiple cameras permit an approximation of optical zoom even if the underlying cameras are not capable of variable optical magnification. Intuitive user interfaces allow users to leverage the benefits of multiple on-board cameras without placing undue cognitive burdens on the user, thereby producing a more efficient human-machine interface. In battery-operated embodiments, the described embodiments also conserve power and increase run-time between battery charges, as the use of fixed focal length cameras to simulate optical zooming avoids battery consumption by motorized lenses used in conventional variable, optical zooming cameras.

Below, FIGS. 1A-1B, 2A-2B, 3, 4A-4B, and 11 provide a description of exemplary devices that utilize multiple cameras to provide camera zooming, and other related capabilities. FIGS. 5A-5T, 6A-6G, and 7 illustrate exemplary user interfaces supporting these capabilities. These figures are also used to illustrate the processes described below, including those described in FIGS. 8A-8C, 9, and 10.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as button(s), a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience, and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/ output (I/O) subsystem 106, other input or control devices 116, and external port 124. In some embodiments, microphone 113 has at least two microphones to support the performance of certain DSP functions. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIGS. 2A-2B). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor(s) controller 158, intensity sensor controller 159, haptic feedback controller 161, and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIGS. 2A-2B) optionally include an up/down button for volume control of speaker 111 and/or microphone 113. The one or more buttons optionally include a push button (e.g., 206, FIGS. 2A and 2B).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. Nos. 6,323,846 (Westerman et al.), 6,570,557 (Westerman et al.), and/or 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Figure 1B:
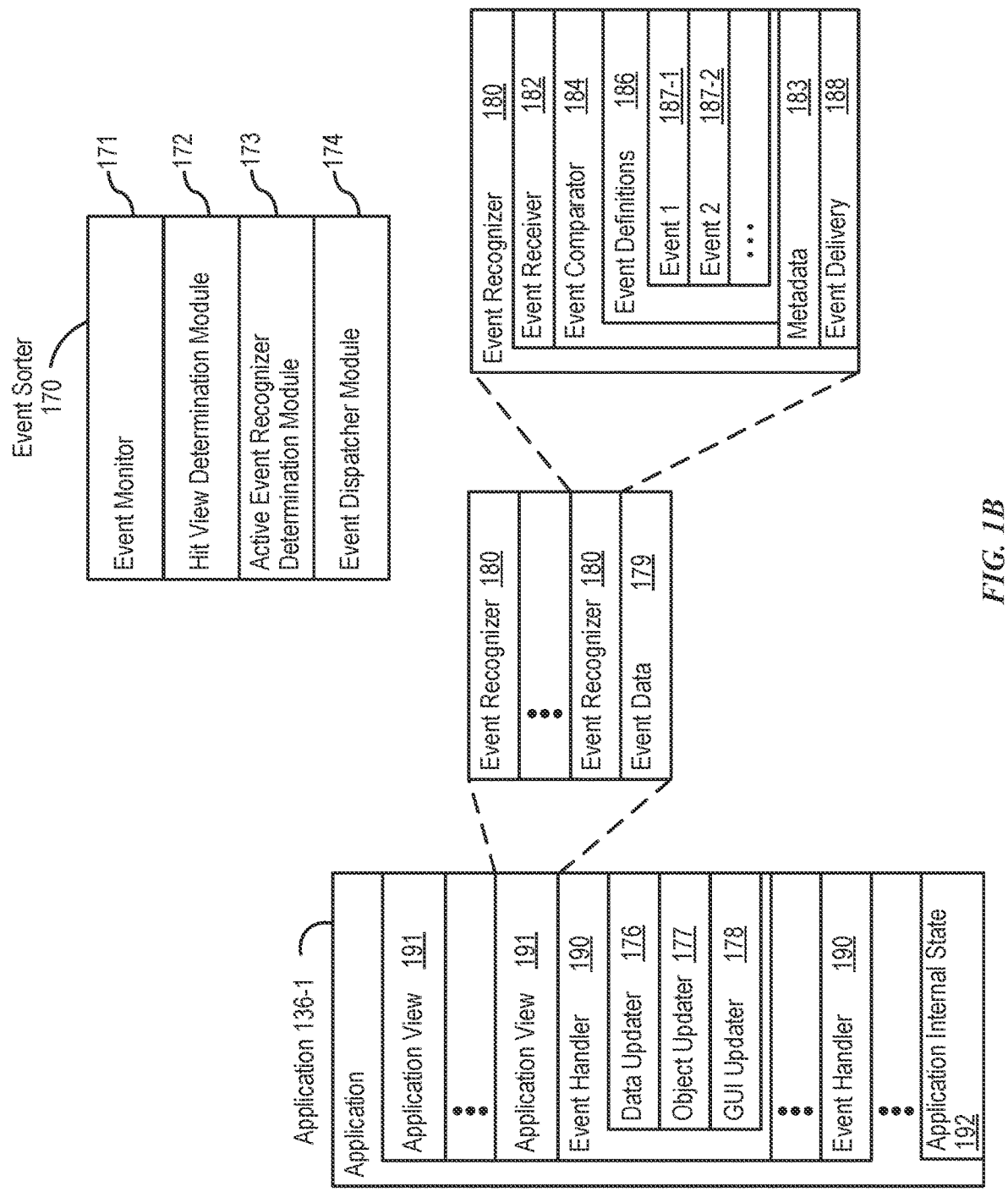
FIG. 1B is a block diagram illustrating exemplary components for event handling in accordance with some embodiments.

Device 100 optionally also includes one or more optical sensors 164. FIGS. 1A and 1B show an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video.

The term "camera" is used herein as encompassing an optical system that is formed by an optical sensor (e.g., 164) and one or more lenses through which light is projected to reach the optical sensor (and optionally, other related components). Such an optical system—a camera—can have a fixed focal length, meaning that the focal length, field of view, and optical magnification properties (if any) of the optical system is fixed, among other things. Cameras having a fixed focus length may also be described as having a prime lens. Or, a camera can have a variable focal length, meaning that the optical magnification properties of the optical system can change, such as by changing the position of one or more lenses with respect to the optical sensor within an optical train of the optical system. In some embodiments, device 100 has an optical sensor and corresponding lens(es) that form a camera of fixed focal length. In some embodiments, device 100 has an optical sensor and corresponding lens(es) that form a camera of variable focal length.

Moreover, device 100 can have one or more cameras of either design. In some embodiments, device 100 has two or more cameras located on a surface, for example, on its back, opposite touch screen display 112 on the front of the device, so that the touch screen display is enabled for use as a viewfinder for still and/or video image acquisition. In some embodiments, device 100 has two or more cameras located on its front, so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

When two or more cameras are located on a surface of device 100, the optical axes of the cameras is, optionally, arranged such that they are parallel. Put another way, the cameras capture overlapping fields of view, for example, at least 50%, least 90%, or more, in various embodiments. The cameras preferably have different focal lengths, meaning that one camera is of a wider-angle design—has a wider field of view but lower optical magnification—while another camera is of a higher-magnification design—has a narrower field of view but higher native optical magnification.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIGS. 1A and 1B show proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. Nos. 11/241,839, "Proximity Detector In Handheld Device"; 11/240,788, "Proximity Detector In Handheld Device"; 11/620,702, "Using Ambient Light Sensor To Augment Proximity Sensor Output"; 11/586,862, "Automated Response To And Sensing Of User Activity In Portable Devices"; and 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion, such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIGS. 1A and 1B show accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
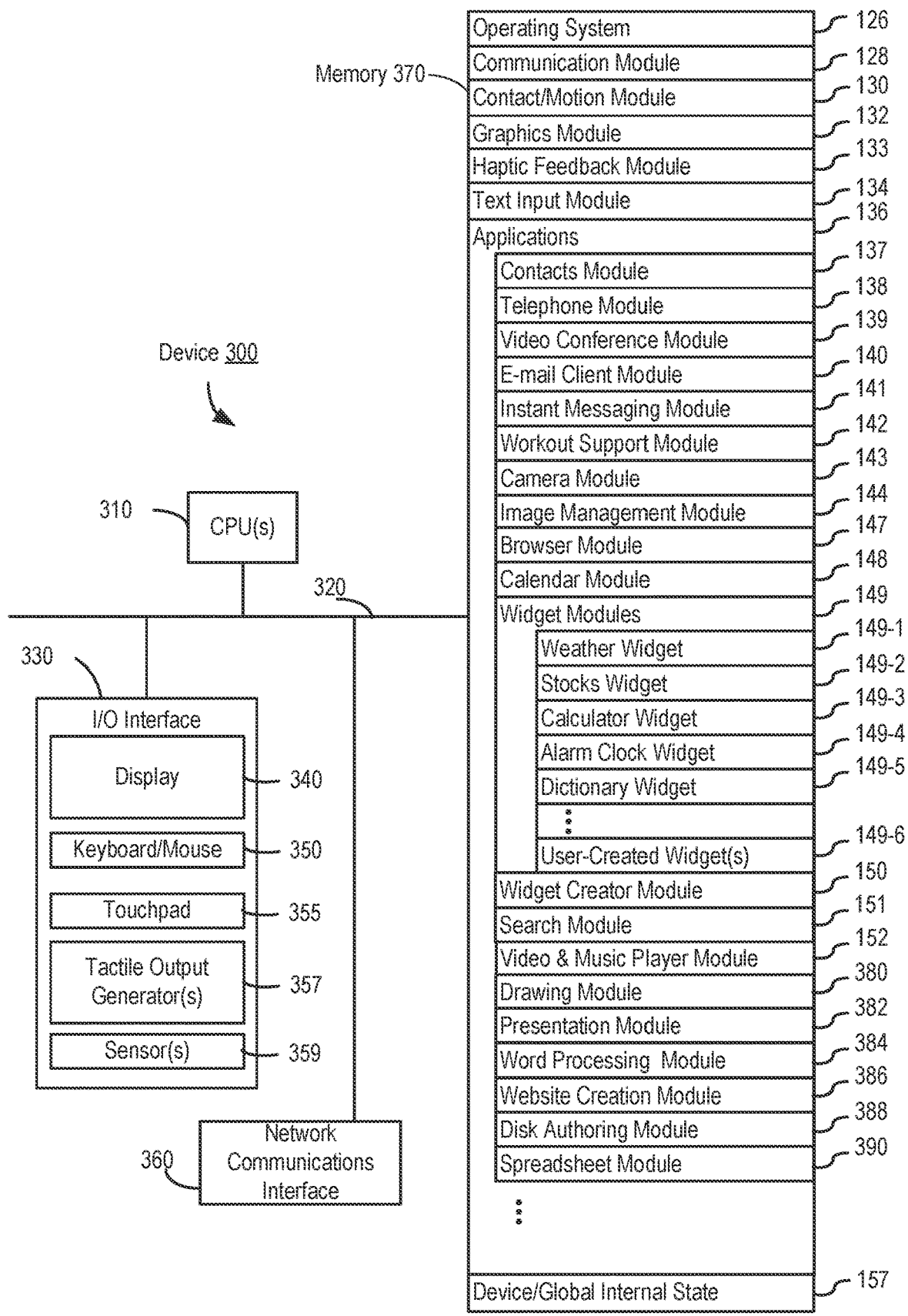
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 8-pin, 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including, without limitation text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are, optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2A:
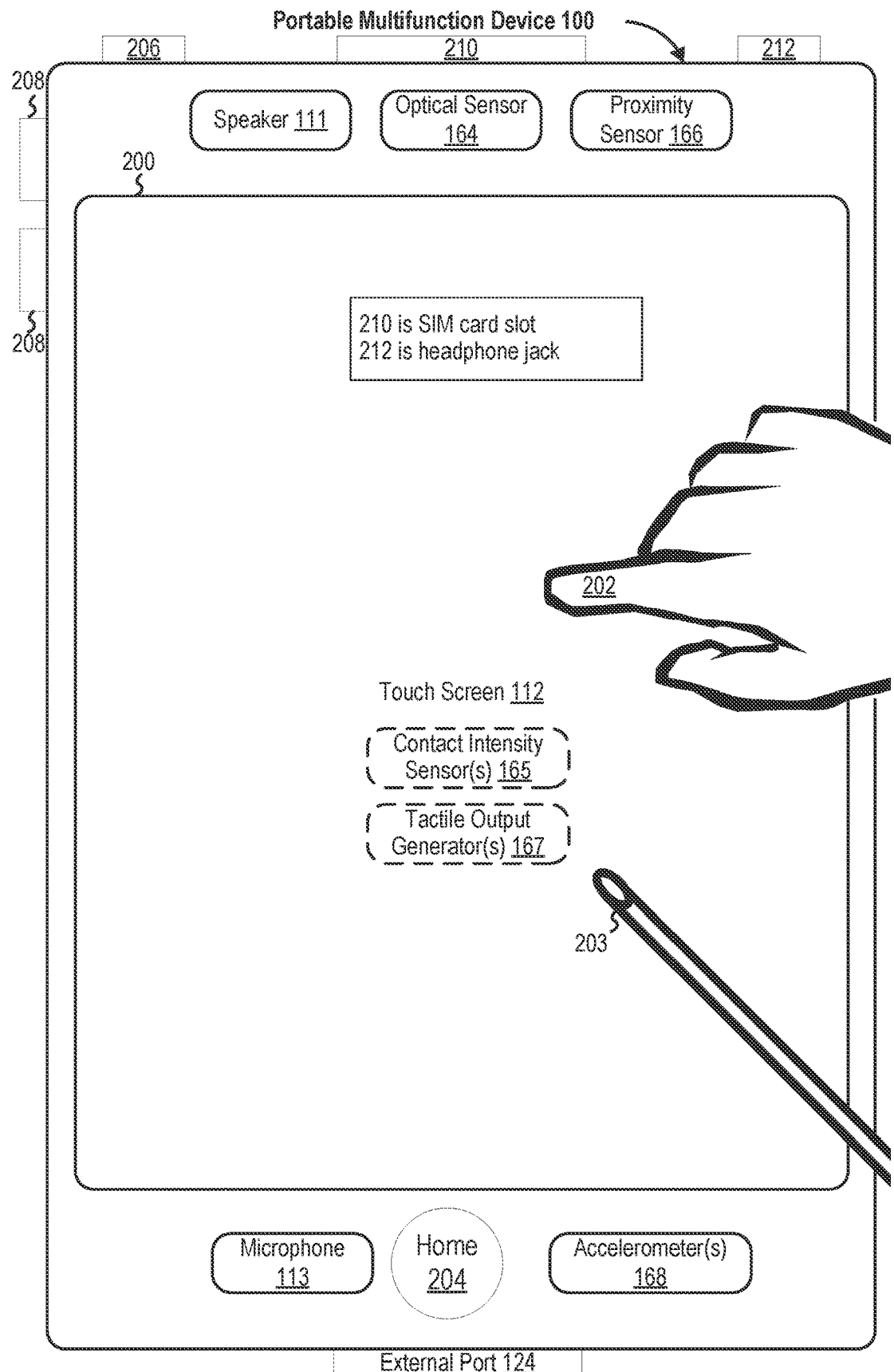
FIG. 2A illustrates a portable multifunction device having a touch-sensitive display in accordance with some embodiments.

FIG. 2A illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

Figure 2B:
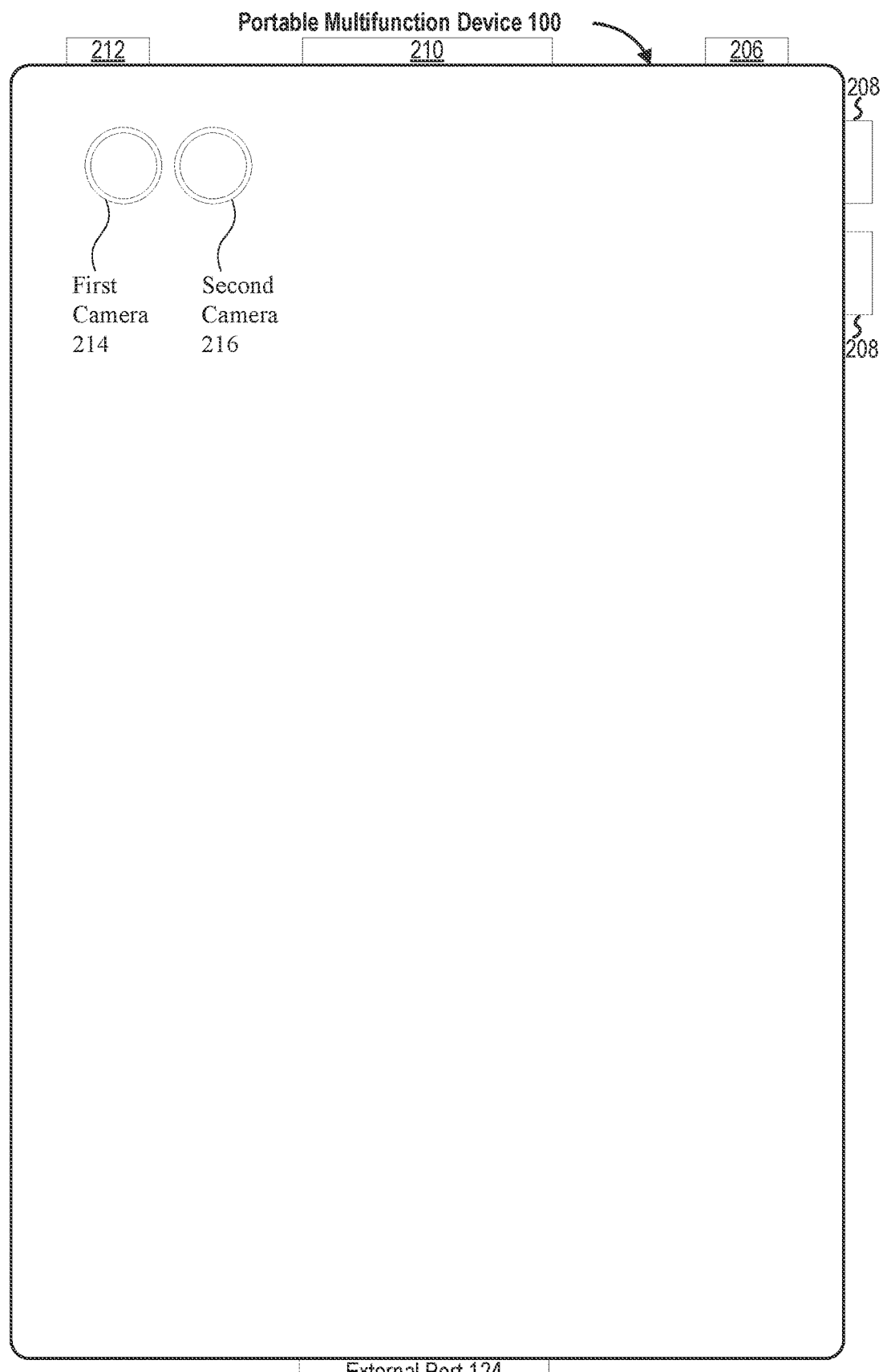
FIG. 2B illustrates a portable multifunction device having multiple cameras in accordance with some embodiments.

FIG. 2B illustrates the side of portable multifunction device 100 opposite touch screen 112 in accordance with some embodiments. As can be seen, device 100 includes cameras 214 and 216. Camera 214 is a wider-angle camera and camera 216 is a higher-magnification camera in some embodiments. While the cameras in FIG. 2B are shown on a side of portable multifunction device 100 that is opposite touch screen 112, it should be understood that in principle, the cameras could be positioned on any side of the device (e.g., a same side as touch screen 112), or an edge of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
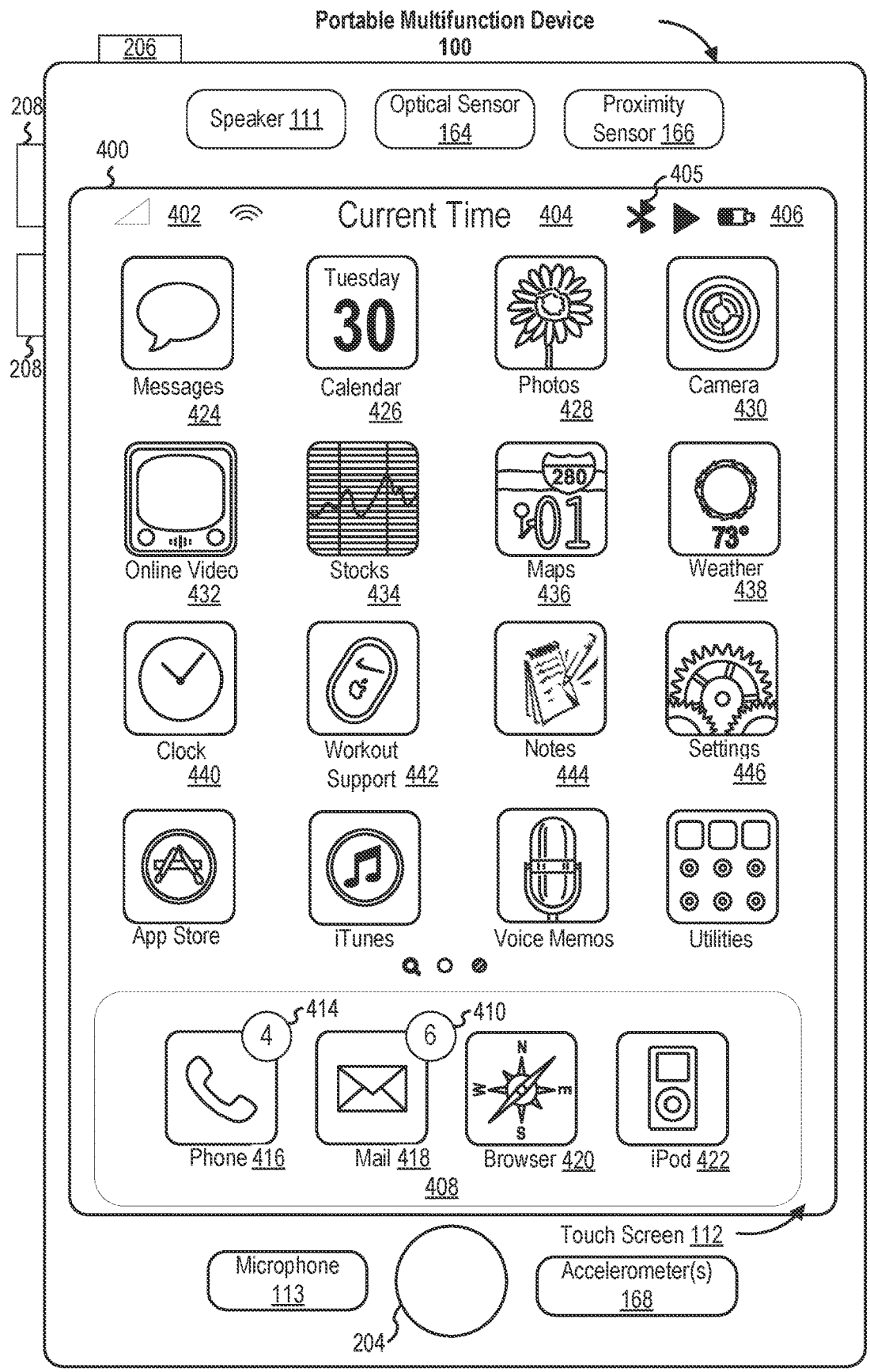

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used here, the term "affordance" refers to a user-interactive graphical user interface object that is, optionally, displayed on the display screen of device such as device 100 or 300 (FIGS. 1A, 1B, and 3). For example, an image (e.g., icon), a button, and text (e.g., hyperlink) may each constitute an affordance.

1. Dual-Camera Zoom Capabilities

Figure 5A:
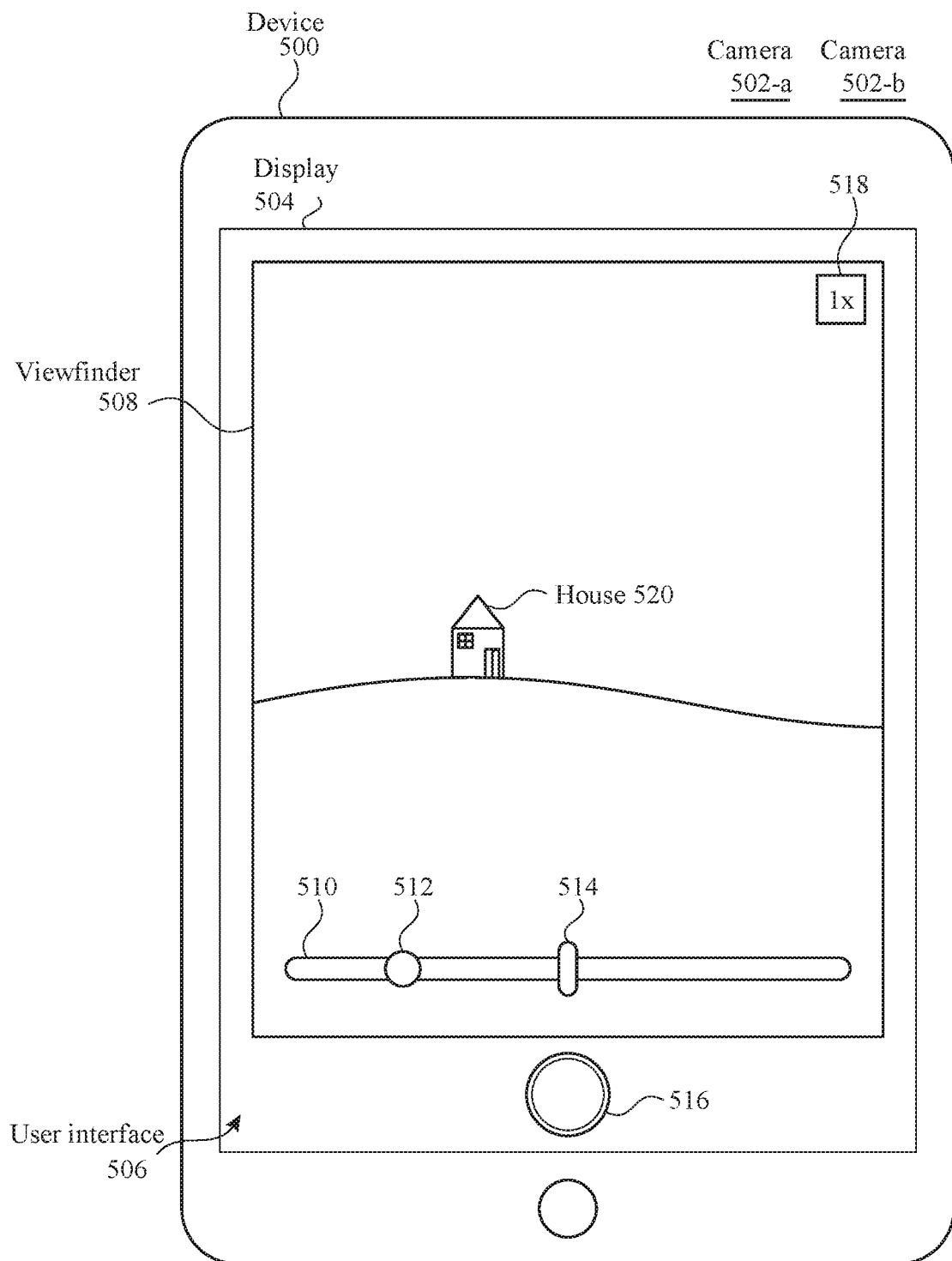
FIGS. 5A-5T illustrate exemplary user interfaces for providing viewfinder zoom capabilities using multiple cameras in accordance with some embodiments.
Figure 5B:
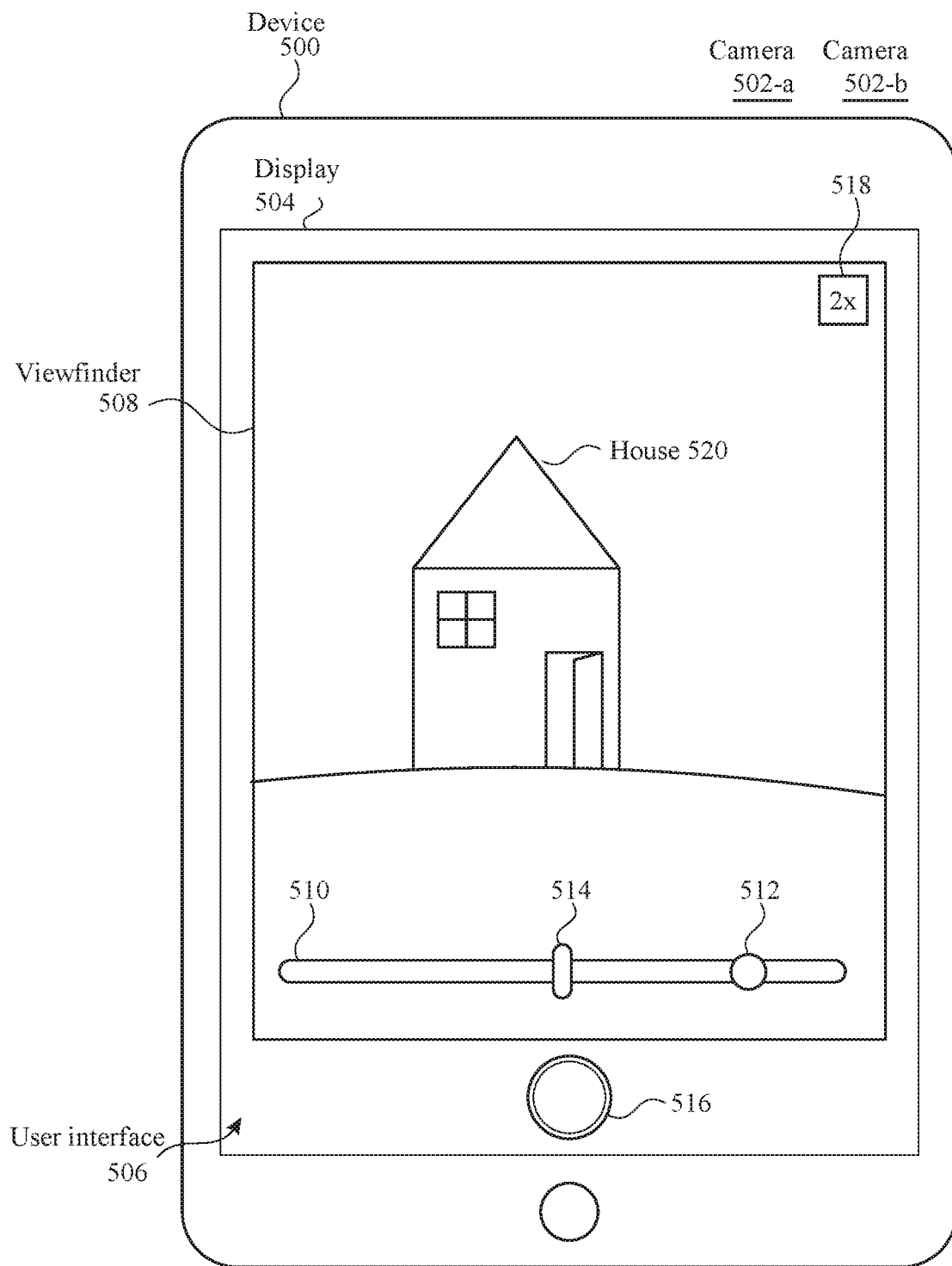
Figure 5C:
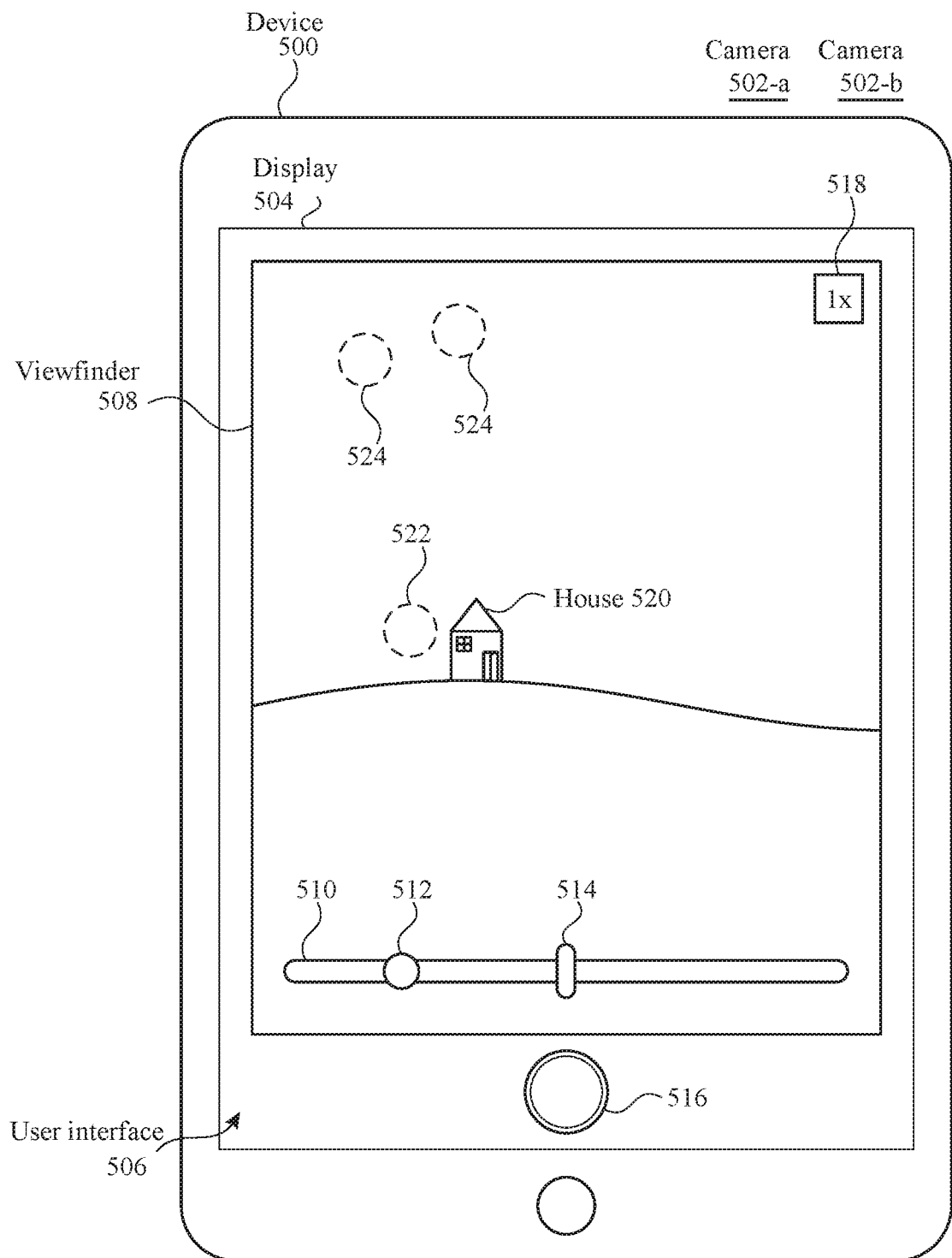
Figure 5D:
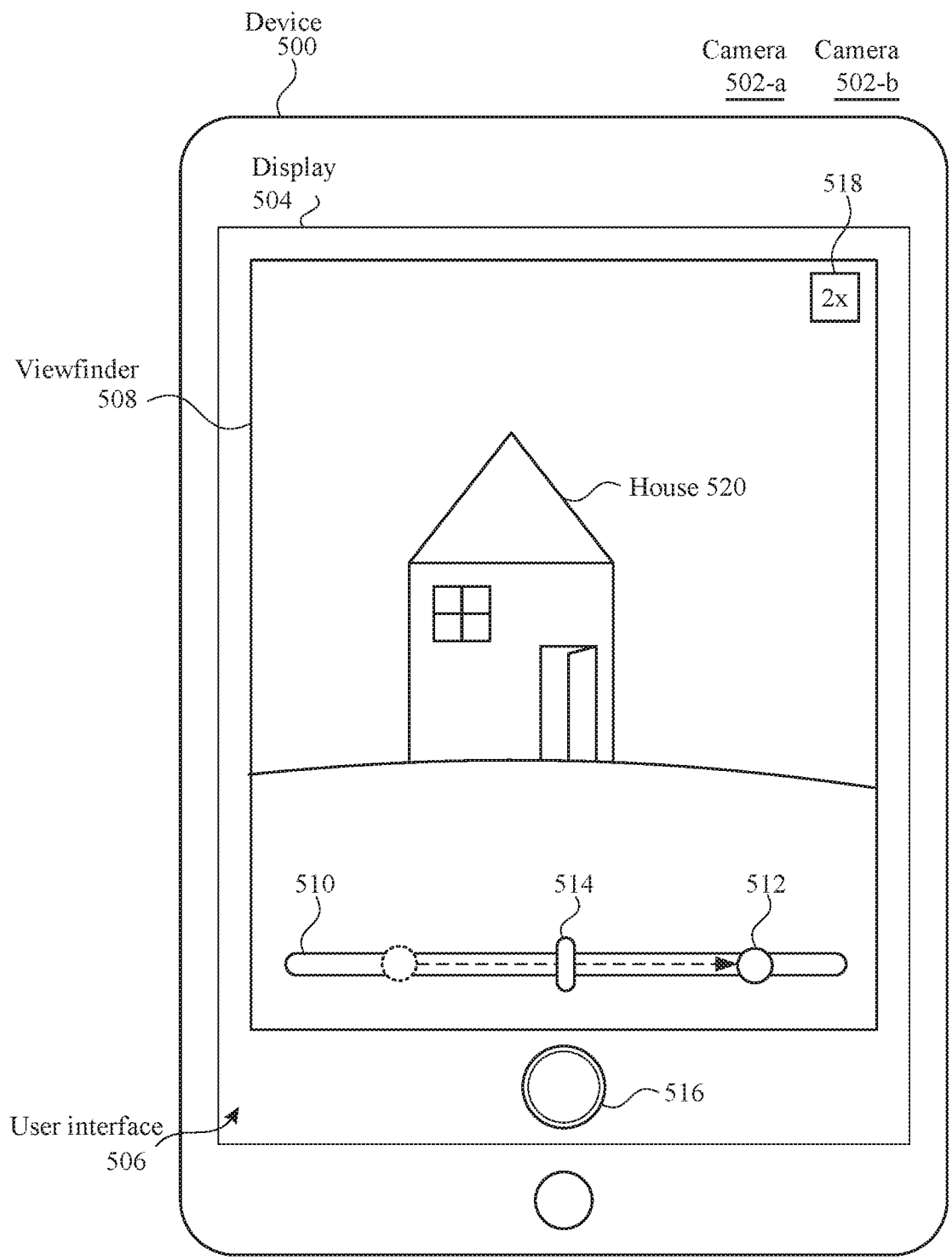
Figure 5E:
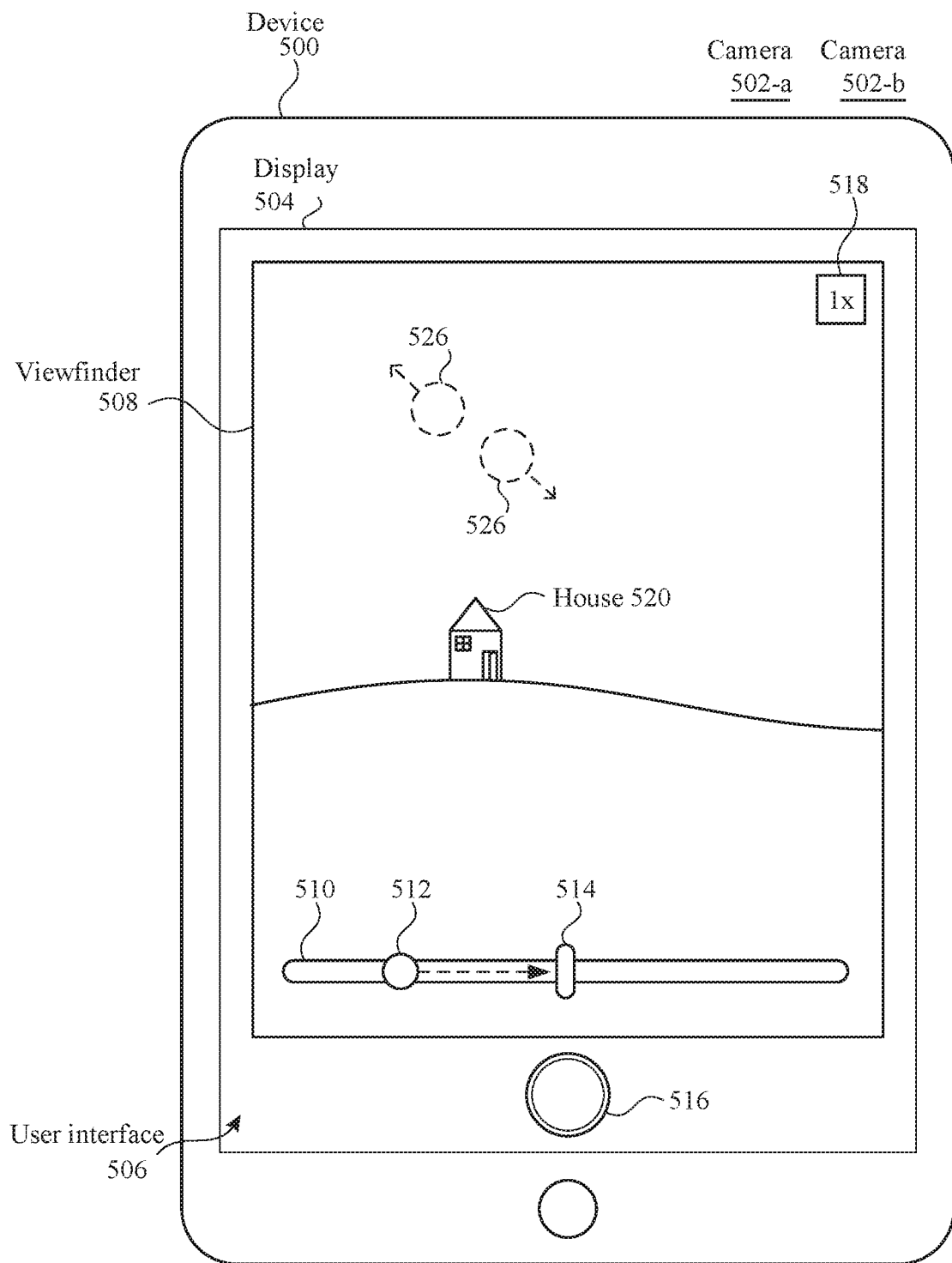
Figure 5F:
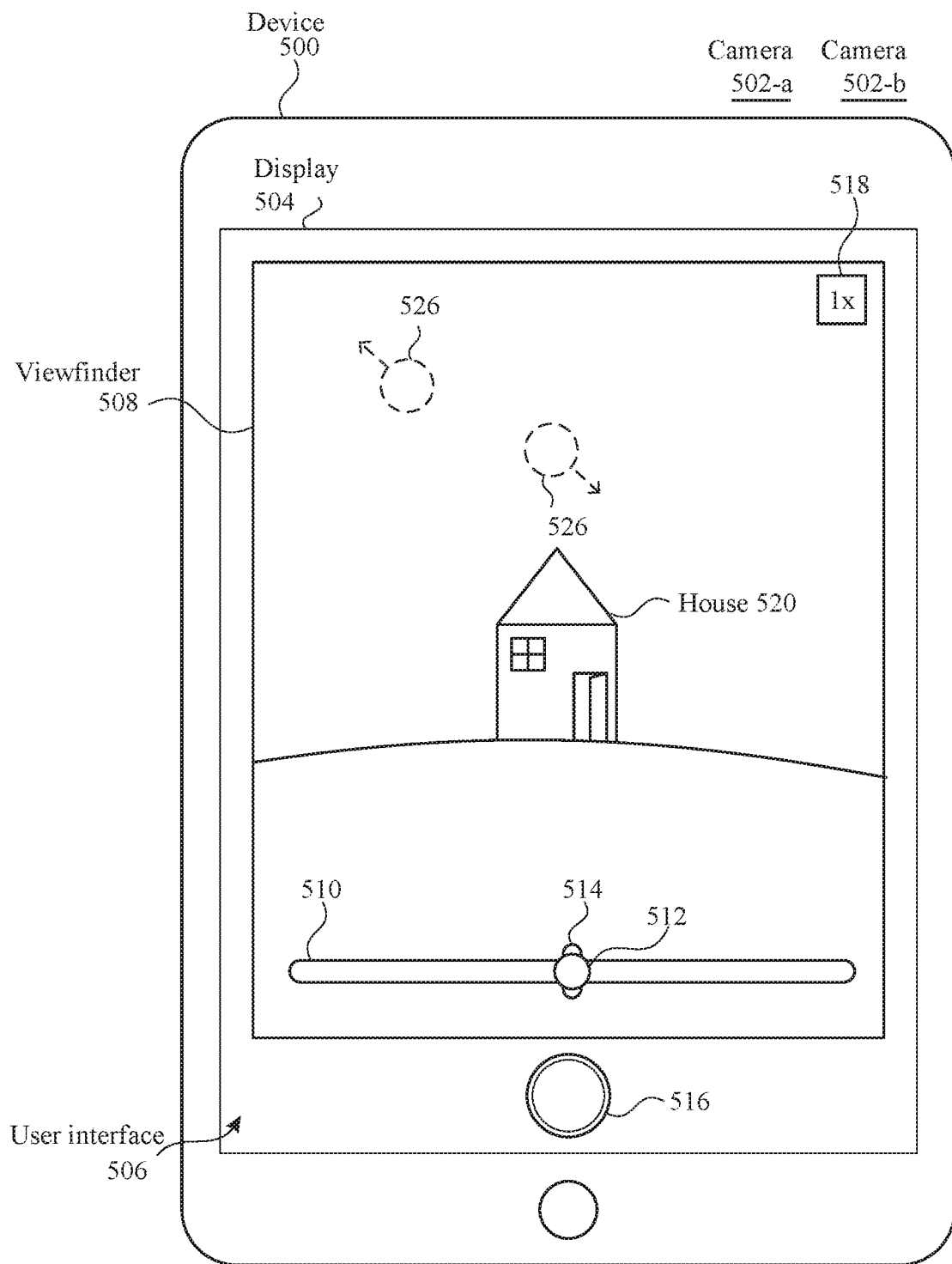
Figure 5G:
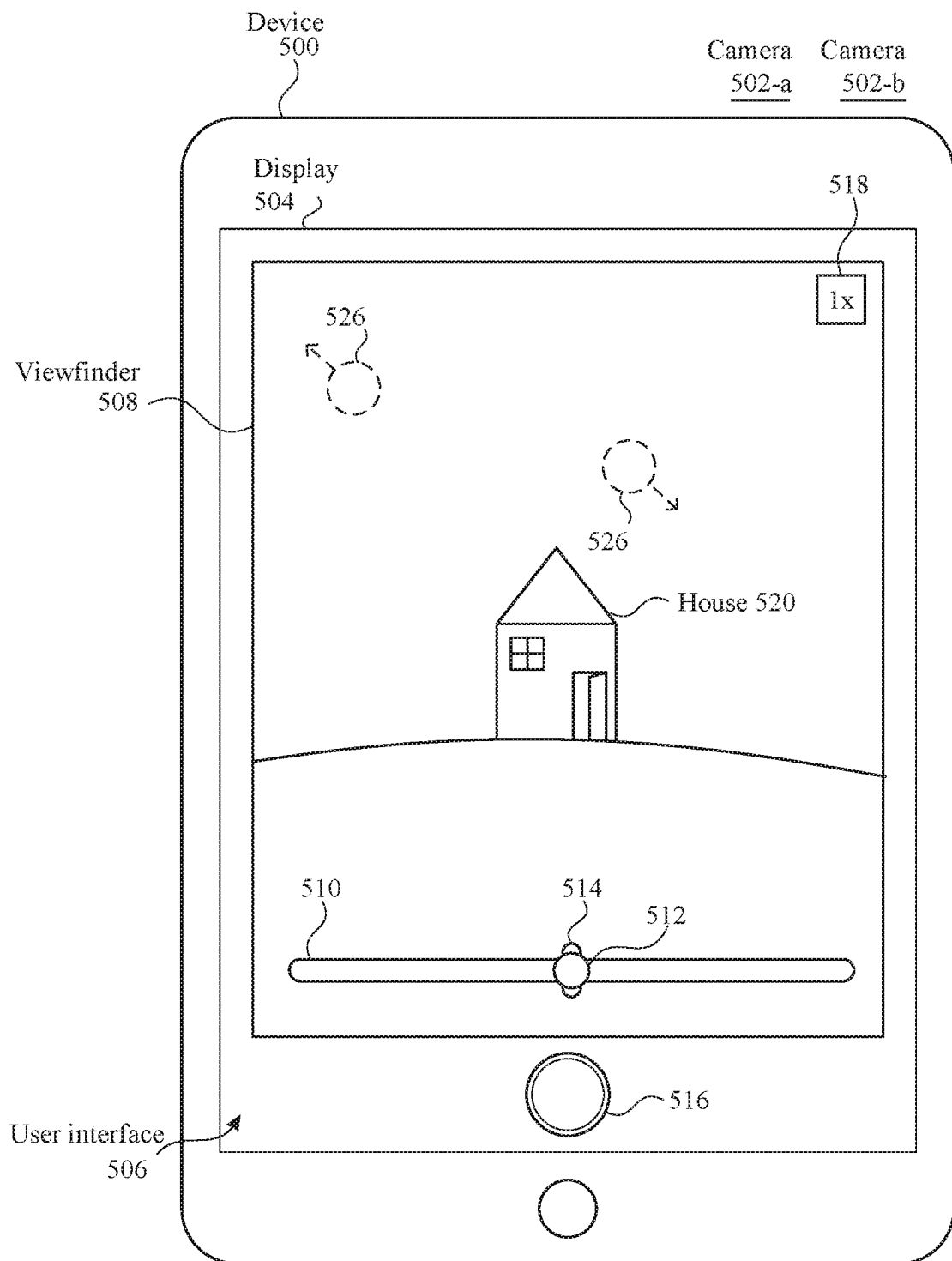
Figure 5H:
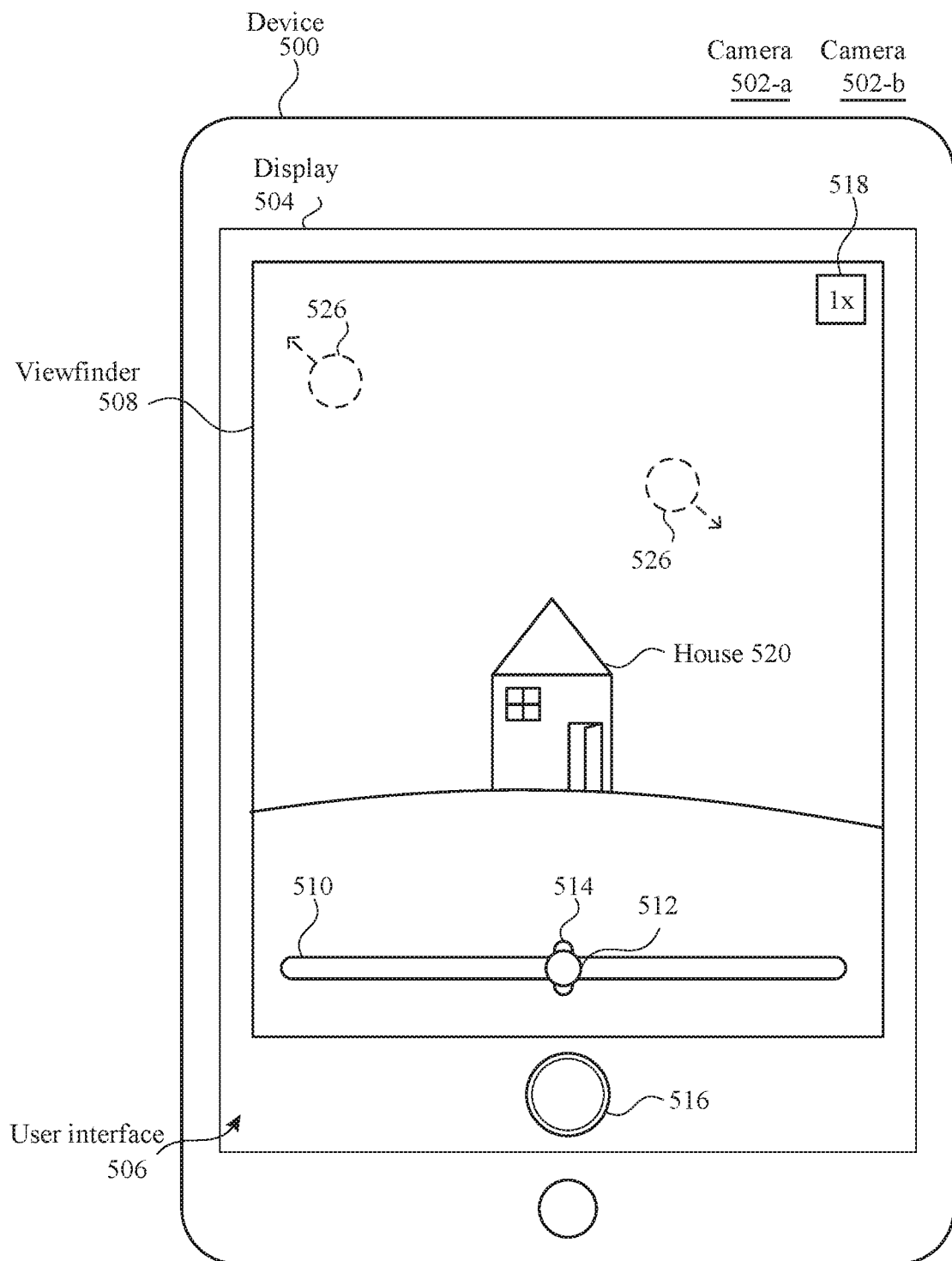
Figure 5I:
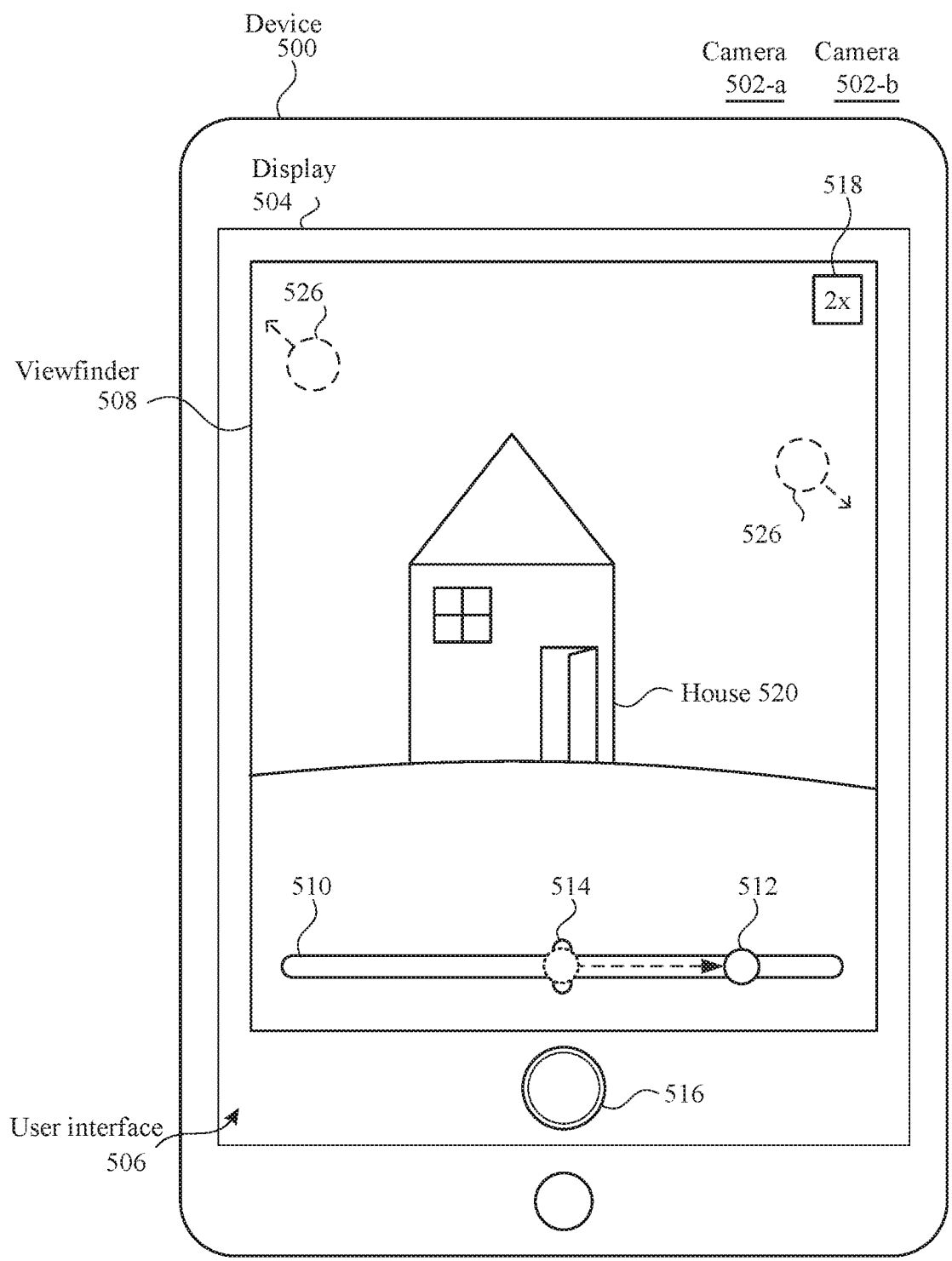
Figure 5J:
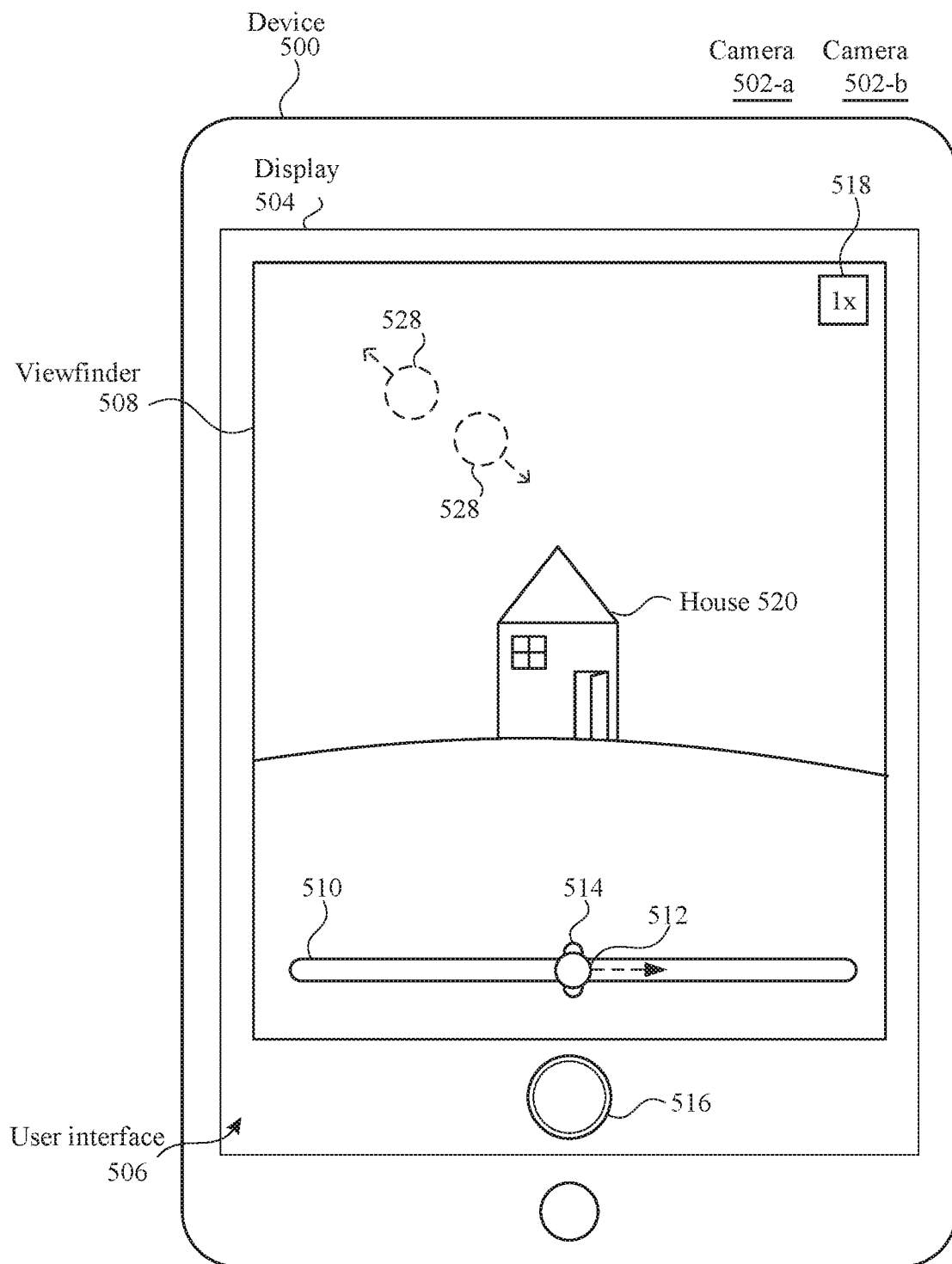
Figure 5K:
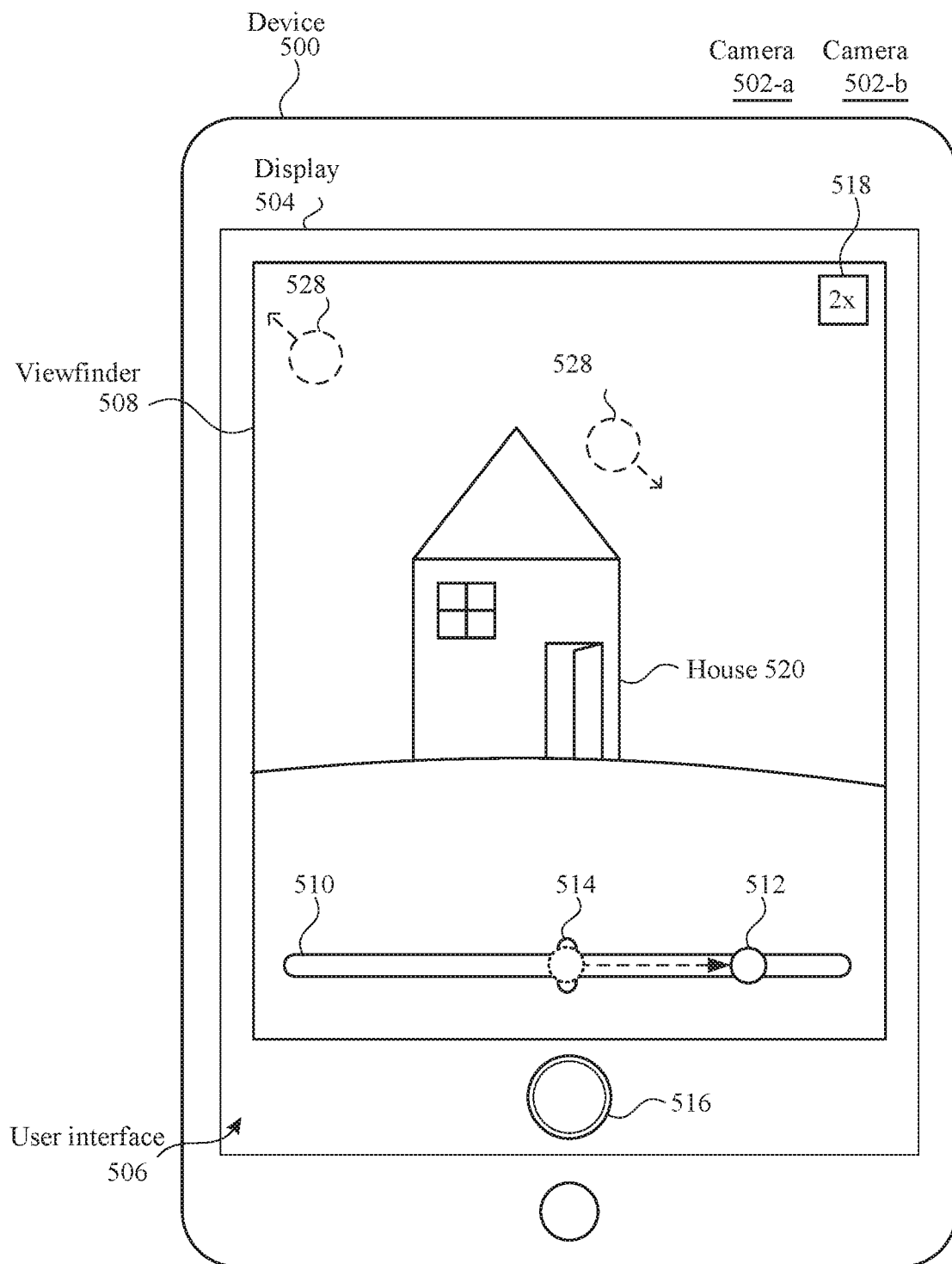
Figure 5L:
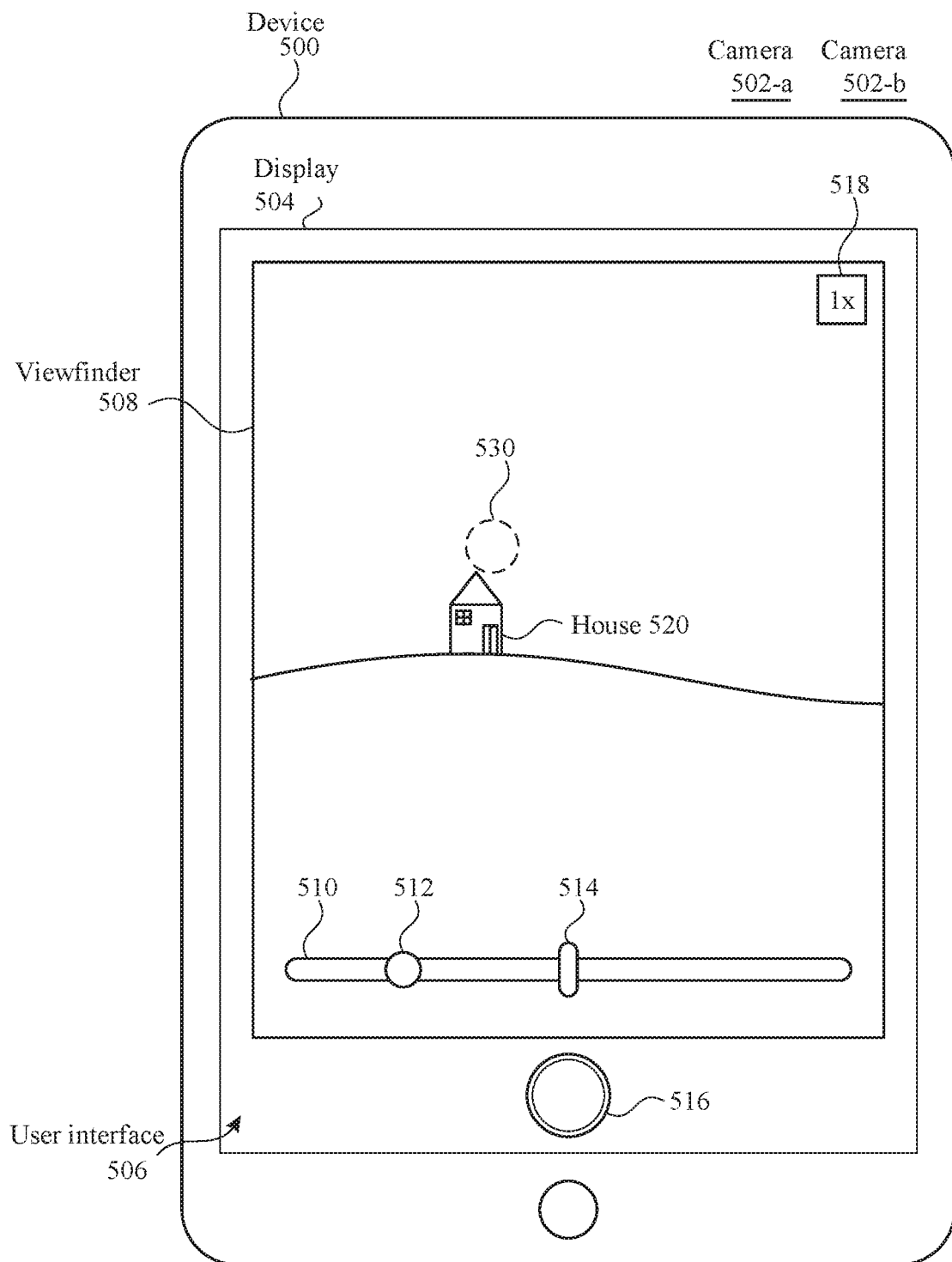
Figure 5M:
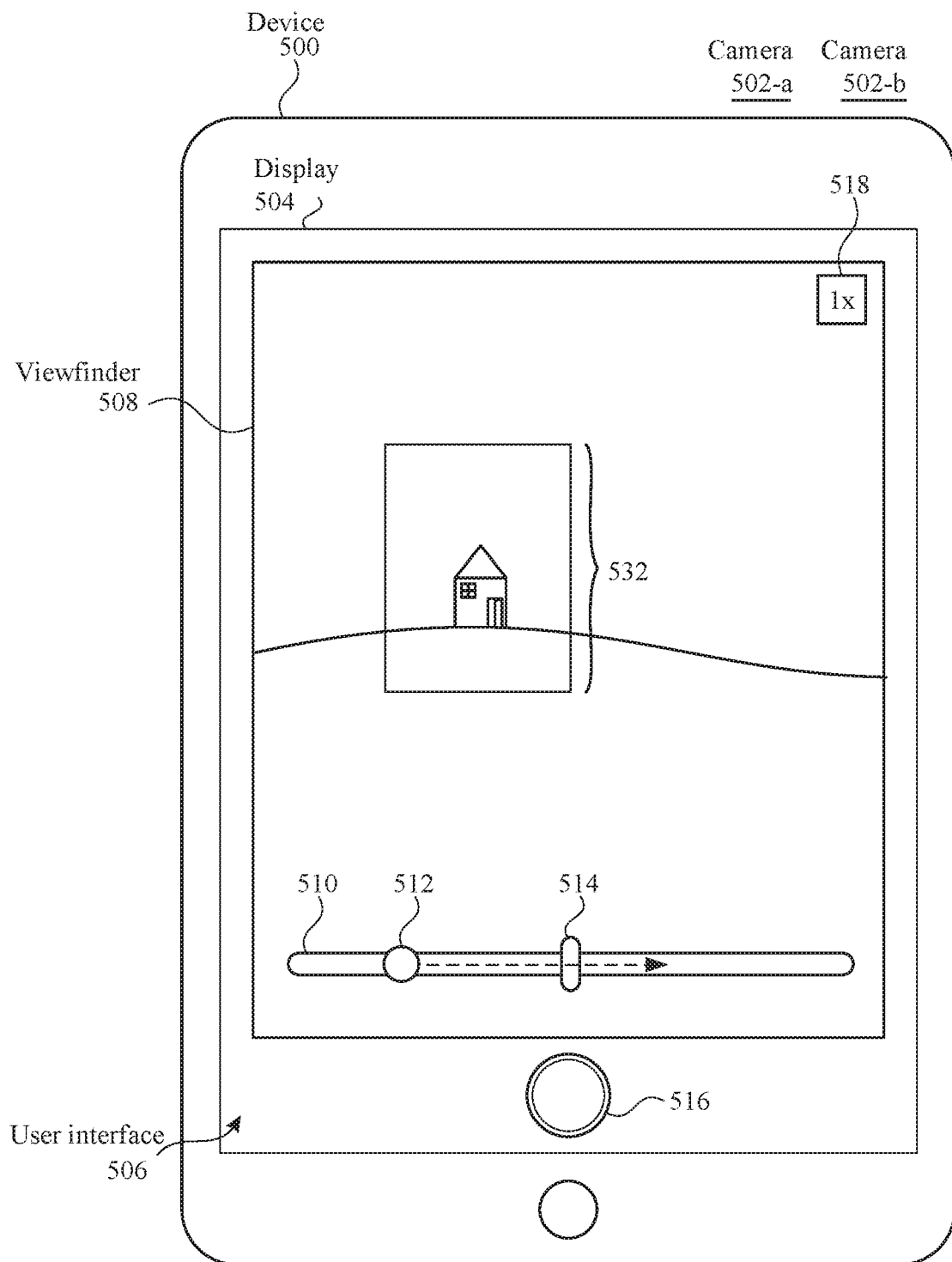
Figure 5N:
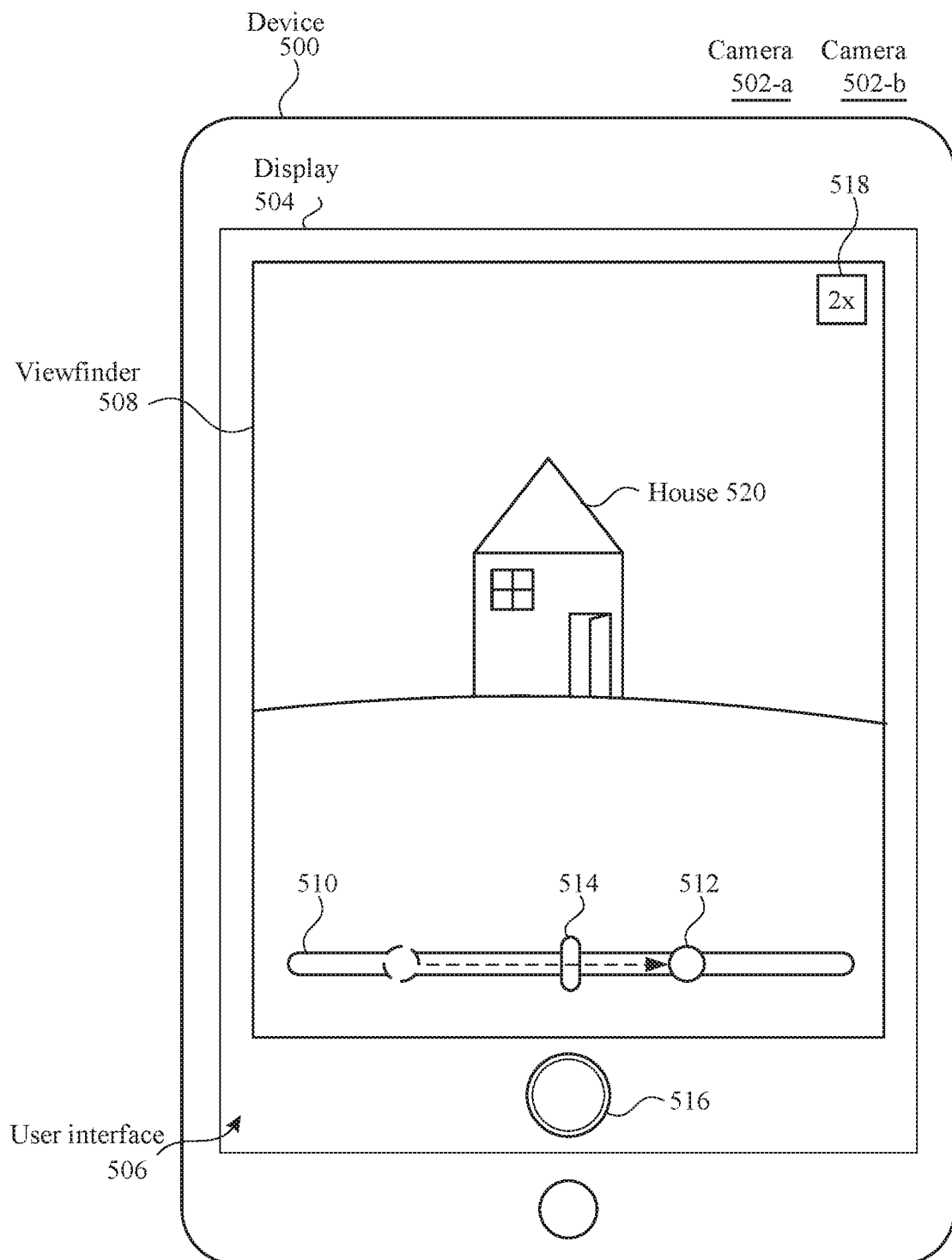
Figure 5O:
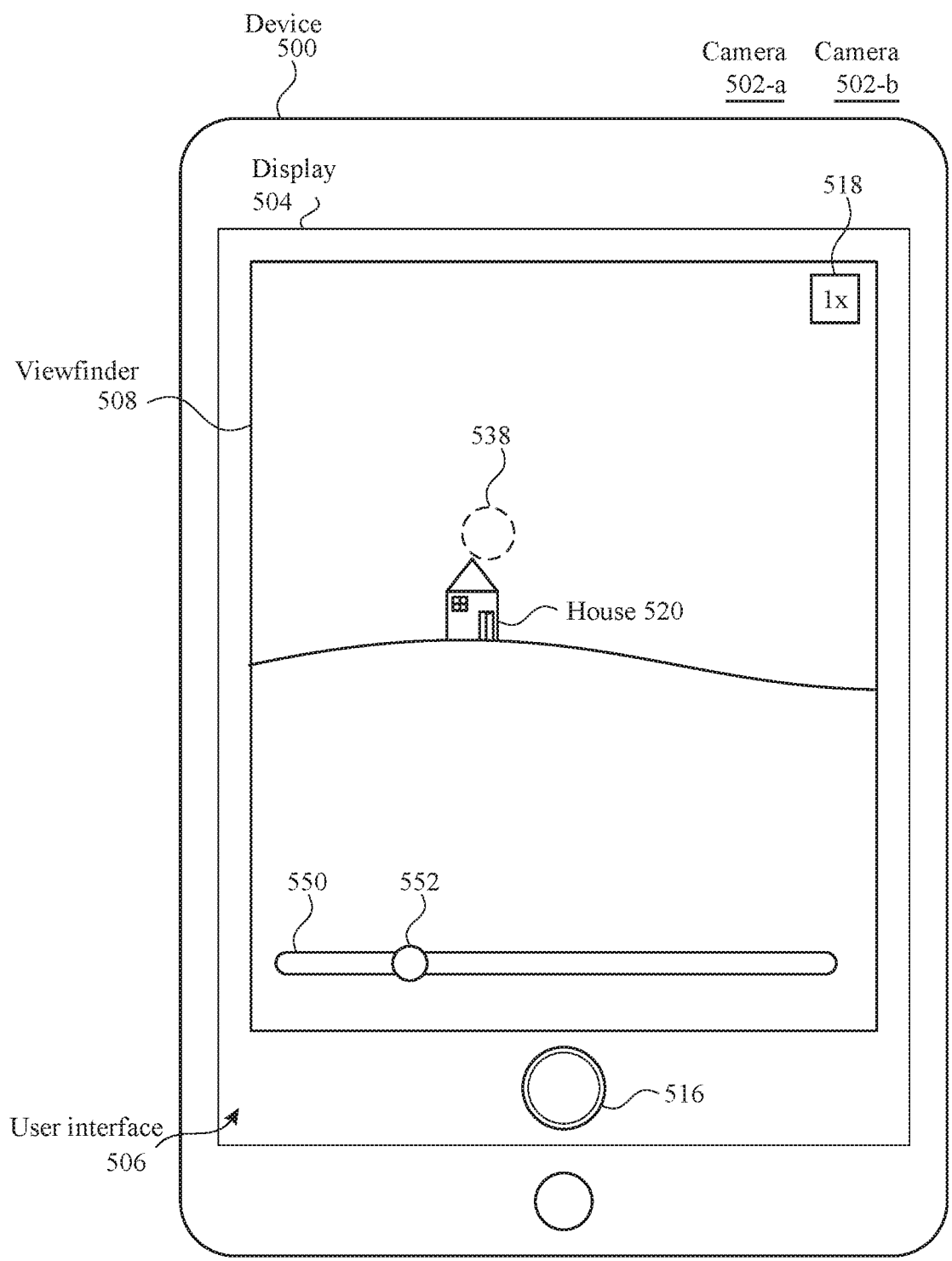
Figure 5P:
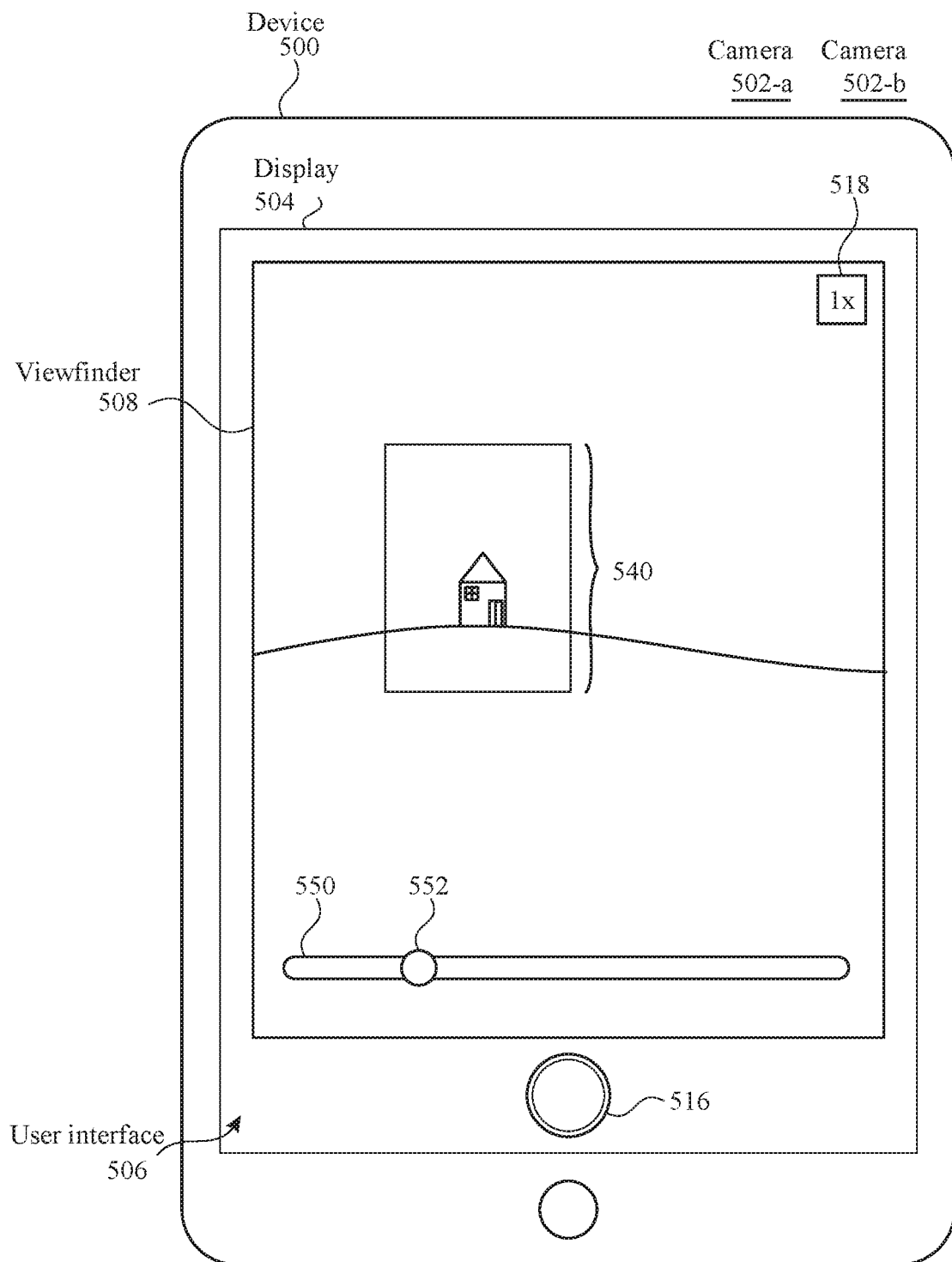
Figure 5Q:
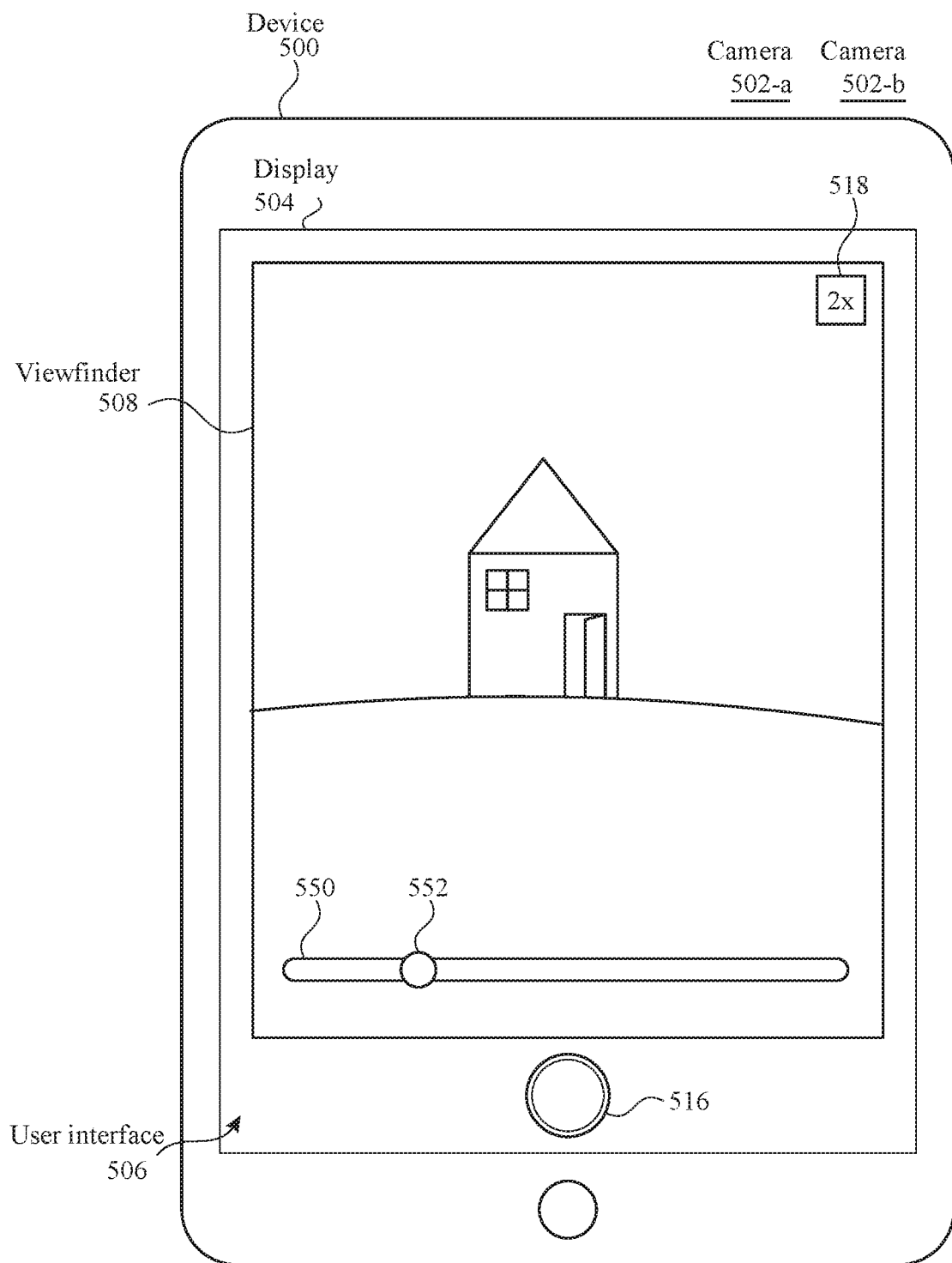
Figure 5R:
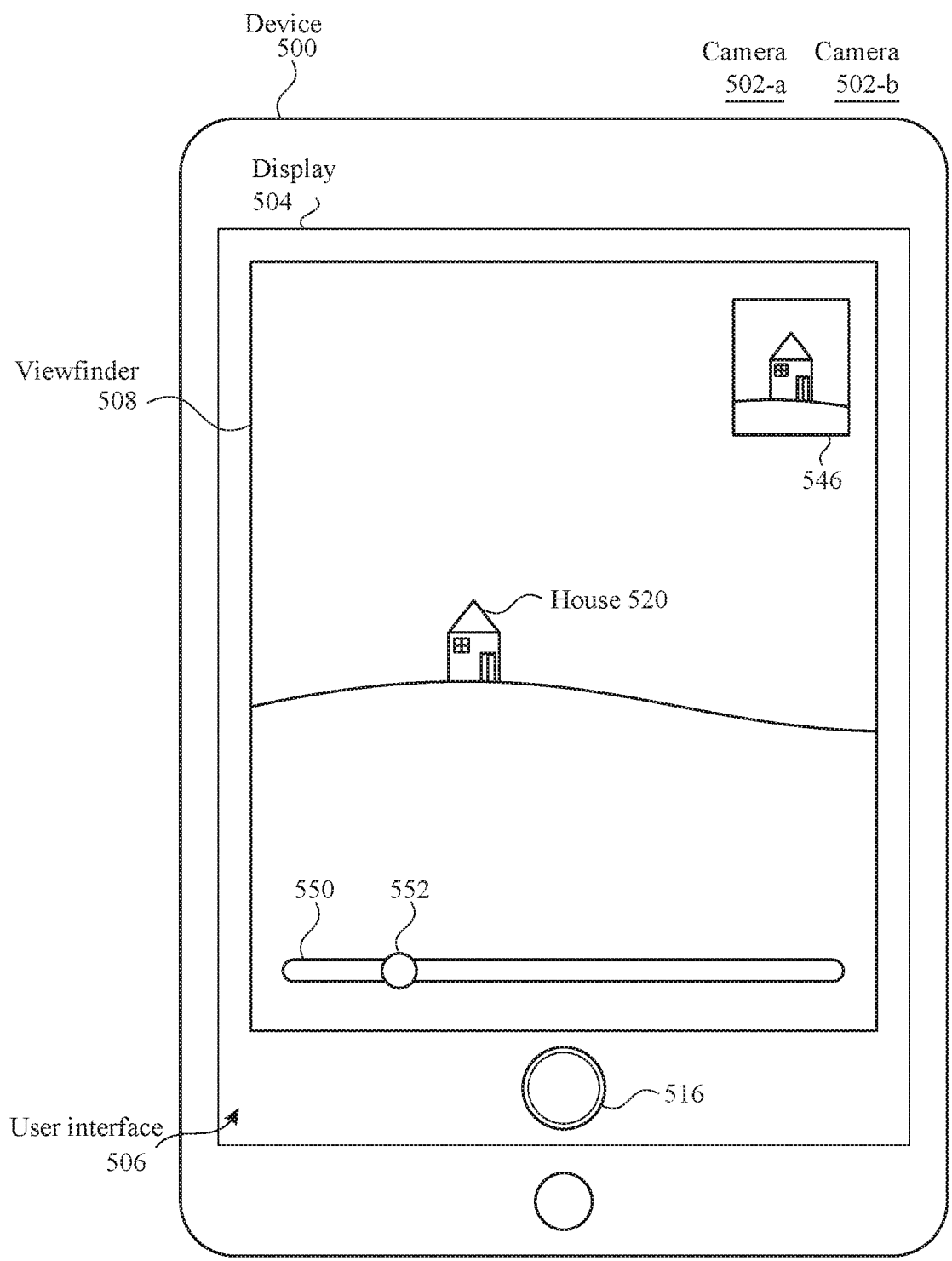
Figure 5S:
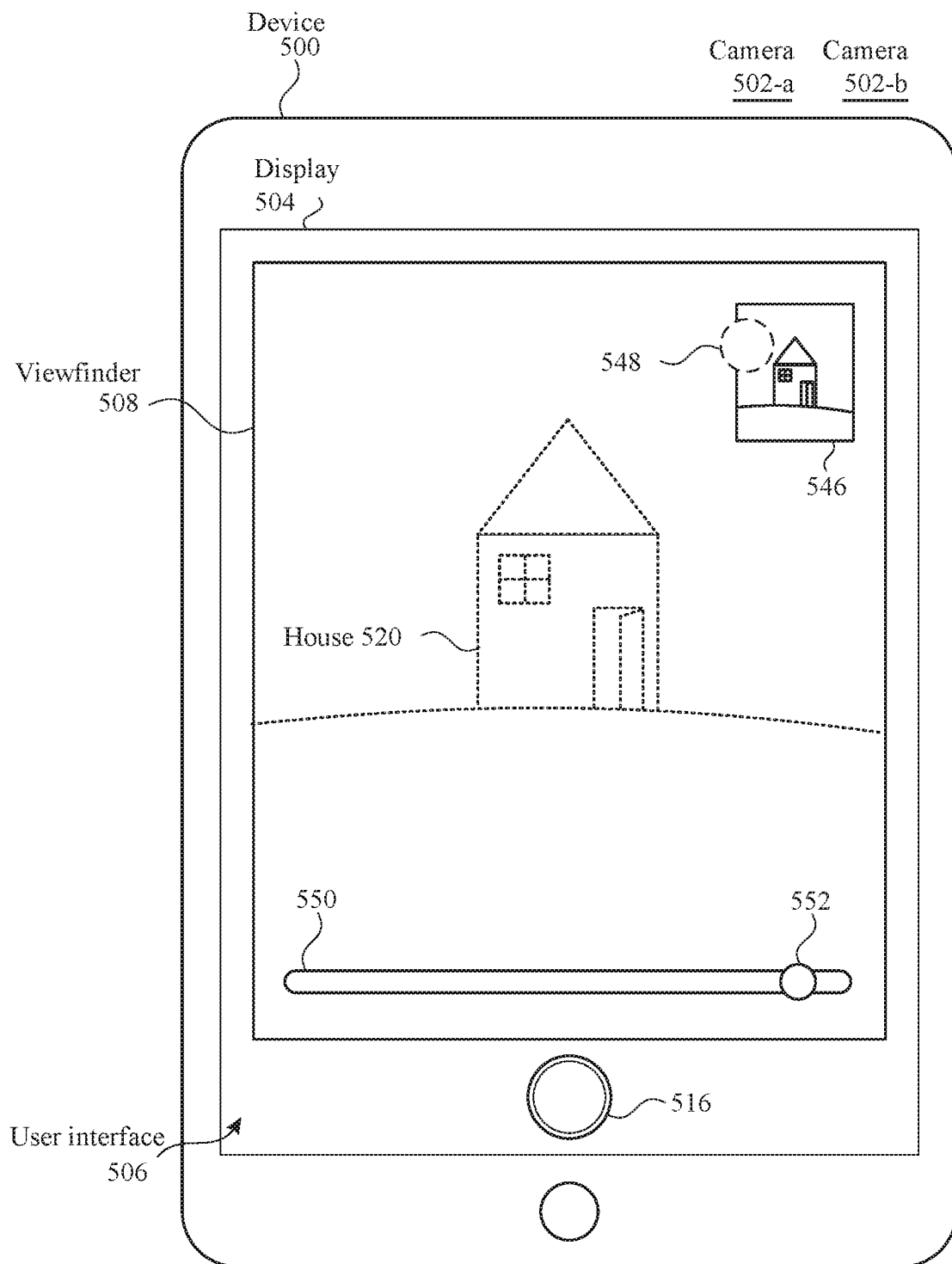
Figure 5T:
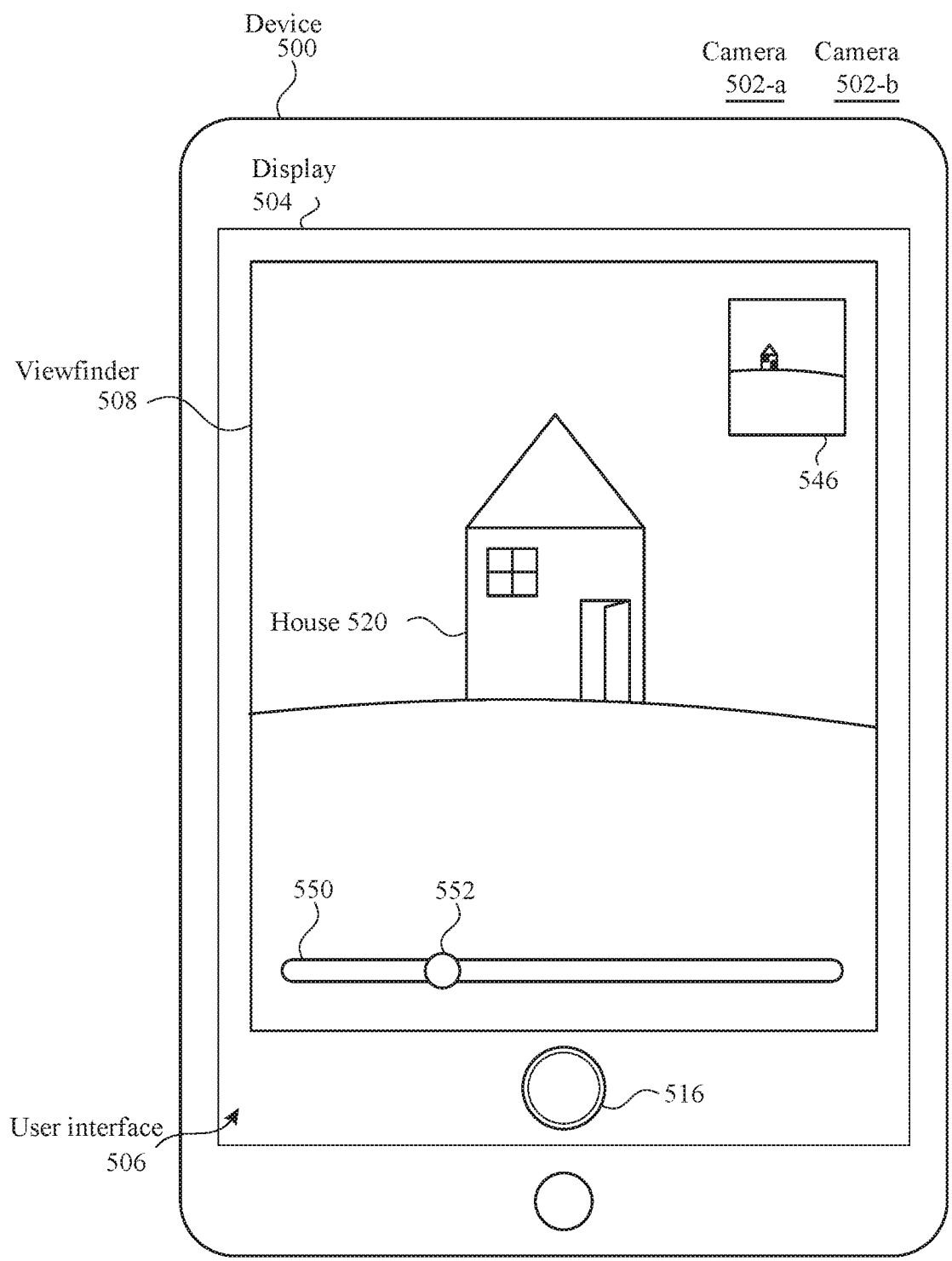

Attention is now directed to devices and user interfaces that enable zooming of a digital viewfinder using content received from multiple cameras, with reference to FIGS. 5A-5T. FIG. 5A depicts exemplary device 500, which is device 100 or 300 (FIGS. 1A, 1B, and 3) in some embodiments. Device 500 has two cameras 502-a and 502-b located on a surface opposite display 504. Cameras 502-a and 502-b are positioned such that they face the same direction and have overlapping fields of view. Cameras 502-a and 502-b have fixed, but different, focal lengths in the exemplary device 500, meaning that the cameras do not provide variable optical zooming capabilities, natively (e.g., zooming accomplished by the movement of one or more optical elements relative to each other so as to change the focusing of incoming light on the camera sensor behind the one or more optical elements). In some examples, the focal length of camera 502-b is twice as long as the focal length of camera 502-a, resulting in camera 502-a having a wider field of view but lower optical magnification, and camera 502-b having a narrow field of view but higher optical magnification. Camera 502-a is also referred to as a "wider-angle camera," while camera 502-b is referred to as a "higher-magnification camera."

Display 504 is touch screen 112 (FIG. 1A) or display 340 (FIG. 3) in some embodiments. Display 504 shows camera user interface 506 provided by a camera application of the device. Digital user interface 506 has digital viewfinder 508 for displaying visual content received from one or more of wider-angle camera 502-a and/or higher-magnification camera 502-b. Viewfinder 508 updates dynamically, meaning that its content changes as objects within the field of view of the viewfinder move with respect to device 500.

In some embodiments, viewfinder 508 displays content from wider-angle camera 502-a or higher-magnification camera 502-b depending on the viewfinder's zoom setting: when the zoom setting of viewfinder 508 is less than a threshold zoom value, viewfinder 508 displays content from one camera (e.g., wider-angle camera 502-a) of device 500. When the zoom setting of viewfinder 508 exceeds the threshold zoom value, digital viewfinder 508 displays content from the other camera of device 500 (e.g., higher-magnification camera 502-b). Because higher-magnification camera 502-b enjoys a greater amount of optical magnification natively, switching from camera 502-a to camera 502-b has the effect of magnifying (e.g., zooming) viewfinder content using the native optical properties of camera 502-b.

In addition to switching between the display of content from different cameras in response to whether a zoom setting exceeds a threshold zoom value, viewfinder 508 provides digital zooming of content, meaning that, for example, while viewfinder 508 is displaying content from wider-angle camera 502-a, viewfinder 508 can perform digital magnification on the content, responsive to changes in zoom setting, proportionately.

Notably, by using fixed camera 502-a to capture wider-angle (but lower-magnification) content and using fixed camera 502-b to capture higher-magnification (but narrower) content, device 500 provides the benefit of higher-quality, optical zooming with the thinner packaging advantages of cameras with fixed focal-length lenses (e.g., "fixed focal length cameras"). As used here, the term "capturing" visual content from a camera refers to using the light that enters the camera to obtain, with an optical sensor(s) (e.g., 164), visual information that can be displayed on a display screen such as display 504.

Camera user interface 506 has affordance 516 for storing visual content into visual media such as an image file or video file. As used here, "storing" captured visual content refers to saving the content into a long-term memory storage, such as by creating an image or video file having data representing the captured content in a non-volatile memory area of device 500. In the depicted example, when the zoom setting of viewfinder 508 is less than a threshold zoom value, responsive to activation of affordance 516, device 500 stores content from wider-angle camera 502-a into an image file, consistent with the composition shown in viewfinder 508. When the zoom setting of viewfinder 508 exceeds the threshold zoom value, the device stores visual content from higher-magnification camera 502-b as an image file instead. Thus, device 500 stores visual content from a wider-angle camera when the user desires a wider-angled composition, and stores content from a higher-magnification camera when the user desires emphasis of an object of interest, such as house 520.

Also, viewfinder 508 has zoom setting slider bar 510 and current zoom setting indicator 512. The term "zoom setting" refers to a value reflective of the overall magnification that is applied to viewfinder content. This overall magnification can account for optical and/or digital magnification. "Optical magnification" refers to the magnification arising from the physical properties of a camera (e.g., CCD and lens(es)) and is sometimes referred to as base magnification. A camera of fixed focal length design provides a fixed optical magnification, if any. A camera of variable focal length design can provide variable optical magnification. In contrast, "digital magnification" refers to digital enlargement of content received from a camera that may (but need not) have already experienced optical magnification.

The length of slider bar 510 represents the range over which digital viewfinder 508 can be zoomed (through digital and/or optical magnification). The position of current zoom setting indicator 512 indicates the current level of zoom. In the illustrated example, when indictor 512 is located at the left end of slider bar 510, digital viewfinder 508 displays content from wider-angle camera 502-a at its native level of optical magnification, without digital magnification. When indicator 512 is located at the right end of slider bar 510, viewfinder 508 displays content from higher-magnification camera 502-b at a maximum level of digital magnification. In-between, viewfinder 508 displays content from one of cameras 502 with an amount of digital magnification (corresponding to the position of indicator 512) in addition to the native optical magnification of the camera being used.

Slider bar 510 includes optional threshold zoom setting indicator 514 representing the value of zoom at which viewfinder 508 switches between the use of content from wider-angle camera 502-a to higher-magnification camera 502-b. As used here, the term "source camera" refers to the camera that is providing the content being displayed in a digital viewfinder such as viewfinder 508. Viewfinder 508 includes optional source camera indicator 518, which displays a value indicative of the source camera. Source camera indicator 518 in FIG. 5A shows the verbiage "1×" to indicate that a lower-magnification, for example, wider-angle camera 502-a, is currently providing content to the viewfinder. Source camera indicator 518 can show alternative verbiage (e.g., "2×") when a higher-magnification camera, for example, camera 502-b, is providing content to the viewfinder.

Turning to FIG. 5B, when device 500 detects movement of current zoom setting indicator 512 from its position in FIG. 5A in a rightward direction, viewfinder 508 enlarges its content. In embodiments utilizing fixed focal length cameras, this enlargement is provided by digital magnification of content (e.g., from wider-angle camera 502-a). Also, the change in zoom setting corresponds to the magnitude of the user input, meaning that content in viewfinder 508 zooms continuously as the user continues to move indicator 512. In some embodiments, the change in zoom setting is proportional to the magnitude of input movement.

When continued movement of indicator 512 results in the indicator being moved across threshold zoom setting indicator 514, viewfinder 508 switches from displaying content from wider-angle camera 502-a to displaying content from higher-magnification camera 502-b. Because higher-magnification camera 502-b provides higher (native) optical magnification, a lesser amount of digital magnification (if any) is needed to maintain the overall size of the viewfinder's content.

As the user continues to move indicator 512 rightward of threshold zoom setting indicator 514, viewfinder 508 applies digital magnification to the content from higher-magnification camera 502-b correspondingly and, optionally, proportionately with the magnitude of input movement. In this way, zoom setting slider bar 510 and current zoom setting indicator 512 constitute a "slider" control that governs the zoom setting of viewfinder 508 over the functional ranges of multiple cameras.

This zooming capability is beneficial in at least two ways. First, because camera 502-a has a wider field of view than camera 502-b, viewfinder 508 can leverage wider-angle camera 502-a to provide more expansive visual compositions, allowing for more objects of interest to be included in an image taken with device 500 for example. Conversely, because camera 502-b has higher native optical magnification, viewfinder 508 can leverage higher-magnification camera 502-b to provide a targeted composition, allowing for a crisper, magnified view of one object of interest among multiple nearby objects. When implemented using cameras of fixed focal lengths, as is the case in the depicted embodiment, device 500 leverages the relatively simpler designs of fixed focal length cameras to impart higher-quality variable zoom functionality in thin form-factor devices. Second, viewfinder 508 does not require the user's active management of source camera selection, even as the user zooms through the useful ranges though of multiple source cameras, thereby reducing the cognitive burden on the user.

Attention is now directed to more techniques for controlling zoom settings, in addition to the use of a slider control, provided by viewfinder 508 in some embodiments. FIGS. 5C and 5D depict the use of touch input such as tapping input and de-pinching and/or pinching input to change the zoom setting of viewfinder 508. As depicted in FIG. 5C, user instruction to zoom viewfinder 508 can be a tap input such as single-finger tap input 522 and/or two-finger tap input 524. As seen in FIG. 5D, responsive to either input 522 or 524, viewfinder 508 zooms into the displayed content (e.g., house 520) by switching to the use of content from higher-magnification camera 502-b (optionally applying digital magnification onto the received content). Viewfinder 508 also re-positions current zoom level indicator 512 to reflect the updated zoom setting. Further, viewfinder 508 updates source camera indicator 518 to indicate that viewfinder 508 is in a higher-magnification setting, for example, by displaying the verbiage of "2×" to indicate that viewfinder 508 is displaying content from a higher-magnification camera of the device. Although not shown, it is noted that finger taps 522 and 524 can each involve a single tap or multiple taps. In some embodiments, input 522 is a single-finger, double-tap touch input on display 504 or a touch-sensitive surface associated with display 504.

Attention is now directed to additional techniques for controlling viewfinder zoom settings, particularly those related to the behavior of viewfinder 508 as its zoom setting is adjusted at or near the threshold value represented by threshold zoom setting indicator 514, with reference to FIGS. 5E-5K. FIG. 5E depicts viewfinder 508 displaying an object of interest—house 520—at relatively zoomed-out setting using a low amount of digital magnification on content obtained from camera wider-angle 502-a. This zoom setting is confirmed by the position of current zoom setting indicator 512 towards the left end of zoom setting slider bar 510, as well as the indication of "1×" in source camera indicator 518. While displaying house 520, device 500 receives a de-pinching input represented by touches 526.

Turning to FIG. 5F, de-pinching input 526 causes viewfinder 508 to zoom-in, through digital magnification, onto the content from wider-angle camera 502-a. As the touch contacts of touches 526 move apart, the viewfinder zooms correspondingly. This change in zoom setting results in an enlargement of the displayed house 520 and a corresponding movement of current zoom level indicator 512 in the rightward direction towards threshold indicator 514. In the depicted example, the magnitude of content enlargement and movement of indicator 512 are proportional to the magnitude of de-pinching input 526

FIG. 5G depicts the behavior of viewfinder 508 responsive to continued de-pinching input 526, which is now of sufficient magnitude to move the zoom setting of the viewfinder beyond the threshold zoom setting represented by indicator 514. But, viewfinder 508 ceases to zoom beyond the threshold zoom setting, despite the continued de-pinching movement of input 526. In this way, threshold zoom setting indicator 514 provides a "detent" feature, emphasizing to the user that the end of the useful zoom range of one camera (e.g., wider-angle camera 502-a) has been reached and that further zooming operations will cause the device to switch from using the wider-angle camera to using the higher-magnification camera.

The detent can be overcome. In some embodiments, the detent is overcome if a user continues de-pinching input 526 by a sufficient magnitude after the viewfinder's zoom setting has reached the threshold value of indicator 514. FIGS. 5H and 5I depict this aspect. As seen in FIG. 5H, device 500 receives continued movement of de-pinching input 526 after the viewfinder's zoom setting has reached the threshold represented by indicator 514. Viewfinder 508 determines whether this continued input has a magnitude exceeding a threshold magnitude, for example, a predetermined threshold distance. If the continued movement is below the threshold magnitude, the zoom setting of viewfinder 508 remains stationary, as seen in FIG. 5J. If the continued movement of de-pinching input 526 exceeds the threshold magnitude, viewfinder 508 switches source camera to higher-magnification camera 502-b, meaning that zooming resumes, as seen in FIG. 5I.

When viewfinder 508 resumes zooming, the change in overall zoom setting is proportional to the overall movement of de-pinching input 526, in some embodiments. That is, once the continued movement of de-pinching input 526 overcomes the detent, viewfinder 508 reacts as though the detent had not occurred: the zoom setting of the viewfinder catches up with the overall magnitude of the de-pinching input. In some embodiments, when viewfinder 508 resumes zooming, the change in zoom setting is proportional to only the post-detent movement of de-pinching input 526. Put another way, in these embodiments, a portion of the movement of de-pinching input 526 is consumed to overcome the detent.

In some embodiments, the detent is overcome when a user provides a second, separate de-pinching input after releasing input 526. FIGS. 5J and 5K illustrate this aspect. As seen in FIG. 5J, device 500 receives separate de-pinching input 528, after previous de-pinching input 526 is removed (e.g., after detecting liftoff of one or more of the contacts of de-pinching input 526). In response to this additional input 528, viewfinder 508 zooms beyond the zoom value of threshold indicator 514, meaning that viewfinder 508 switches from displaying content from wider-angle camera 502-a to displaying content from higher-magnification camera 502-b. As seen in FIG. 5K, house 520 is enlarged as compared with FIG. 5J. The higher level of zoom is also confirmed by the corresponding movement of current zoom setting indicator 512 and by the use of the verbiage "2×" in source camera indicator 518.

It is noted that while the "detent" features described using FIGS. 5E-5K are based on de-pinching and/or pinching touch inputs, the described features can function with other forms of user input. For example, the "detent" feature would also function with user input in the form of a touch movement of current zoom setting indicator 512 across threshold indicator 514 and/or depression of a mechanical zoom button or movement of zoom setting indicator 512 using a cursor and input device such as a mouse/trackpad.

Attention is now directed to still additional zoom-related features with reference to FIGS. 5L-5N. Turning to FIG. 5L, while viewfinder 508 is displaying content from wider-angle camera 502-a, device 500 detects input 530 at a location of display 504. Input 530 is a single-finger tap input in the depicted example. As seen in FIG. 5M, responsive to input 530, viewfinder 508 displays boundary box 532 indicating the area that viewfinder 508 is to zoom into. After displaying boundary box 532 momentarily, viewfinder 508 zooms into the indicated area, as seen in FIG. 5N. Although not shown, boundary box 532 has a dotted perimeter in some embodiments. Although not shown, boundary box 532 flashes when it is displayed in some embodiments.

In the foregoing examples of FIGS. 5A-5N, viewfinder 508 includes a zoom setting slider bar 510 that represents the useful zoom ranges of multiple cameras. Attention is now directed to other exemplary implementations of slider bars, particularly embodiments where a slider bar represents the range of only the source camera of a viewfinder, meaning that the slider acts an indicator of digital magnification (on content from a source camera), but not overall zoom (e.g., digital together with optical magnification).

This aspect is illustrated in FIGS. 5O-5Q. As seen in FIG. 5O, source camera indicator 518 indicates that the current source camera is wider-angle camera 502-a. The width of zoom setting slider bar 550 thus depicts the zoom range of wider-angle camera 502-a. Slider bar 550 need not include a discontinuity (e.g., a threshold value indicator) to signal the boundary between separate source cameras.

Responsive to input 538 representing user instructions to increase zoom, viewfinder 508 shows boundary box 540 identifying the area to be zoomed-into, as seen in FIG. 5P. After displaying boundary box 540 momentarily, viewfinder 508 zooms into the identified area by switching to the display of content from higher-magnification camera 502-b, as seen in FIG. 5Q (and, optionally, applies a digital magnification to content received from camera 502-b).

Furthermore, in the depicted embodiment, the amount of digital magnification that is applied to content from a source camera remains constant before and after the switch in source cameras. Device 500 accounts for the amount of digital magnification being applied onto content from wider-angle camera 502-a before the switch (e.g., FIG. 5O), and applies the same amount of digital magnification onto content from higher-magnification camera 502-b after the switch (e.g., FIG. 5Q). The positioning of current zoom setting indicator 552 thus remains stationary during source camera switches, even though viewfinder content becomes enlarged due to the higher native optical magnification of the new source camera. This treatment of indicator 552 beneficially reduces jitter in the zoom slider control during source camera switches.

Attention is now directed to techniques for directly selecting a source camera to be used as source for viewfinder 508, in some embodiments, with reference to FIGS. 5R-5T. As seen in FIG. 5R, while viewfinder 508 is displaying content from one camera (e.g., wider-angle camera 502-a), the viewfinder shows camera selection affordance 546. Camera selection affordance 546 provides a preview of content from another camera (e.g., higher-magnification camera 502-b). That is, affordance 546 acts as a miniature viewfinder by showing a dynamic thumbnail image sourced from an alternate camera of device 500.

Camera selection affordance 546 is particularly useful where a user wishes to explore the impact of digital magnification versus optical magnification for artistic effect, for example. In these examples, viewfinder 508 permits the user to enlarge the content of a wider-angle camera to the degree where the digitally magnified content appears grainy. FIG. 5S depicts the digital magnification of house 520 to this extent (as depicted by the use of dotted lines). Simultaneous with this display of house 520, viewfinder 508 provides affordance 546 a preview from higher-magnification camera 502-b, suggesting to the user that an alternate source of content is available.

When device 500 detects input 548 on affordance 546, viewfinder 508 switches from the display of content from wider-angle camera 502-a to the display of content from higher-magnification camera 502-b. Leveraging the higher native optical magnification properties of camera 502-b, viewfinder 508 provides a crisper version of house 520 as compared with camera 502-a at equivalent levels of overall (e.g., digital and optical) magnification. While viewfinder 508 displays content from higher-magnification camera 502-b, affordance 546 updates to display content from wider-angle camera 502-a dynamically.

In the depicted embodiment, the amount of overall magnification due to digital and optical magnification that is applied to content from a source camera remains constant before and after the switch in source cameras. For example, device 500 accounts for the amount of digital magnification that is applied to the base optical magnification of wider-angle camera 502-a before the switch in source cameras, and determines a corresponding (e.g., lower) amount of digital magnification that should be applied to content from higher-magnification camera 502-b after the switch, so that the combined effects of digital and native optical magnification with respect to viewfinder objects remain the same before and after switching source cameras. As can be seen by comparing FIGS. 5S and 5T, house 520 appears at approximately the same size before and after the switch in source cameras. This treatment of viewfinder content beneficially reduces jitter in the viewfinder display area during source camera switches.

In some embodiments, camera selection affordance 546 is displayed only after a user zooms viewfinder 508 beyond a threshold zoom setting. This withholding of the display of affordance 546 reduces on-screen clutter and increases the amount of display area that is available for previewing content from an active source camera.

In some embodiments, camera selection affordance 546 does not provide a dynamic preview of content, but is instead fashioned as an "enhance" button, such as by displaying affordance 546 as a button labeled "enhance". In these embodiments, when the "enhance" button is selected, viewfinder 508 switches source cameras, and performs the necessary calculations to maintain the on-screen size of viewfinder content. By switching source cameras to provide a crisper showing of viewfinder content at the same size, affordance 546 provides the visual effect of enhancing the displayed viewfinder content.

In the examples of FIGS. 5A-5T, device 500 switches between displaying content from multiple cameras responsive to user interaction with viewfinder 508. The on-screen switching of source cameras can, however, introduce visual artifacts into viewfinder 508 that distract from the overall user experience. For example, viewfinder 508 may appear jittery if content from one camera is not aligned with content from another camera during a switch of source cameras. This effect, due to parallax, increases as the distance between the cameras increases and decreases as the distance between the cameras and the subject increases.

Attention is now directed to other features that mitigate negative visual impacts while zooming the viewfinder. In some embodiments, viewfinder 508 provides a transition effect during the switching of source cameras. In some examples, the transition effect is a cross-fade effect in which content from both cameras are blended and displayed momentarily. In some examples, the transition effect is a cross-fade effect in which content from both cameras are simultaneously displayed atop one another as translucent overlays, momentarily. In some examples, the transition effect is a blur effect in which content from one or both cameras is blurred momentarily. The level of blending, translucency, and/or blur is adjusted dynamically as the zoom setting changes in some embodiments. These transition effects mask minor misalignments in viewfinder content positioning and/or changes in viewfinder object sizes resulting from the switch in source camera, thereby improving the perceived quality of device 500.

In some embodiments, viewfinder 508 reduces parallax associated with switching source cameras. As the cameras of device 500 may not be concentric, but are rather placed side by side, switching between source cameras can produce minor parallax caused by the different positions (or vantage points) of the cameras relative to the subject. To reduce the appearance of parallax within viewfinder 508 in these embodiments, device 500 identifies a portion of viewfinder content that is to survive the switch (e.g., a point of interest such as a portion of house 520), and performs calculations necessary to maintain the portion of interest at the same location of display 504. More specifically, viewfinder 508 shifts as necessary the visual content received from the new source camera and/or the old source camera so that the point of interest is displayed at the same pixel(s) of display 504 before and after the switch in source cameras. If the point of interest is selected so that it include the region of the visual content that the user is interested in and likely looking at (e.g., by selecting a focus point selected by the user or a centroid of a pinch input), the shift caused by parallax when switching between the two cameras is reduced for the region of the visual content that the user is interested in (even though a greater shift caused by parallax will occur in other regions of the visual content).

In some embodiments, the point of interest is specified by the user, such as the location of a tap or the centroid of a de-pinching input. In some embodiments, the point of interest is specified by the device, such as by identifying a portion of viewfinder content that exhibits pixel-to-pixel variations indicative of a foreground object (as opposed to background), and that to survive the camera switch operation. In this way, device 500 reduces the appearance of parallax caused by differences in camera vantage points.

In some embodiments, visual artifacts in the viewfinder that can be caused by switching source cameras is avoided altogether by confining viewfinder 508 to the display of content from a preferred camera, regardless of zoom setting. For instance, because wider-angle camera 502-a has a field-of-view that subsumes the field of view of the higher-magnification camera 502-b, viewfinder 508 can rely on digital magnification of content from wider-angle camera 502-a to mimic the display of content from higher-magnification camera 502-b, without resorting to the use of higher-magnification camera 502-b.

In some embodiments, when a user elects to store a captured picture, for example by activating affordance 516, device 500 identifies and uses the camera most optimal for capturing content at the overall zoom setting to create the output media. For example, if viewfinder 508 is at a zoom setting below the threshold value represented by indicator 514 (FIG. 5A), device 500 stores visual information from wider-angle camera 502-a, as the same image composition cannot be obtained from camera 502-b, which has a narrower field of view. Conversely, if viewfinder is 508 at a zoom setting above the threshold value, device 500 stores visual information from the higher optical-magnification camera 502-b, as the higher-magnification camera enjoys greater clarity using native optical magnification.

2. Dual Digital Viewfinder

Figure 6A:
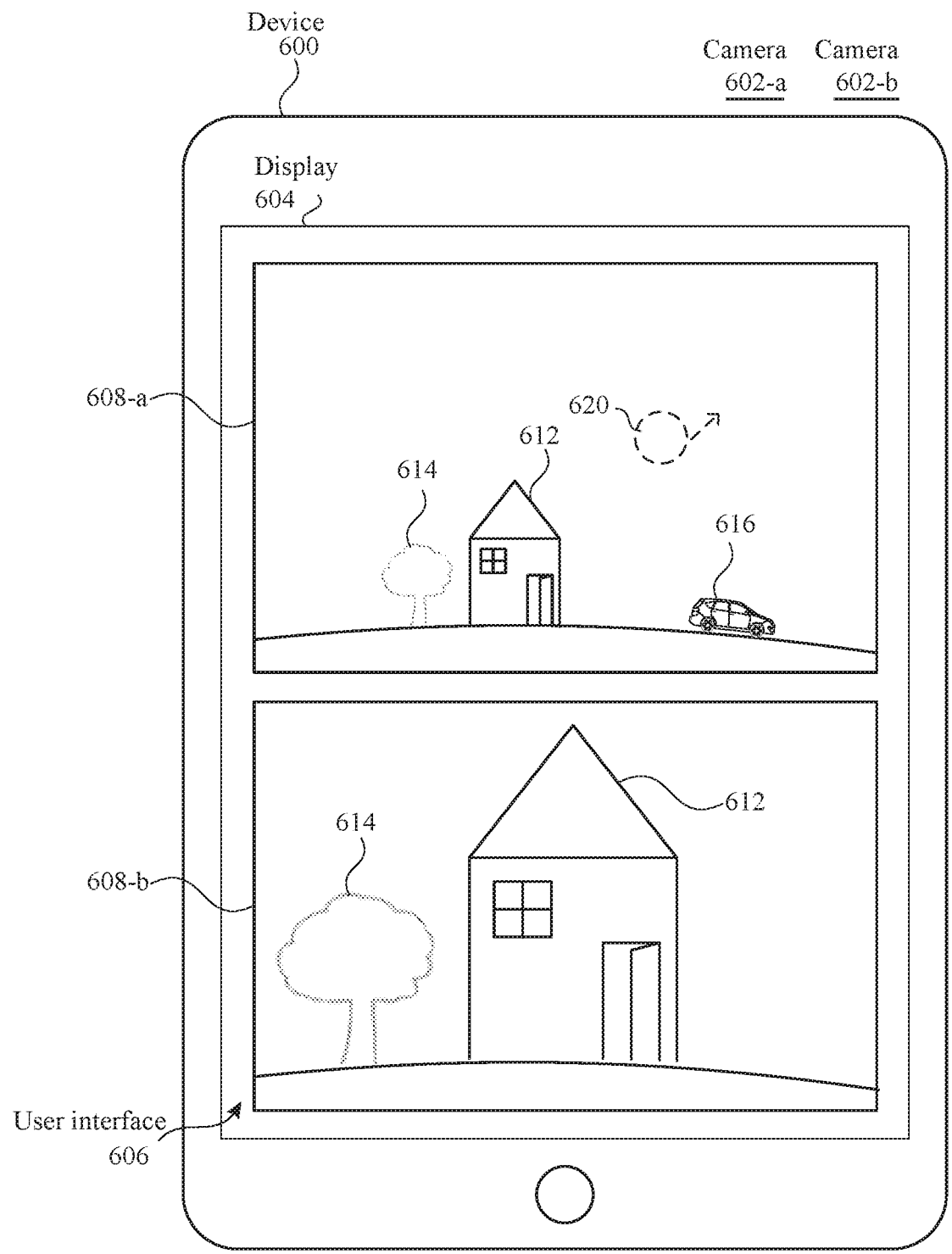
FIGS. 6A-6G illustrate exemplary user interfaces for storing visual content using multiple cameras in accordance with some embodiments.

Attention is now directed to embodiments featuring dual, simultaneously displayed digital viewfinders for creating still images, with reference to FIGS. 6A-6E. As seen in FIG. 6A, device 600 has cameras 602-a and 602-b located on a side opposite of display 604. Display 604 provides camera user interface 606 having dual digital viewfinders 608-a and 608-b. Viewfinder 608-a displays content from one camera (e.g., camera 602-a) while viewfinder 608-b displays content from the other camera (e.g., camera 602-b), simultaneously. Camera 602-a is a wider-angle camera and camera 602-b is a higher-magnification camera, in some embodiments.

User interface 606 allows a user to manage the compositions of digital viewfinders 608-a and 608-b independently, such as by zooming, panning, and freezing viewfinder content. User interface 606 also allows a user to store visual information from both cameras simultaneously. In some embodiments, visual information from both cameras are stored or otherwise associated with one another, forming what is referred to as a "diptych" image.

As seen in FIG. 6A, viewfinder 608-a, which displays content from wider-angle camera 602-a, allows viewfinder objects including house 612, tree 614, and car 616 to be previewed together. In contrast, viewfinder 608-b, which displays content from higher-magnification camera 602-b, allows house 612 and tree 614 to be previewed at a larger size, but is unable to capture car 616 within its narrower field of view.

Figure 6B:
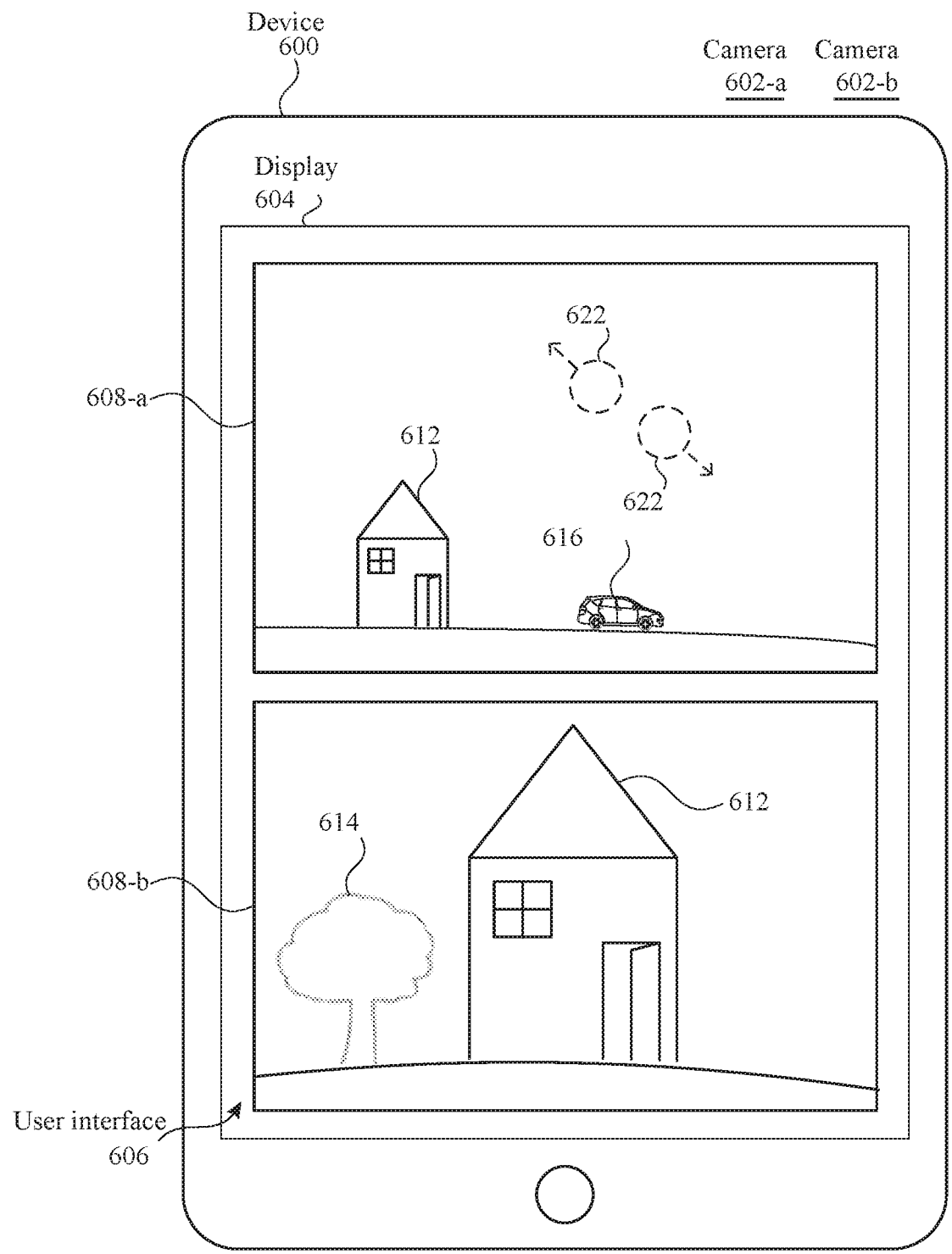

Turning to FIG. 6B while referring back to FIG. 6A, in response to exemplary user input 620, which is a touch movement within the display area of viewfinder 608-a, viewfinder 608-a pans rightward, effectively removing tree 614 from view. Viewfinder 608-b does not pan in response to user input 620, as the input falls outside (or, optionally because the input starts outside) of the display area of viewfinder 608-b.

Figure 6C:
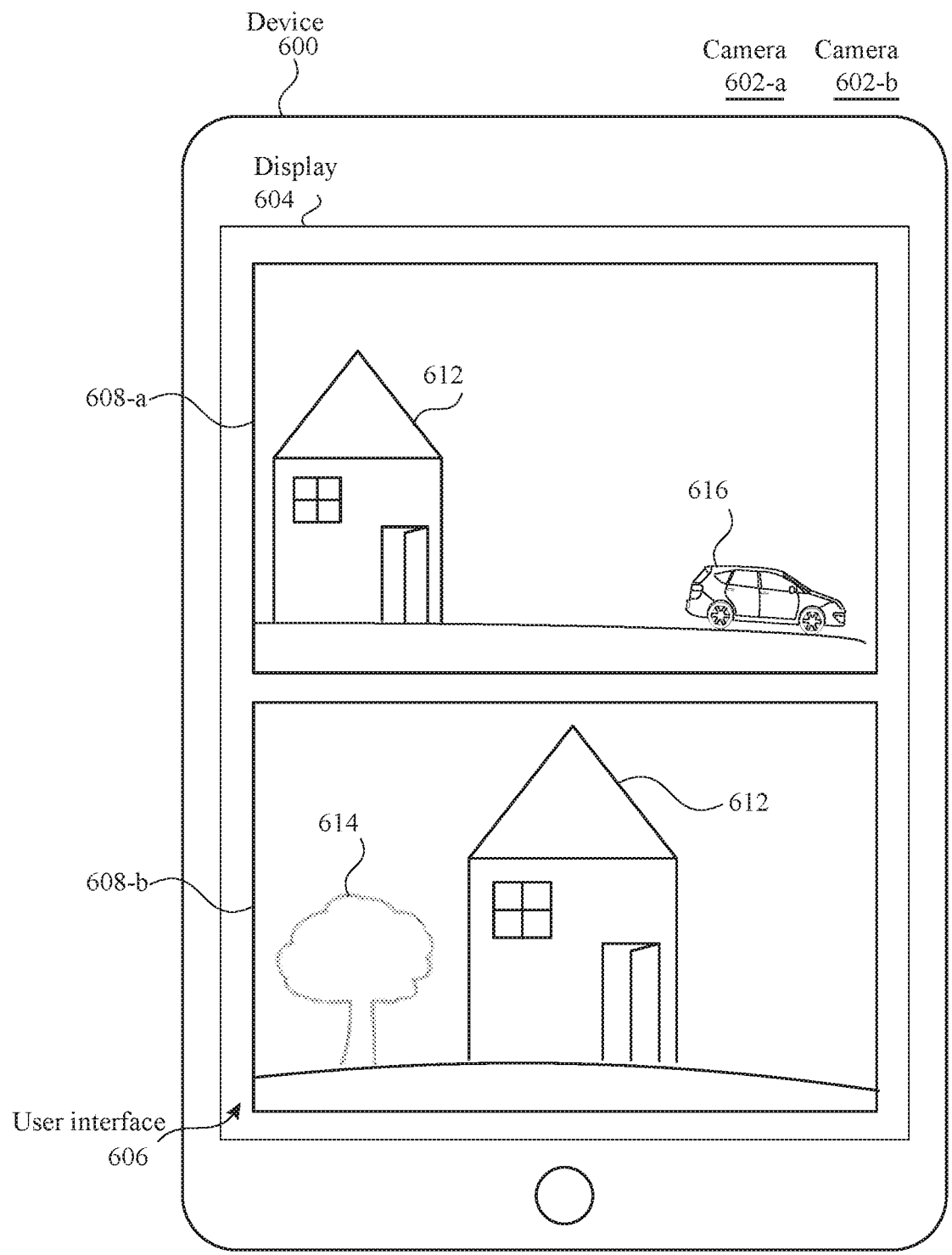

Turning to FIG. 6C while referring back to FIG. 6B, in response to exemplary user input 622, which is a de-pinching touch input within the display area of viewfinder 608-a, viewfinder 608-a zooms into displayed objects 612 and 616. Viewfinder 608-b does not zoom in response to user input 622, as the input falls outside (or, optionally because the input starts outside) of the display area of viewfinder 608-b.

Figure 6D:
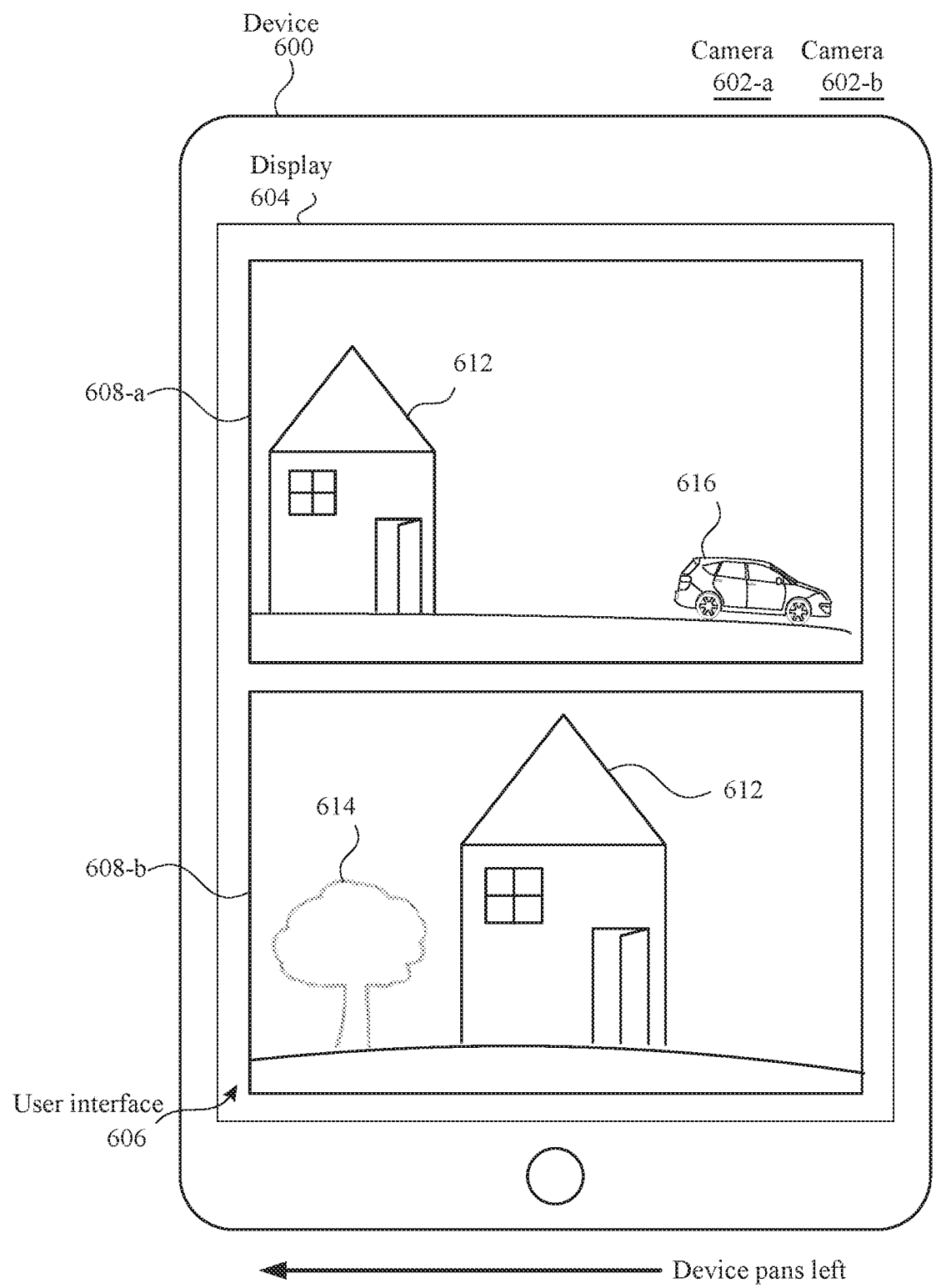

Turning to FIG. 6D while referring back to FIG. 6C, in response to exemplary user input 624, which is tap within the display area of viewfinder 608-a, viewfinder 608-a freezes its displayed content, meaning that the displayed content becomes static and no longer updates dynamically based on movement of objects with respect to camera 602-a. Viewfinder 608-b does not freeze in response to user input 624, as the input falls outside the display area of viewfinder 608-b. Thus, as device 600 pans to the left, the content of viewfinder 608-b updates dynamically by panning to the left. Meanwhile, viewfinder 608-a, which is frozen, remains fixed despite the movement of device 600.

In some embodiments, the content of a frozen digital viewfinder can still be manipulated by a user, such that the image is, optionally, zoomed in or out, panned, rotated, or subject to digital filters and other editing effects. To support these types of image manipulation, particularly zooming out and panning, the freezing of viewfinder 608-a in some embodiments involves capturing camera content beyond what is immediately needed (e.g., in terms of image size and resolution) for display in a frozen viewfinder. The extra content can be later revealed responsive to zooming and panning of the frozen viewfinder as appropriate.

In some embodiments, a frozen viewfinder unfreezes in response to an additional user input within its display area. Exemplary user inputs for unfreezing a frozen viewfinder include a single-finger tap, a double-finger tap, and a de-pinching/pinching input. In some embodiments, upon unfreezing, a viewfinder immediately resumes displaying source camera content dynamically. In some embodiments, upon unfreezing, a viewfinder continues to display information statically (e.g., with the composition that the device had displayed while frozen) until an additional input (e.g., to zoom or pan the viewfinder) is detected, at which time the unfrozen viewfinder begins to display camera content dynamically again.

Figure 6E:
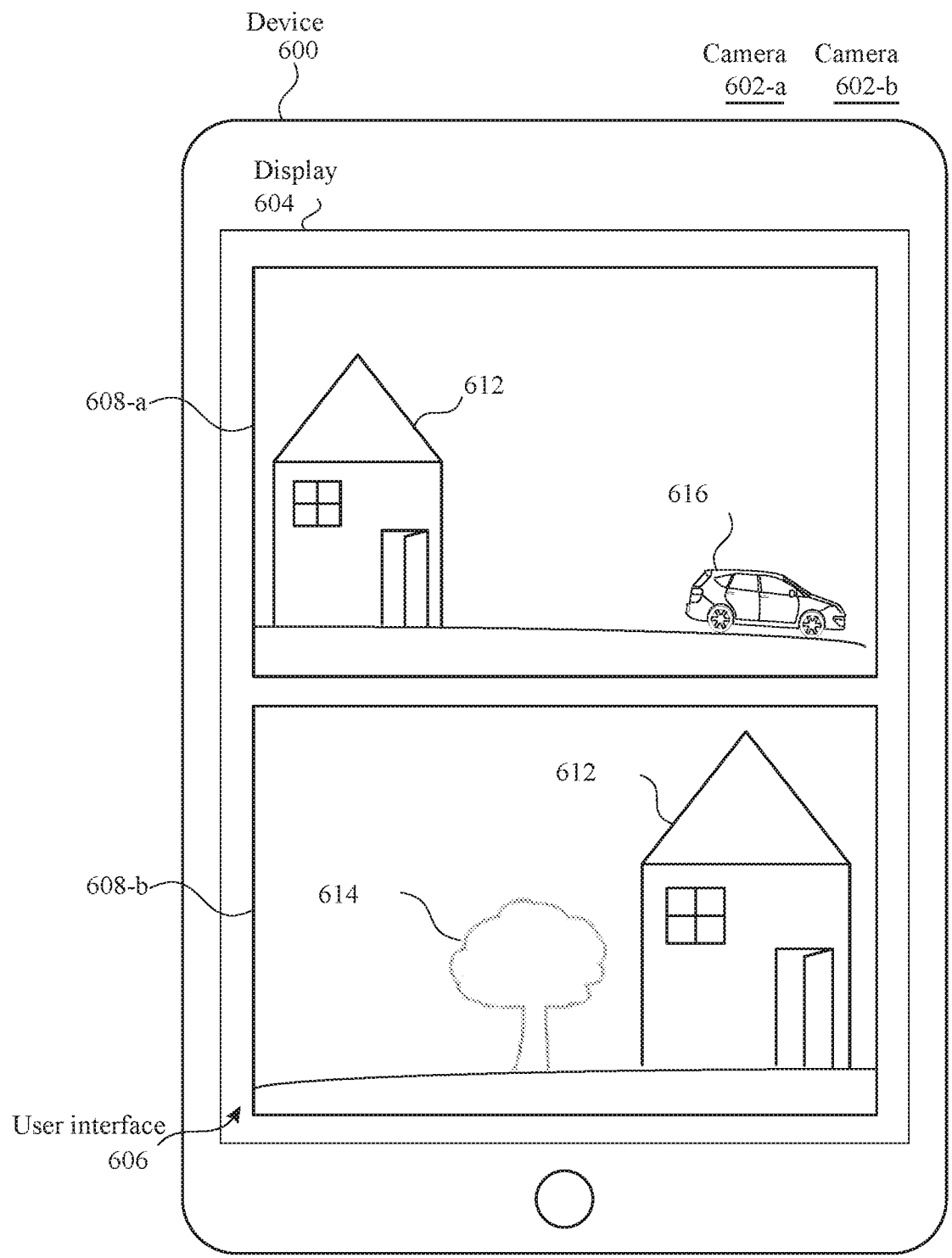
Figure 6F:
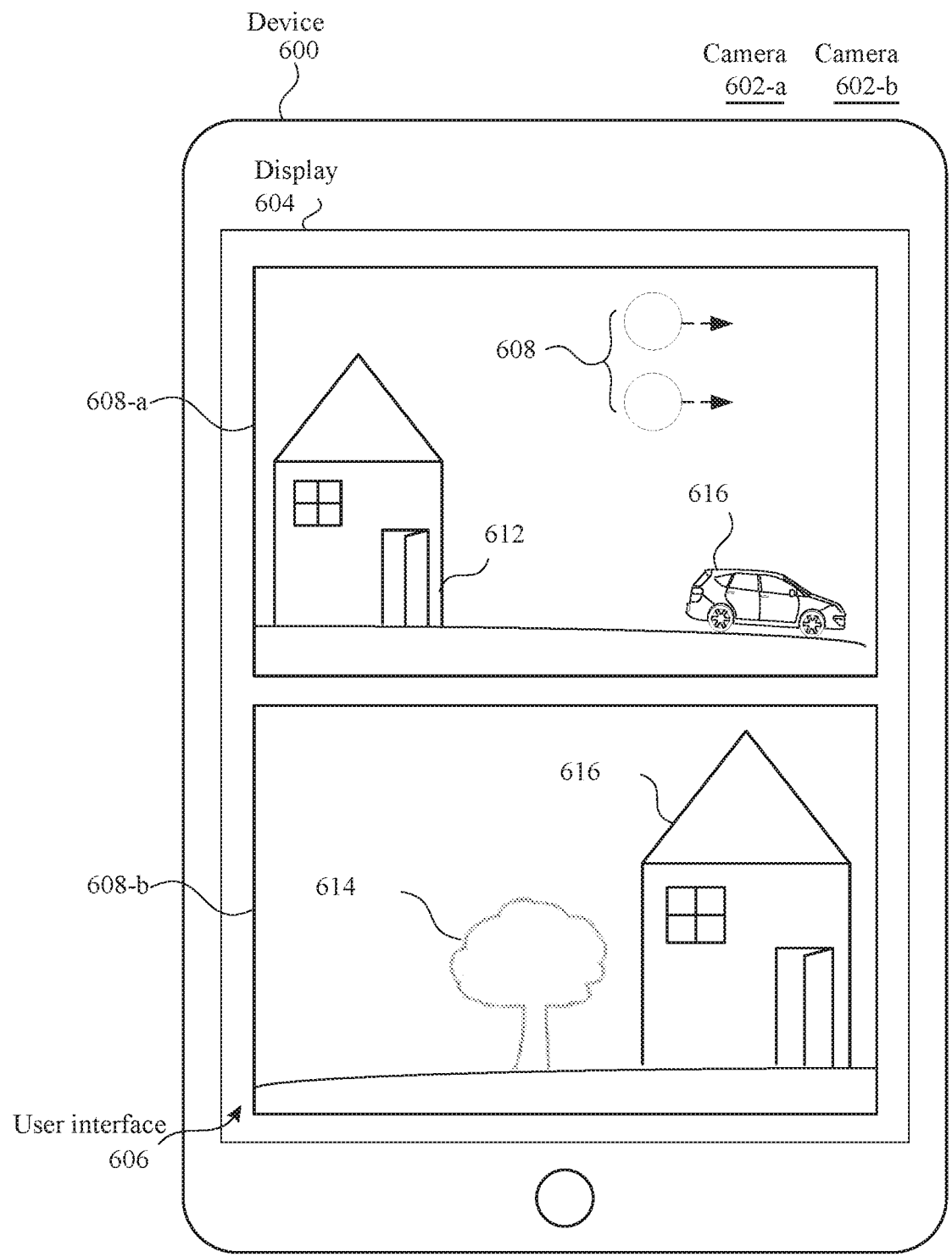
Figure 6G:
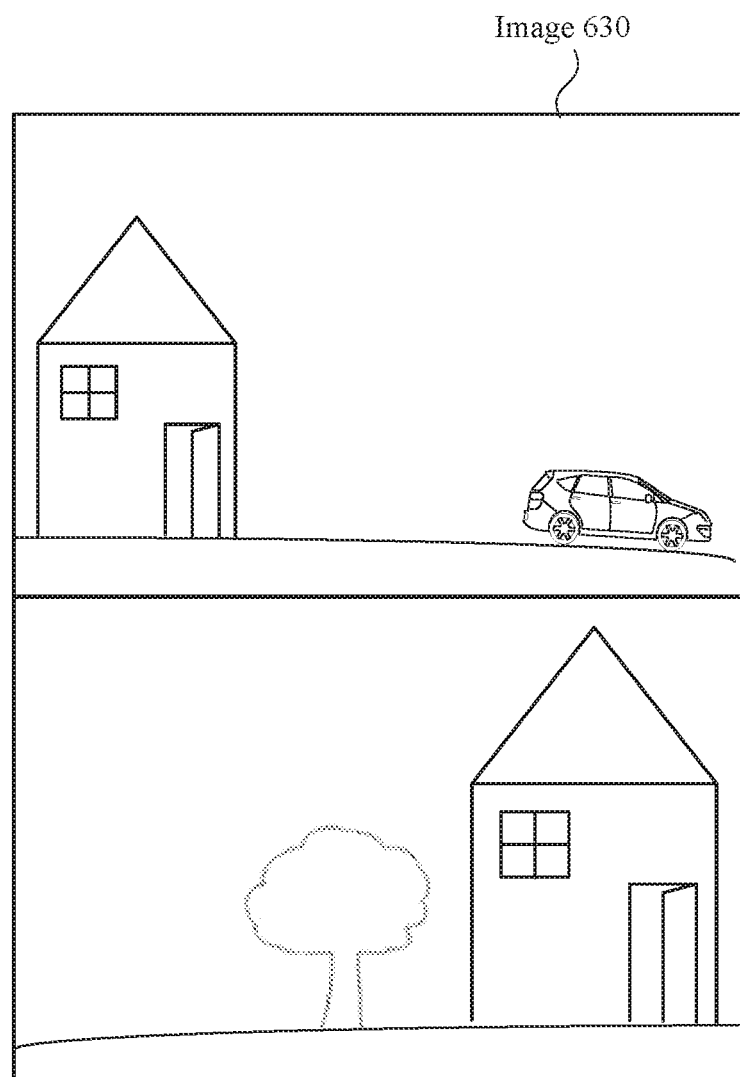

Turning to FIGS. 6E and 6F, in response to exemplary user input 620, which is a two-finger touch movement 628 in a horizontal direction, device 600 creates diptych image 630 using content as seen in frozen viewfinder 608-a and the content as seen in viewfinder 608-b sourced from camera 602-b. In some embodiments, diptych image 630 is stored into the non-volatile storage of device 600 as one or more associated files such that diptych image 630 be later retrieved from a library collection of visual media content.

For brevity, it is noted that viewfinder 608-b can be zoomed, panned, and/or frozen in the same manner as described with reference to viewfinder 608-a. Further, although not shown, each of viewfinders 608-a and 608-b can display one or more affordances for controlling and/or indicating the zoom setting of respective viewfinder, such as the zoom "slider" controls described with respect to FIGS. 5A-5T. Further still, although the discussion of FIGS. 6D and 6E relies on exemplary input 694 for freezing a viewfinder, in some embodiments, the release of an existing input is taken as an instruction to freeze a viewfinder. For example, a viewfinder can freeze as a user releases the touch input that was used to pan the viewfinder's displayed content (e.g., release of panning input 620 in FIG. 6B), meaning that the release of an input can itself be recognized as an input for freezing a viewfinder, in these embodiments.

Also, although the discussion of FIGS. 6A-6F involve the use of certain exemplary inputs for triggering specific viewfinder effects (e.g., single-finger single-tap to freeze a viewfinder), one of ordinary skill in the art would appreciate that other types of input can be used to affect viewfinder behavior. For example, panning can be performed using multi-finger inputs, zooming can be performed using a hardware button of device 600, freezing can be performed using multiple taps, and the storing of viewfinder content into a diptych image can be invoked using touch inputs other than a two-finger horizontal swipe, without departing from the principal capabilities of device 600. Further, device 600 can interpret parts of a continuous touch gesture as containing multiple inputs for controlling viewfinders, in some embodiments. For example, device 600 can interpret a touch gesture that includes a two-finger de-pinching component, followed by a lateral movement of the two fingers, and followed by a release of one of the two fingers, as containing three inputs: the initial de-pinching input zooms a relevant viewfinder, the later two-finger lateral movement pans the viewfinder, and the subsequent single-finger release freezes the viewfinder.

Figure 7:
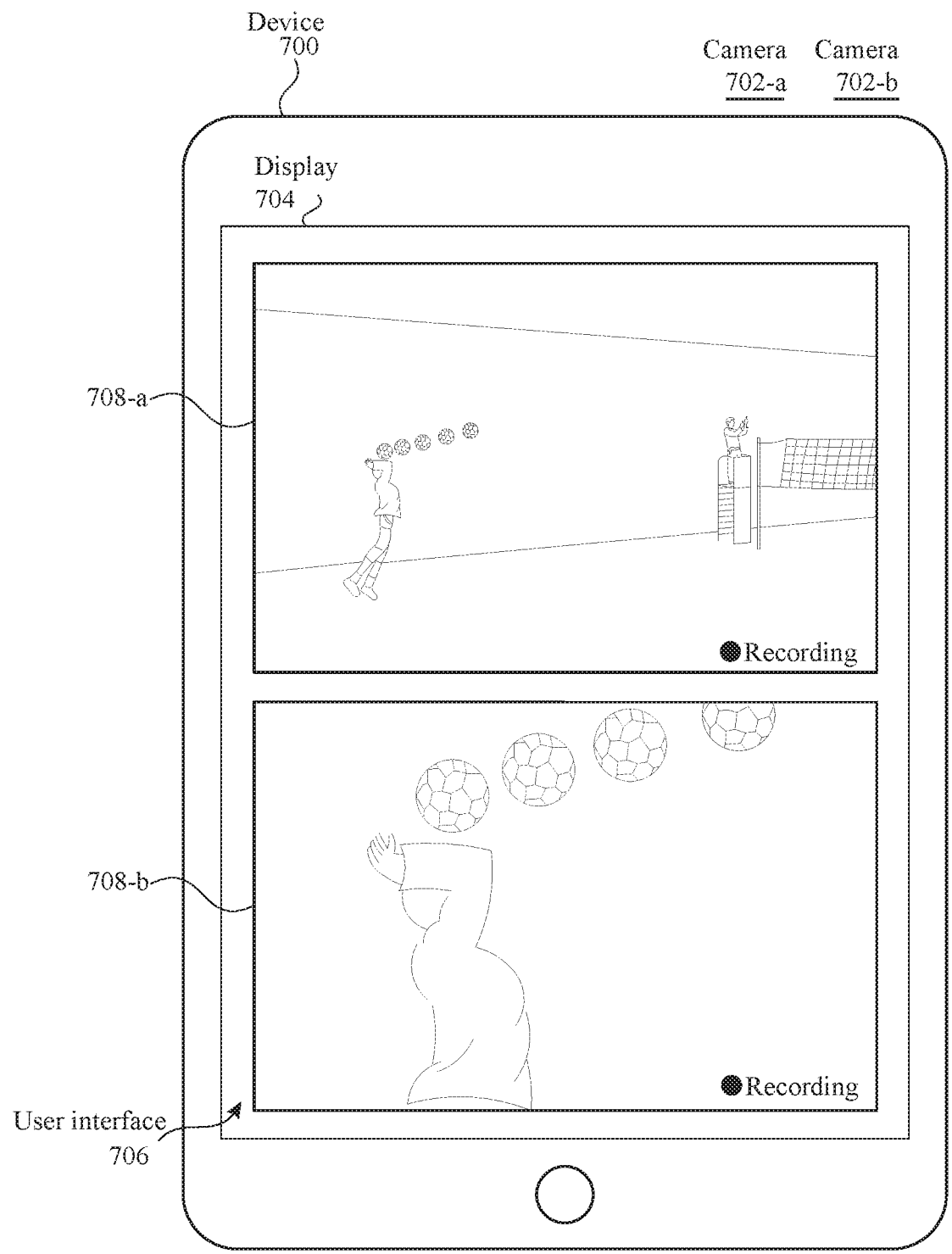
FIG. 7 illustrates an exemplary user interface for storing visual content using multiple cameras in accordance with some embodiments.

Attention is now directed to embodiments featuring dual, simultaneously displayed digital viewfinders for creating videos, with reference to FIG. 7. As seen in FIG. 7, device 700 has cameras 702-a and 702-b located on a side opposite of display 704. Display 704 provides camera user interface 706 having dual digital viewfinders 708-a and 708-b. Viewfinder 708-a displays content from one camera (e.g., camera 702-a) while viewfinder 708-b displays content from the other camera (e.g., camera 702-b). Camera 702-a is a wider-angle camera and camera 702-b is a higher-magnification camera in some embodiments.

User interface 706 allows a user to manage the compositions of digital viewfinders 708-a and 708-b independently, such as by zooming and panning viewfinder content separately. User interface 706 also allows a user to initiate simultaneous recording (e.g., storing) of visual information from both cameras. As seen in the example of FIG. 7, device 700 can simultaneously store a wider-angle video based on the composition of viewfinder 708-a, as well as a more zoomed-in video based on the composition of higher-magnification viewfinder 708-b. In the illustrated example, device 700 is storing a court-side view of a volleyball serve using the wider-angle composition of viewfinder 708-a, as well as an enlarged view of a single volleyball player based on the higher-magnification composition of viewfinder 708-b.

In some embodiments, user interface 706 permits user control of the frame rate at which "video" is stored. For example, user interface 706 can store visual information from camera 702-a (as shown in viewfinder 708-a) at 24 frames per second (fps), which is accepted in filmography as sufficient for producing content perceived by human users as video. Simultaneously, visual information from camera 702-b (as shown in viewfinder 708-b) can be stored at a higher frame rate, such as 48 fps, to enable slow motion playback of the volleyball player's serve in detail. Conversely, visual information from camera 702-b can be stored at the typical 24 fps while visual information from camera 702-a is stored at a lower rate of three fps so as to impart a snapshot quality to the "video" taken from camera 702-a.

In some embodiments, user interface 706 permits user control of other visual characteristics that are applied to a stored video. In some examples, content from the first and second cameras are stored at different resolutions. In some examples, content from the first and second cameras are stored using different image enhancement techniques, including image processing techniques that alter the appearance of an image or video, such as its brightness, contrast, saturation, hue, color intensity, exposure, color scheme, and/or the application of filters.

In some embodiments, content stored from one camera and used as an identifier for content stored from another camera. For example, a still image obtained from wider-angle camera 702-a is used as a thumbnail image to represent a video file created based on content from higher-magnification camera 702-b. Device 700 can display the thumbnail image (or other graphical representation) of the stored video among a library of videos for later playback selection.

In some embodiments, non-visual media is captured and stored with the visual content from the first and second cameras. For example, non-visual media includes audio media captured by a microphone of device, 100, 300, or 500, such as microphone 113 (FIG. 1A). In some embodiments, a user can trigger audio playback while device 700 is displaying a library collection of stored videos, ahead of a user's selection of a stored video for visual playback. In this way, the audio component can assist the user's selection of a video for playback. In some embodiments the enhanced-zoom mode of camera operation described with reference to FIGS. 5A-5T, the dyptich mode of camera operation described with reference to FIGS. 6A-6G, and the multimedia-capture mode of camera operation described with reference to FIG. 7 are all modes of operation of the same set of cameras, and a user can switch between these modes depending on the situation and the user's preferences and save media captured in the different modes of operation to a same camera roll or other media gallery.

3. Exemplary Processes

Figure 8B:
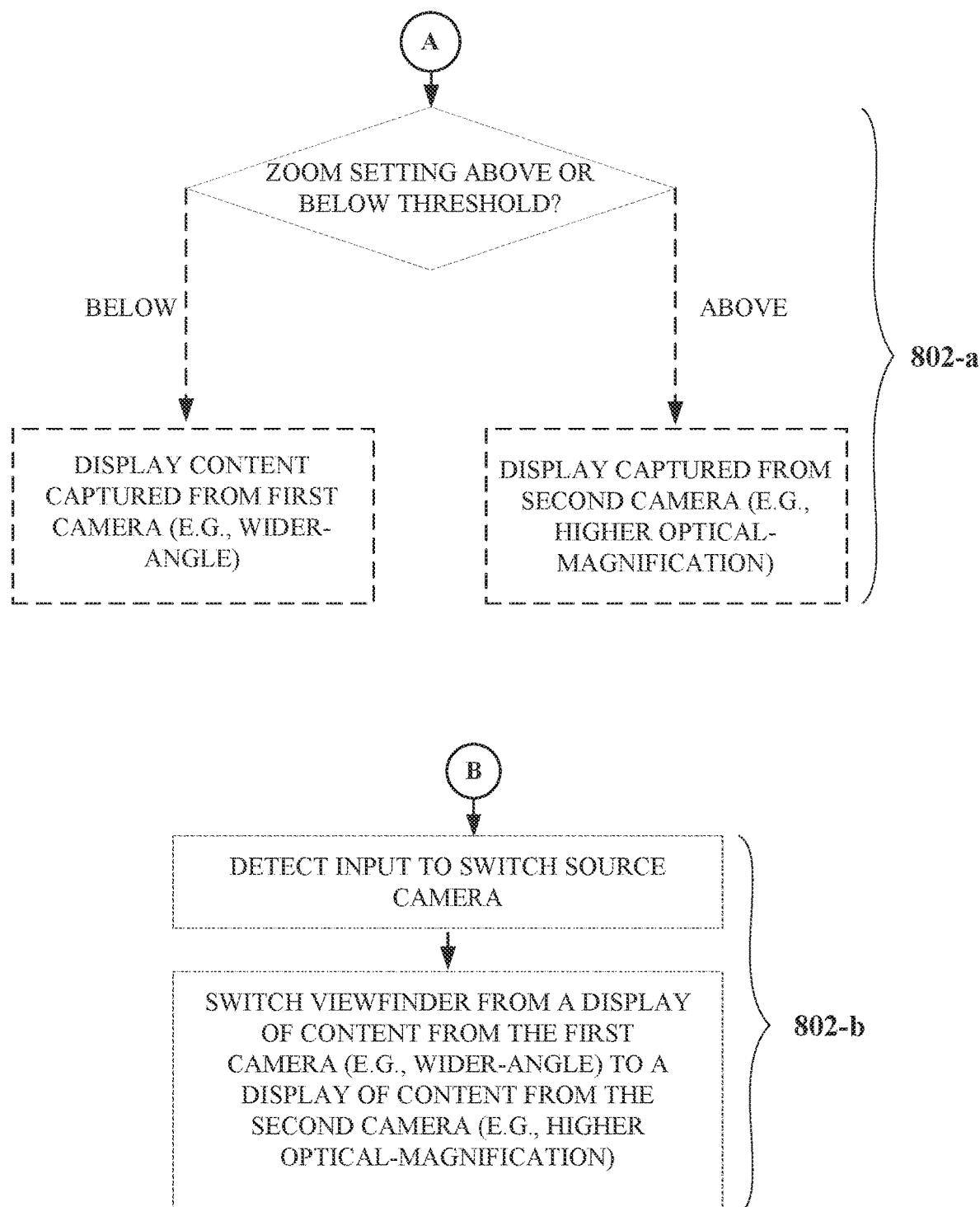
Figure 8C:
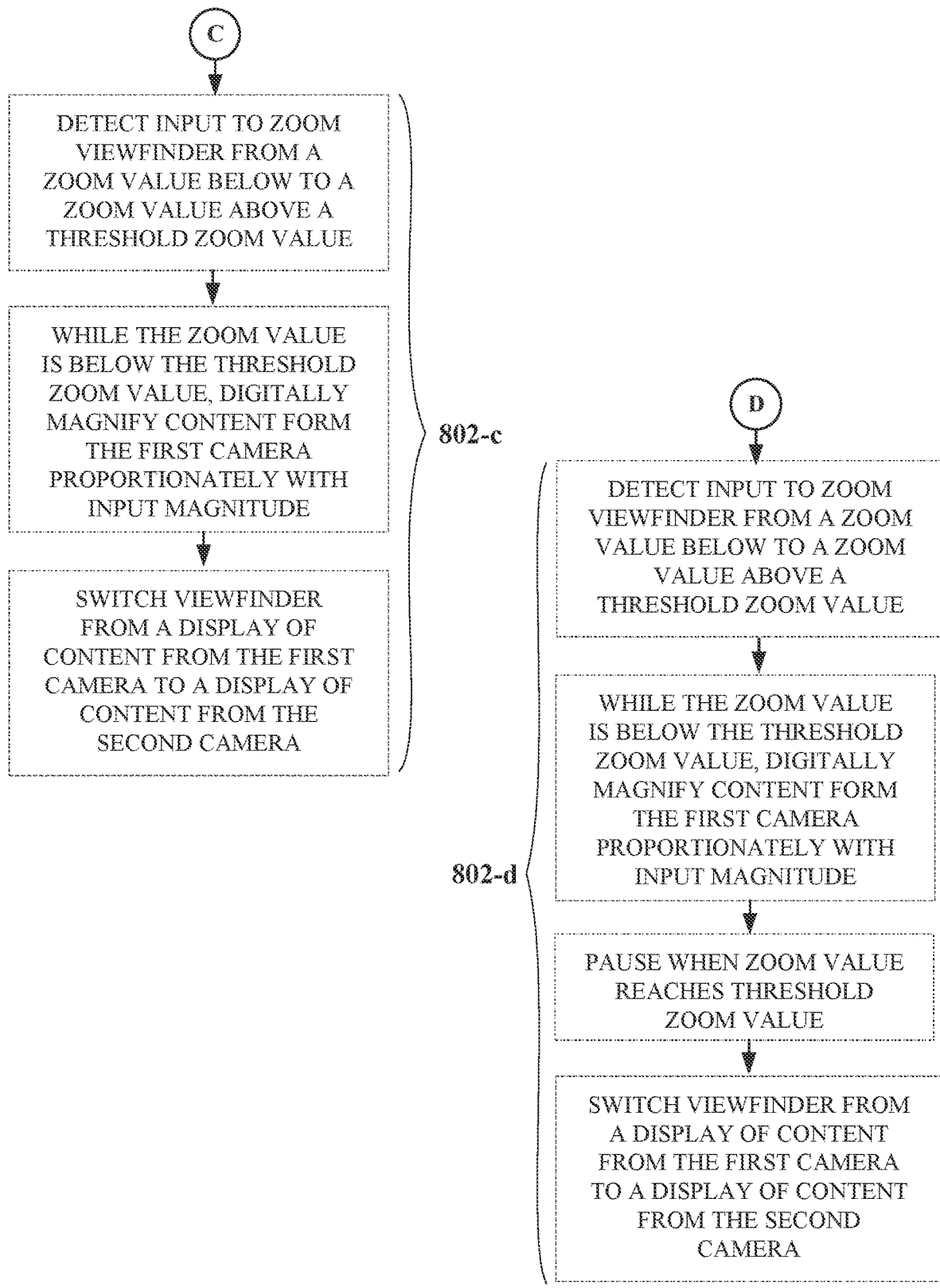

FIGS. 8A-8C are flow diagrams illustrating exemplary process 800 for providing viewfinder zoom capabilities using multiple cameras in accordance with some embodiments, such as those described above with reference to FIGS. 5A-5T. Process 800 is carried out by device 500 (FIGS. 5A-5T), which is, optionally, electronic device 100 or 300 (FIGS. 1A and 3), in some embodiments.

At block 802, the electronic device displays a digital viewfinder showing content from one of at least two cameras. An exemplary digital viewfinder is viewfinder 508 (FIGS. 5A-5T). Exemplary cameras include wider-angle camera 502-a and higher-magnification camera 502-b (FIGS. 5A-5T). Viewfinder content is displayed at a certain zoom setting.

At block 804, the electronic device detects user input representing a user instruction to store visual media. An exemplary user instruction to store visual media is the activation of affordance 516 in camera user interface 506 (FIGS. 5A-5T).

At block 806, responsive to the user input, a determination is made as to whether the zoom setting is above or below a threshold zoom value. If the zoom setting is below the zoom threshold value, then processing proceeds to block 808 where content from a first camera (e.g., wider-angle camera 502-a) is stored. If the setting is above the zoom threshold value, then processing proceeds to block 810 where content from a second camera (e.g., higher-magnification camera 502-b) is stored. Storing content from a camera includes creating an image or video file, in a non-volatile memory of the electronic device, in some embodiments.

Block 802 optionally includes sub-block 802-a. As depicted in FIG. 8B, during sub-block 802-a, the selection of camera content for display in the viewfinder is made by determining whether the zoom setting is above or below a threshold zoom value. If the zoom setting is below the threshold zoom value, then content is displayed from a first camera (e.g., wider-angle camera 502-a). If the setting is above the threshold zoom value, then content is displayed from a second camera (e.g., higher-magnification camera 502-b).

Block 802 optionally includes sub-block 802-a. As depicted in FIG. 8B, during sub-block 802-b, the electronic device switches the source camera of its viewfinder responsive to user input representing an instruction to change viewfinder source camera. The user input is an activation of an on-screen camera selection affordance (e.g., affordance 546 in FIG. 5S) in some examples. The user input is a tap on the viewfinder (e.g., tap 522 or 524 in FIG. 5C, tap 530 in FIG. 5L, or tap 538 in FIG. 5O) in some examples.

Block 802 optionally includes sub-block 802-c. As depicted in FIG. 8C, during sub-block 802-c, the electronic device detects user input representing a request to change the zoom setting from a value below to a value greater than the threshold zoom value. Exemplary user input to change the zoom setting include a pinching touch input, a de-pinching touch input, a touch movement, one or more taps, depression of a hardware button, so forth. Responsive to the user input, the electronic device zooms the viewfinder by displaying content from the first camera (e.g., wider-angle camera 502-a) and then switching to displaying content from the second camera (e.g., higher-magnification camera 502-b). In addition, before switching to the second camera, content from the first camera (e.g., wider-angle camera 502-a) is digitally magnified responsive to the user input.

Block 802 optionally includes sub-block 802-d. As depicted in FIG. 8C, during sub-block 802-d, the electronic device detects user input representing a request to change the zoom setting to a value greater than the threshold zoom value. Responsive to the user input, the electronic device zooms the viewfinder by digitally magnifying content from the first camera (e.g., wider-angle camera 502-a in FIG. 5A), but does not switch to displaying content from the second camera (e.g., higher-magnification camera 502-b in FIG. 5B). Rather, the viewfinder ceases to zoom beyond the maximum zoom level of the first camera (e.g., wider-angle camera 502-a). Upon pausing at the maximum zoom level of the first camera, the viewfinder switches to displaying content from the second camera (e.g., higher-magnification camera 502-b) under some conditions. For example, the viewfinder switches source camera when the continued movement of the detected user input exceeds a threshold magnitude. As another example, the viewfinder switches source camera when a separate, second user input representing a request to change the zoom setting to a value greater than the threshold zoom value is detected.

FIG. 9 is a flow diagram illustrating exemplary process 900 for storing visual content using multiple cameras in accordance with some embodiments, such as those described above with reference to FIGS. 6A-6F. Process 900 is carried out by device 600 (FIGS. 6A-6F), which is, optionally, electronic device 100 or 300 (FIGS. 1A and 3), in some embodiments.

At block 902, the electronic device displays two digital viewfinders. A first displayed viewfinder (e.g., viewfinder 608-a in FIGS. 6A-6F) shows content from a first camera (e.g., wider-angle camera 602-a in FIGS. 6A-6F). A second displayed viewfinder (e.g., viewfinder 608-b in FIGS. 6A-6F) shows content from a second camera (e.g., higher-magnification camera 602-b in FIGS. 6A-6F).

At block 904, user input representing manipulation of the first viewfinder is detected. The input is instruction to pan, zoom, and/or freeze the viewfinder, for example. The input is provided on an area of display 604 or a touch-sensitive surface corresponding to the display area of the first viewfinder. Responsive to this input, the first viewfinder performs the requested operation. The second viewfinder need not be affected by this input.

At block 906, user input representing manipulation of the second viewfinder is detected. The input is instruction to pan, zoom, and/or freeze the viewfinder, for example. The input is provided on an area of display 604 or a touch-sensitive surface corresponding to the display area of the second viewfinder. Responsive to this input, the second viewfinder performs the requested operation. The first viewfinder need not be affected by this input.

Optionally, at block 908, user input representing an instruction to unfreeze a frozen viewfinder is detected. Responsive to the instruction, the relevant viewfinder is unfrozen and begins to dynamically display visual information received from a corresponding source camera.

At block 910, user input representing an instruction to store visual content from the first and second cameras, consistent with the composition as presented in the first and second viewfinders, is detected. Responsive to this user input, the electronic device creates a still image containing content from the first and second cameras and stores the still image into long-term storage such as a non-volatile memory.

In some embodiments, content from the first and second cameras are stored side-by-side to provide the appearance of a "diptych." In some embodiments, the still image is stored into a library of visual content, such as into a library of images and videos.

FIG. 10 is a flow diagram illustrating exemplary process 1000 for providing viewfinder zoom capabilities using multiple cameras in accordance with some embodiments, such as those described above with reference to FIG. 7. In some embodiments, process 1000 is carried out by device 700 (FIG. 7), which is, optionally, electronic device 100 or 300 (FIGS. 1A and 3).

At block 1002, the electronic device displays two digital viewfinders. A first displayed viewfinder (e.g., viewfinder 708-a in FIG. 7) shows content from a first camera (e.g., wider-angle camera 702-a in FIG. 7). A second displayed viewfinder (e.g., viewfinder 708-b in FIG. 7) shows content from a second camera (e.g., higher-magnification camera 702-b in FIG. 7). Optionally, at block 1004, user input representing manipulation of the first and/or second viewfinder is detected. The input is instruction to pan and/or zoom a viewfinder, for example. The user input may result in viewfinders 708-a and 708-b having different visual characteristics.

At block 1006, user input representing an instruction begin recording (e.g., storing) content from the first and second cameras as seen in viewfinders 708-a and 708-b, respectively, is detected. At block 1008, responsive to the user input, the electronic begins to store a first and a second visual media using content from the first and second camera based on the composition of the first and second viewfinders, concurrently.

In some embodiments, concurrently storing a first and second visual media includes concurrently recording two videos, concurrently storing two still images, or concurrently recording a digital video and storing one or more still images. In some embodiments, concurrently storing a first and second visual media includes storing the first and second visual media in a memory such as a non-volatile memory. In some embodiments, the first and second visual media components are stored as a single file or are other associated with one another. At block 1010, the stored visual media is displayed among a collection of media objects.

At block 1012, upon user selection of a graphical user interface element representing the stored visual media, the stored visual media is played-back on a display of the electronic device.

Figure 11:
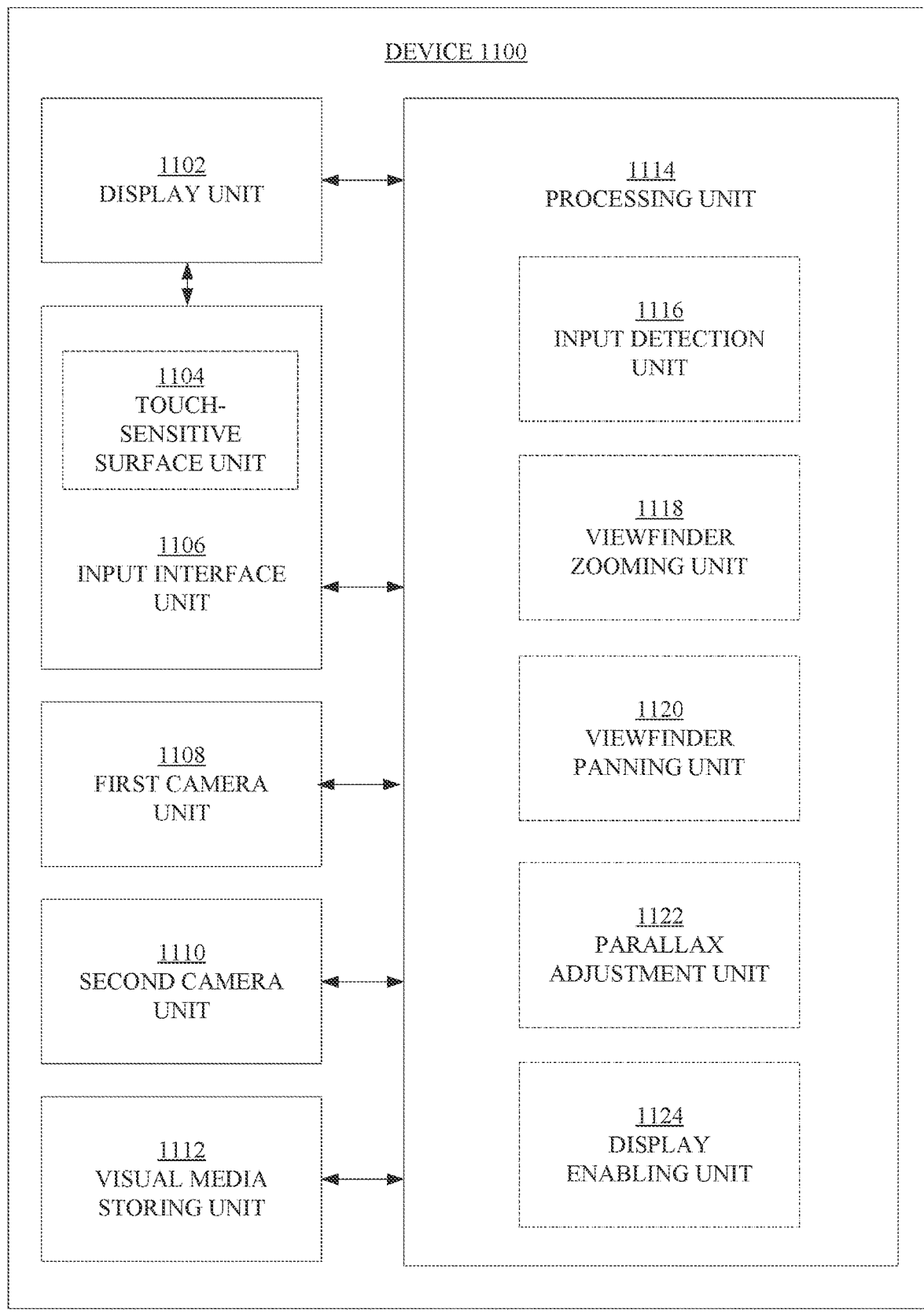
FIG. 11 is a functional block diagram of an electronic device configured to utilize multiple cameras to capture images and/or videos in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments, including those described with reference to the user interfaces of FIGS. 5A-5T.

As seen in FIG. 11, exemplary electronic device 1100 includes display unit 1102 configured to display graphical objects including the digital viewfinders described above; input interface unit 1104 configured to detect user input. Optionally, device 1100 includes touch-sensitive surface unit 1106 either as part of or operatively coupled to input interface unit 1104 configured to detect touch input. In some embodiments, touch-sensitive surface unit 1106, when present, is separate from display unit 1102. In some embodiments, touch-sensitive surface unit 1106, when present, forms a touch screen with display unit 1102. Device 1100 also includes camera units 1106 and 1108 configured to capture visual content; memory unit 1110 configured to store content captured by one or more of the cameras; and non-visual media capturing unit 1112 configured to capture non-visual media such as audio. Device 1100 also includes processing unit 1114. In some embodiments processing unit 1114 supports an input detection unit 1116 that is configured to detect input via input interface unit 1106; viewfinder 1118 zooming unit configured to provide zooming features for digital viewfinder(s) displayed via display unit 1102; viewfinder panning unit configured to pan the contents of digital viewfinder(s) displayed via display unit 1102; parallax adjustment unit 1122 for reducing the effects of parallax caused by the different locations of camera units 1108 and 1110 with respect a point of interest; and display enabling unit 1124 to enable the display of content on display unit 1102.

As display unit 1102 is displaying (e.g., with display enabling unit 1124) a digital viewfinder having content from one of a first and a second camera (e.g., camera units 1108 or 1110) displayed at a zoom setting, processing unit 1114 is configured to: detect (e.g., with input detection unit 1116) user input representing an instruction to store visual media; in response to detecting the input representing the instruction to store visual media and in accordance with a determination that the zoom setting is below a threshold zoom value; store visual media using content from the first camera (e.g., into visual media storing unit 1112); and in response to detecting the input representing the instruction to store visual media and in accordance with a determination that the zoom setting is above the threshold zoom value, store visual media using content from the second camera (e.g., into visual media storing unit 1112).

In some embodiments, first camera unit 1108 has a first focal length and the second camera unit 1110 has a second focal length different than the first focal length. In some embodiments, first camera unit 1108 has a fixed focal length and second camera unit 1110 has a fixed focal length. In some embodiments, second camera 1110 has a longer focal length than first camera 1108. In some embodiments, the fields of view of the first camera 1108 and the second camera 1110 overlap by at least fifty percent.

In some embodiments, processing unit 1114 is configured to enable display (e.g., with display enabling unit 1124) the digital viewfinder via display unit 1102 by enabling display of content from first camera unit 1108 (e.g., a wider-angle camera) in the digital viewfinder, in accordance with a determination (e.g., by viewfinder zooming unit 1118) that the zoom setting is below the threshold zoom value. In some embodiments, processing unit 1114 is configured to enable display (e.g., with display enabling unit 1124) the digital viewfinder via display unit 1102 by enabling display of content from second camera 1110 (e.g., a higher-magnification camera) in the digital viewfinder, in accordance with a determination (e.g., by viewfinder zooming unit 1118) that the zoom setting is above the threshold zoom value.

In some embodiments, processing unit 1114 is configured to: enable display (e.g., with display enabling unit 1124), via display unit 1102, of the digital viewfinder by enabling display of content from first camera 1108 (e.g., a wider-angle camera) at a zoom setting lower than the threshold zoom value; detect (e.g., through input detection unit 1116) input representing a request to set the zoom setting to a value greater than the threshold zoom value; and zoom (e.g., with viewfinder zooming unit 1118) the digital viewfinder displayed on display unit 1102 by displaying content from first camera 1108 (e.g., a wider-angle camera) and then switching to displaying content from second camera 1110 (e.g., a higher-magnification camera) in response to detecting the input representing the request to set the zoom setting to a value greater than the threshold zoom value.

In some embodiments, processing unit 1114 is configured to zoom (e.g., with viewfinder zooming unit 1118) the digital viewfinder by performing a digital zoom operation on content from first camera 1108 (e.g., a wider-angle camera), where the first camera has a wider field of view than second camera 1110 (e.g., a higher-magnification camera), before switching (e.g., with viewfinder zooming unit 1118) to displaying content from second camera 1110.

In some embodiments, processing unit 1114 is configured to: detect (e.g., with input detection unit 1116) a user's specification of a point of interest in the digital viewfinder, when switching (e.g., with viewfinder zooming unit 1118) from displaying content from first camera 1108 (e.g., a wider-angle camera) to displaying content from second camera 1110 (e.g., a higher-magnification camera), adjust the relative positions of the displayed content from first camera 1108 and the displayed content from second camera 1110 (e.g., a higher-magnification camera) to reduce the appearance of parallax at the point of interest (e.g., with viewfinder zooming unit 1118).

In some embodiments, processing unit 1114 is configured to: enable display (e.g., with display enabling unit 1124) the digital viewfinder on display unit 1102 by enabling display of content from first camera 1108 (e.g., wider-angle camera) at a zoom setting lower than the threshold zoom value; and detect (e.g., with input detection unit 1116) input representing a request to set the zoom setting to a value greater than the threshold zoom value. In some embodiments, processing unit 1114 is configured to: in response to detecting the input representing the request to set the zoom setting to a value greater than the threshold zoom value, zoom (e.g., with viewfinder zooming unit 1118) the digital viewfinder to display content from first camera 1108 (e.g., a wider-angle camera) at the threshold zoom value.

In some embodiments, the input representing the request to set the zoom setting to a value greater than the threshold zoom value is a first input, and processing unit 1114 is configured to: after detecting the first input and while the zoom setting is set to the threshold zoom value, detect (e.g., with input detection unit 1116) a second input representing a second request to set the zoom setting to a second value greater than the threshold zoom value. In some embodiments, processing unit 1114 is configured to: in response to detecting the second input, zoom (e.g., with viewfinder zooming unit 1118) the digital viewfinder to display content from second camera 1110 (e.g., a higher-magnification camera) at the second value of zoom setting.

In some embodiments, processing unit 1114 is configured to enable display (e.g., with display enabling unit 1124), via display unit 1102, in the digital viewfinder a visual indication of the zoom setting. In some embodiments, processing unit 1114 is configured to enable display (e.g., with display enabling unit 1124), via display unit 1102, in the digital viewfinder a visual indication of the threshold zoom value.

In some embodiments, processing unit 1114 is configured to zoom (e.g., with viewfinder zooming unit 1118) the digital viewfinder to display content from second camera 1110 (e.g., a higher-magnification camera) at the requested zoom setting value by displaying, via display unit 1102, a transition effect in the digital viewfinder indicative of the zoom setting changing from a value at the threshold to a value above the threshold. The transition effect transitions between an image captured by first camera 1108 (e.g., a wider-angle camera) and an image captured by second camera 1110 (e.g., a higher-magnification camera), for example.

In some embodiments, first camera 1108 has a wider field of view than second 1110 camera and the digital viewfinder displayed on display unit 1102 comprises content from first camera 1108, regardless of the zoom setting.

In some embodiments, first camera 1108 and second camera 1110 have overlapping fields of view, and processing unit 1114 is configured to, while display unit 1102 is displaying content from one of the first and second cameras 1108 and 1110 in the digital viewfinder (e.g., with display enabling unit 1124), detect (e.g., with input detection unit 1116) one or more taps on the touch-sensitive surface unit. In some embodiments, processing unit 1114 is configured to, in response to detecting the one or more taps, switch (e.g., with viewfinder zooming unit 1118) the displayed content of the digital viewfinder to content from the other of the first and second cameras.

In some embodiments, processing unit 1114 is configured to, while display unit 1102 is displaying (e.g., with display enabling unit 1124) content from one of the first and second cameras 1108 and 1110 in the digital viewfinder, enable display via the display unit a camera selection affordance, the camera selection affordance displaying content from the other camera of the first and second cameras. The one or more taps is detected at a location of the touch-sensitive surface unit corresponding to the camera selection affordance in some examples.

In some embodiments, processing unit 1114 is configured to apply digital zooming (e.g., with viewfinder zooming unit 1118) to content from first camera 1108 and/or second camera 1110. In some embodiments, processing unit 1114 is configured to pan (e.g., with viewfinder panning unit 1118) content from first camera 1108 and/or second camera 1110 responsive to user input detected through input detection unit 1116.

The operations described above with respect to FIGS. 8A-8C are, optionally, implemented by components depicted in FIGS. 1A-1B, 3, or FIG. 11. For example, detecting operation 804 is, optionally, implemented by event sorter 170, event recognizer 180, and event handler 190. Event monitor 171 in event sorter 170 detects user input on an input device, and event dispatcher module 174 delivers the event information to application 136-1. A respective event recognizer 180 of application 136-1 compares the event information to respective event definitions 186, and determines whether the input represents an instruction to store viewfinder content. When a respective event or sub-event is detected, event recognizer 180 activates an event handler 190, which may use or call data updater 176, object updater 177, or GUI updater 178 to perform corresponding application updates. It would be clear to a person of ordinary skill in the art how other processes can be implemented based on the components depicted in FIGS. 1A-1B and/or FIG. 3.

It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein. For example, units 1102-1112 can have associated "controller" units that are operatively coupled with the respective unit and processing unit 1114 to enable operation. These controller units are not separately illustrated in FIG. 11 but are understood to be within the grasp of one of ordinary skill in the art who is designing a device having units 1102-1112 such as device 1100. The description herein thus optionally supports combination, separation, and/or further definition of the functional blocks described herein.

Figure 12:
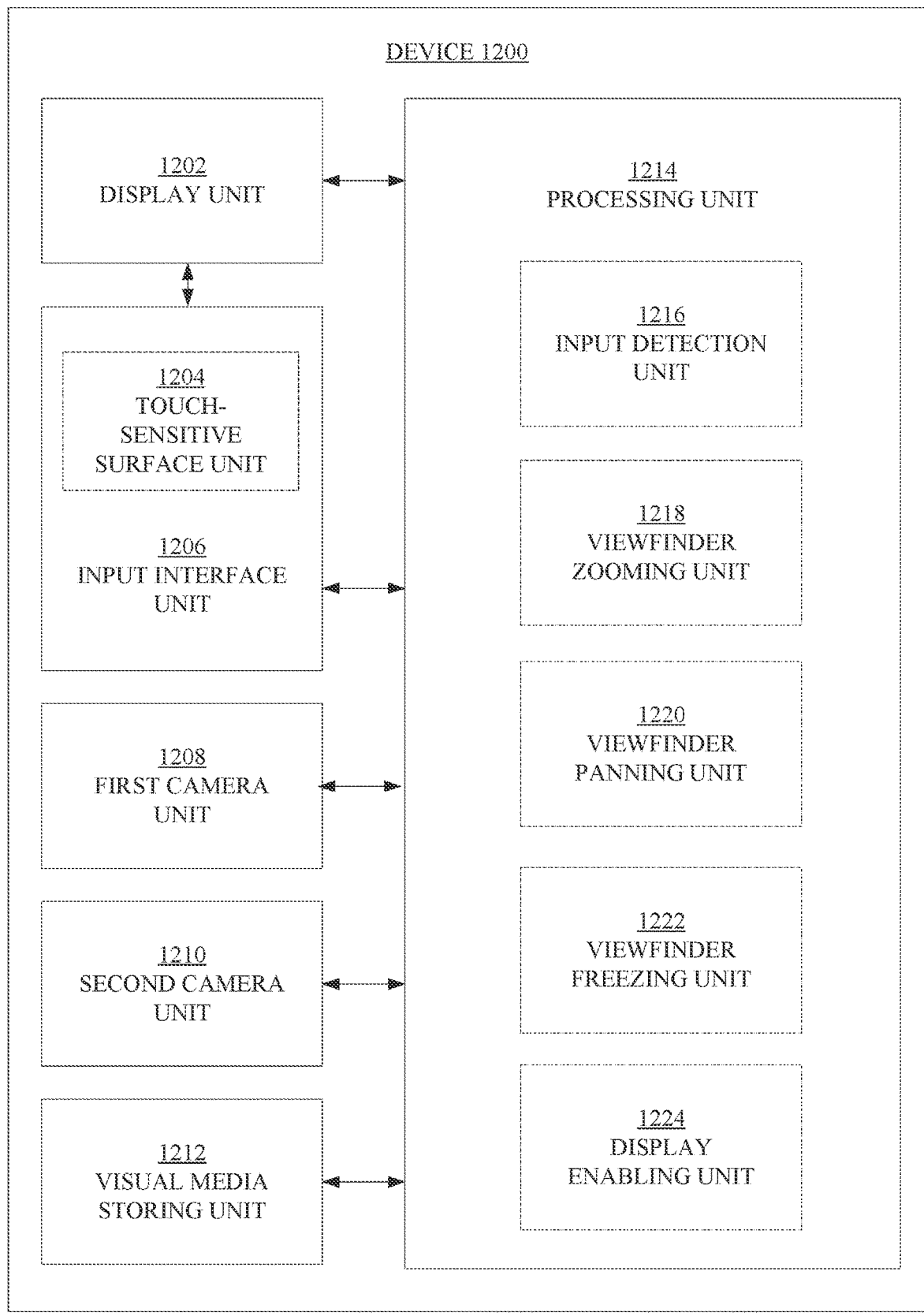
FIG. 12 is a functional block diagram of an electronic device configured to utilize multiple cameras to capture images and/or videos in accordance with some embodiments.

In accordance with some embodiments, FIG. 12 shows a functional block diagram of an electronic device 1200 configured in accordance with the principles of the various described embodiments. The functional blocks of the device are, optionally, implemented by hardware, software, or a combination of hardware and software to carry out the principles of the various described embodiments, including those described with reference to the user interfaces of FIGS. 6A-6G.

As seen in FIG. 12, exemplary electronic device 1200 includes display unit 1202 configured to display graphical objects including the digital viewfinders described above; input interface unit 1204 configured to detect user input. Optionally, device 1200 includes touch-sensitive surface unit 1206 either as part of or operatively coupled to input interface unit 1204 configured to detect touch input. In some embodiments, touch-sensitive surface unit 1206, when present, is separate from display unit 1202. In some embodiments, touch-sensitive surface unit 1206, when present, forms a touch screen with display unit 1202. Device 1200 also includes camera units 1206 and 1208 configured to capture visual content; memory unit 1210 configured to store content captured by one or more of the cameras; and visual media capturing unit 1212 configured to capture visual media such as videos and/or images (and optionally, non-visual media such as audio). Device 1200 also includes processing unit 1214. In some embodiments processing unit 1214 supports an input detection unit 1216 that is configured to detect input via input interface unit 1206; viewfinder zooming unit 1218 configured to provide zooming features for digital viewfinder(s) displayed via display unit 1202; viewfinder panning unit configured to pan the contents of digital viewfinder(s) displayed via display unit 1202; viewfinder freezing unit 1222 for freezing the content of one or more digital viewfinders displayed on display unit 1202; and display enabling unit 1224 for enabling the display of content on display unit 1204.

In some embodiments, processing unit 1214 is configured to: enable display (e.g., with display enabling unit 1224) via a first portion of display unit 1202, of a first digital viewfinder showing content from first camera 1208, and enable display (e.g., with display enabling unit 1224) via a second portion of display unit 1202, of a second digital viewfinder, the second digital viewfinder displaying content from second camera 1210; detect (e.g., with input detection unit 1216), a first input representing an instruction to zoom the first digital viewfinder; in response to detecting the first input, zoom the first digital viewfinder independently of the second digital viewfinder (e.g., with viewfinder zooming unit 1218); detect (e.g., with input detection unit 1216), a second input representing an instruction to freeze the first digital viewfinder; and in response to detecting the second input, freeze (e.g., with viewfinder freezing unit 1220) the first digital viewfinder independently of the second digital viewfinder.

In some embodiments, the first input is a de-pinching input located on a portion of touch-sensitive surface unit 1204 corresponding to the first digital viewfinder displayed on display unit 1202.

In some embodiments, processing unit 1214 is configured to: enable display (e.g., with display enabling unit 1224), via display unit 1202, of the first digital viewfinder by enabling a display of an affordance providing visual indication of a zoom setting; and detect (e.g., with input detection unit 1216), a touch movement at a location of touch-sensitive surface unit 1204 corresponding to the affordance providing visual indication of the zoom setting.

In some embodiments, processing unit 1214 is configured to detect (e.g., with input detection unit 1216) a third input at a location of touch-sensitive surface unit 1204 corresponding to the first digital viewfinder; and in response to detecting the third input, pan (e.g., with viewfinder panning unit 1220) the first digital viewfinder independently of the second digital viewfinder.

In some embodiments, the first input is a touch input on touch-sensitive surface unit 1204 and the second input is a release of the first input. In some embodiments, the second input is a tap at a location of touch-sensitive surface unit 1204 corresponding to the first digital viewfinder.

In some embodiments, processing unit 1214 is configured to: freeze (e.g., with viewfinder freezing unit 1222) the first digital viewfinder by displaying in the first digital viewfinder a still image received using first camera 1208; and detect (e.g., through input detection unit 1216) a fourth input, where visual media storing unit 1212 is configured to, in response to detecting the fourth input, add a combined digital image comprising the still image and a second image received from second camera 1210 to a library of images (e.g., using visual media storage unit 1212).

In some embodiments, the combined digital image is an image comprising the first image and the second image side-by-side.

In some embodiments, first camera 1208 has a first focal length and second camera 1210 has a second focal length different from the first focal length. In some embodiments, first camera 1208 has a fixed focal length and second camera 1210 has a fixed focal length. In some embodiments, second camera 1210 has a longer focal length than first camera 1208. In some embodiments, first camera 1208 and second camera 1210 have overlapping fields of view. In some embodiments, the fields of view of first camera 1208 and second camera 1210 overlap by at least fifty percent.

In some embodiments, processing unit 1214 is configured to: detect (e.g., with input detection unit 1216) a fifth input at a location of the touch-sensitive surface corresponding to the first digital viewfinder, after freezing (e.g., with viewfinder freezing unit 1222) the first digital viewfinder; and in response to detecting the fifth input, unfreeze (e.g., with viewfinder freezing unit 1222) the first digital viewfinder and displaying (e.g., with display enabling unit 1224) content from first camera 1208 in the first digital viewfinder.

The operations described above with respect to FIG. 9, optionally, implemented by components depicted in FIGS. 1A-1B, 3, or FIG. 12. For example, detecting operation 904 and detecting operation 906 are, optionally, implemented by event sorter 170, event recognizer 180, and event handler 190. Event monitor 171 in event sorter 170 detects user input on an input device, and event dispatcher module 174 delivers the event information to application 136-1. A respective event recognizer 180 of application 136-1 compares the event information to respective event definitions 186, and determines whether the input represents an instruction to manipulate a viewfinder. When a respective event or sub-event is detected, event recognizer 180 activates an event handler 190, which may use or call data updater 176, object updater 177, or GUI updater 178 to perform corresponding application updates. It would be clear to a person of ordinary skill in the art how other processes can be implemented based on the components depicted in FIGS. 1A-1B and/or FIG. 3.

It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein. For example, units 1202-1212 can have associated "controller" units that are operatively coupled with the respective unit and processing unit 1214 to enable operation. These controller units are not separately illustrated in FIG. 12 but are understood to be within the grasp of one of ordinary skill in the art who is designing a device having units 1202-1212 such as device 1200. The description herein thus optionally supports combination, separation, and/or further definition of the functional blocks described herein.

Figure 13:
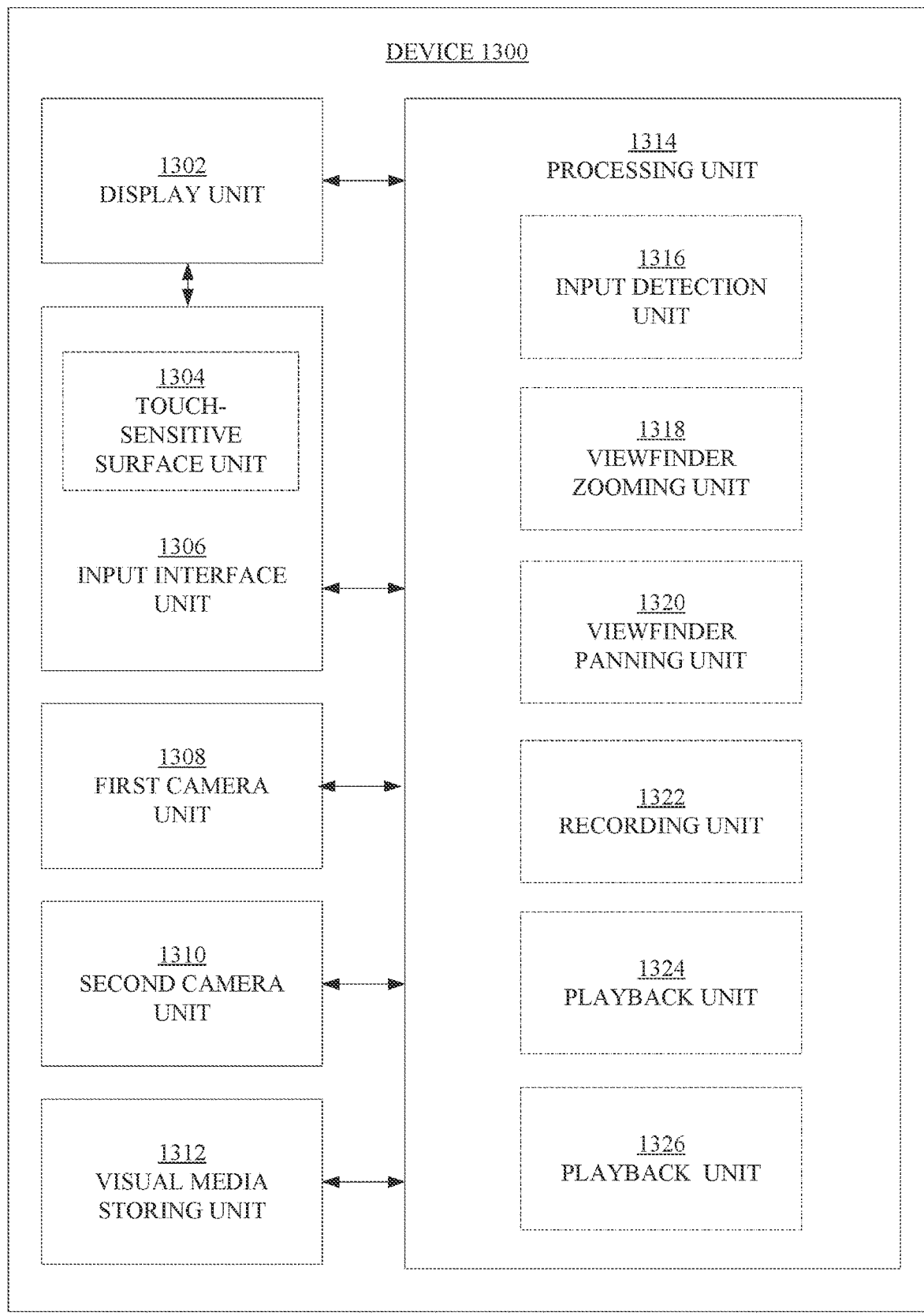
FIG. 13 is a functional block diagram of an electronic device configured to utilize multiple cameras to capture images and/or videos in accordance with some embodiments.

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments, including those described with reference to the user interfaces of FIG. 7.

As seen in FIG. 13, exemplary electronic device 1300 includes display unit 1302 configured to display graphical objects including the digital viewfinders described above; input interface unit 1304 configured to detect user input. Optionally, device 1300 includes touch-sensitive surface unit 1306 either as part of or operatively coupled to input interface unit 1304 configured to detect touch input. In some embodiments, touch-sensitive surface unit 1306, when present, is separate from display unit 1302. In some embodiments, touch-sensitive surface unit 1306, when present, forms a touch screen with display unit 1302. Device 1300 also includes camera units 1306 and 1308 configured to capture visual content; memory unit 1310 configured to store content captured by one or more of the cameras; and visual media capturing unit 1312 configured to capture visual media such as videos and/or images (and optionally, non-visual media such as audio). Device 1300 also includes processing unit 1314. In some embodiments processing unit 1314 supports an input detection unit 1316 that is configured to detect input via input interface unit 1306; viewfinder zooming unit 1318 configured to provide zooming features for digital viewfinder(s) displayed via display unit 1302; viewfinder panning unit 1320 configured to pan the contents of digital viewfinder(s) displayed via display unit 1302; recording unit 1322 configured to record visual media (and optionally non-visual media) using first camera 1308 and/or second camera 1310; playback unit 1324 for playing back recorded media; and display enabling unit 1326 for enabling the display of content in display unit 1302.

In some embodiments, processing unit 1314 is configured to: enable display (e.g., with display enabling unit 1326), via a first portion of display unit 1302, of a first digital viewfinder, the first digital viewfinder displaying content from first camera 1308; enable display (e.g., with display enabling unit 1326), via a second portion of the display unit, of a second digital viewfinder, the second digital viewfinder displaying content from second camera 1310; detect (e.g., with input detection unit 1316), a first input. In response to detecting the first input, visual media storing unit 1312 is configured to concurrently store first visual media using content from first camera 1308 and store second visual media using content from second camera 1310, where first camera 1308 and second camera 1310 have overlapping fields of view, and where the first visual media and the second visual media have different visual characteristics.

In some embodiments, the different visual characteristics comprise different frame rates. In some embodiments, the different visual characteristics comprise different resolutions. In some embodiments, the different visual characteristics comprise different digital filters.

In some embodiments, the fields of view of first camera 1308 and second camera 1310 overlap by at least fifty percent. In some embodiments, first camera 1308 has a first focal length and second camera 1310 has a second focal length different than the first focal length. In some embodiments, first camera 1308 has a fixed focal length and second camera 1310 has a fixed focal length. In some embodiments, second camera 1310 has a longer focal length than first camera 1308.

In some embodiments, visual media storing unit 1312 is configured to concurrently store the first visual media and the second visual media by: storing a still image using content from first camera 1308, and storing a video using content from second camera 1310 (e.g., with visual media storage unit 1312).

In some embodiments, processing unit 1314 is configured to: enable display (e.g., with display enabling unit 1326), via display unit 1302, of a collection of affordances representing stored visual media, the collection comprising an affordance for initiating playback (e.g., with playback unit 1324) of the second visual media, where the affordance comprises an image of the first visual media.

In some embodiments, processing unit 1314 is configured to: enable display (e.g., with display enabling unit 1326), via display unit 1302, of the first visual media in the first portion of display unit 1302 and simultaneously display the second visual media in the second portion of display unit 1302.

In some embodiments, processing unit 1314 is configured to: while concurrently storing the first visual media and the second visual media, store (e.g., with visual media storing unit 1312) non-visual media; and associate the non-visual media with the first visual media and the second visual media (e.g., with visual media storing unit 1312).

The operations described above with respect to FIG. 10, optionally, implemented by components depicted in FIGS. 1A-1B, 3, or FIG. 13. For example, detecting operation 1006 is, optionally, implemented by event sorter 170, event recognizer 180, and event handler 190. Event monitor 171 in event sorter 170 detects user input on an input device, and event dispatcher module 174 delivers the event information to application 136-1. A respective event recognizer 180 of application 136-1 compares the event information to respective event definitions 186, and determines whether the input represents an instruction to store viewfinder(s) content. When a respective event or sub-event is detected, event recognizer 180 activates an event handler 190, which may use or call data updater 176, object updater 177, or GUI updater 178 to perform corresponding application updates. It would be clear to a person of ordinary skill in the art how other processes can be implemented based on the components depicted in FIGS. 1A-1B and/or FIG. 3.

It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein. For example, units 1302-1312 can have associated "controller" units that are operatively coupled with the respective unit and processing unit 1314 to enable operation. These controller units are not separately illustrated in FIG. 13 but are understood to be within the grasp of one of ordinary skill in the art who is designing a device having units 1302-1312 such as device 1300. The description herein thus optionally supports combination, separation, and/or further definition of the functional blocks described herein.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the appended claims.

What is claimed is:

1. An electronic device, comprising:
   one or more processors;
   one or more cameras;
   a display; and
   memory storing one or more programs configured to be executed by the one or more processors, the one or more programs including instructions for:
   while a first camera of the one or more cameras is at a first zoom level, displaying a camera user interface with a live preview from the first camera that includes a camera selection affordance that indicates that the first camera will be used to capture media when a media capture command is received;
   while displaying the camera user interface, detecting a user input that corresponds to the camera selection affordance; and
   in response to detecting the user input:
   zooming the live preview to a second zoom level; and
   changing an appearance of the camera selection affordance to indicate that a second camera will be used to capture media when the media capture command is received.

2. The electronic device of claim 1, wherein the first camera has a first fixed focal length and the second camera has a second fixed focal length.

3. The electronic device of claim 2, wherein the second fixed focal length is different from the first fixed focal length.

4. The electronic device of claim 1, wherein the user input is a tap gesture.

5. The electronic device of claim 1, wherein selection affordance is overlaid on the live preview.

6. The electronic device of claim 1, wherein a shutter affordance is displayed concurrently with the live preview and wherein the media capture command is received via detecting an activation of the shutter affordance.

7. The electronic device of claim 6, the one or more programs further including instructions for:
   detecting activation of the shutter affordance; and
   in response to detecting activation of the shutter affordance:
   while the first camera is at the first zoom level, capturing media with the first camera; and
   while the live preview is at the second zoom level, capturing media with the second camera.

8. A non-transitory computer-readable storage medium storing one or more programs configured to be executed by one or more processors of an electronic device with one or more cameras, and a display, the one or more programs including instructions for:
   while a first camera of the one or more cameras is at a first zoom level, displaying a camera user interface with a live preview from the first camera that includes a camera selection affordance that indicates that the first camera will be used to capture media when a media capture command is received;
   while displaying the camera user interface, detecting a user input that corresponds to the camera selection affordance; and
   in response to detecting the user input:
   zooming the live preview to a second zoom level; and
   changing an appearance of the camera selection affordance to indicate that a second camera will be used to capture media when the media capture command is received.

9. The non-transitory computer-readable storage medium of claim 8, wherein the first camera has a first fixed focal length and the second camera has a second fixed focal length.

10. The non-transitory computer-readable storage medium of claim 9, wherein the second fixed focal length is different from the first fixed focal length.

11. The non-transitory computer-readable storage medium of claim 8, wherein the user input is a tap gesture.

12. The non-transitory computer-readable storage medium of claim 8, wherein selection affordance is overlaid on the live preview.

13. The non-transitory computer-readable storage medium of claim 8, wherein a shutter affordance is displayed concurrently with the live preview and wherein the media capture command is received via detecting an activation of the shutter affordance.

14. The non-transitory computer-readable storage medium of claim 13, the one or more programs further including instructions for:
    detecting activation of the shutter affordance; and
    in response to detecting activation of the shutter affordance:
    while the first camera is at the first zoom level, capturing media with the first camera; and
    while the live preview is at the second zoom level, capturing media with the second camera.

15. A method, comprising:
    at an electronic device with one or more cameras, and a display:
    while a first camera of the one or more cameras is at a first zoom level, displaying a camera user interface with a live preview from the first camera that includes a camera selection affordance that indicates that the first camera will be used to capture media when a media capture command is received;
    while displaying the camera user interface, detecting a user input that corresponds to the camera selection affordance; and
    in response to detecting the user input:
    zooming the live preview to a second zoom level; and
    changing an appearance of the camera selection affordance to indicate that a second camera will be used to capture media when the media capture command is received.

16. The method of claim 15, wherein the first camera has a first fixed focal length and the second camera has a second fixed focal length.

17. The method of claim 16, wherein the second fixed focal length is different from the first fixed focal length.

18. The method of claim 15, wherein the user input is a tap gesture.

19. The method of claim 15, wherein selection affordance is overlaid on the live preview.

20. The method of claim 15, wherein a shutter affordance is displayed concurrently with the live preview and wherein the media capture command is received via detecting an activation of the shutter affordance.

21. The method of claim 20, the method further comprising:
- detecting activation of the shutter affordance; and
- in response to detecting activation of the shutter affordance:
  - while the first camera is at the first zoom level, capturing media with the first camera; and
- while the live preview is at the second zoom level, capturing media with the second camera.

\* \* \* \* \*